US008872767B2

(12) United States Patent
Khosravy et al.

(10) Patent No.: US 8,872,767 B2
(45) Date of Patent: Oct. 28, 2014

(54) SYSTEM AND METHOD FOR CONVERTING GESTURES INTO DIGITAL GRAFFITI

(75) Inventors: Moe Khosravy, Bellevue, WA (US); Lev Novik, Bellevue, WA (US); Katrika Marie Woodcock, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 679 days.

(21) Appl. No.: 12/499,016

(22) Filed: Jul. 7, 2009

(65) Prior Publication Data

US 2011/0006977 A1   Jan. 13, 2011

(51) Int. Cl.
| | |
|---|---|
| G06F 3/033 | (2013.01) |
| G09G 5/08 | (2006.01) |
| H04W 4/20 | (2009.01) |
| H04W 4/02 | (2009.01) |
| G06F 3/01 | (2006.01) |

(52) U.S. Cl.
CPC .............. *G06F 3/017* (2013.01); *H04W 4/206* (2013.01); *H04W 4/02* (2013.01)
USPC .......................................... 345/158; 715/863

(58) Field of Classification Search
None
See application file for complete search history.

(56) References Cited

U.S. PATENT DOCUMENTS

| | | | |
|---|---|---|---|
| 6,252,544 B1 | 6/2001 | Hoffberg | |
| 6,353,398 B1 | 3/2002 | Amin et al. | |
| 6,369,794 B1 * | 4/2002 | Sakurai et al. | 345/156 |
| 6,381,603 B1 | 4/2002 | Chan et al. | |
| 6,529,144 B1 * | 3/2003 | Nilsen et al. | 341/20 |
| 6,672,506 B2 | 1/2004 | Swartz et al. | |
| 6,741,188 B1 | 5/2004 | Miller et al. | |
| D494,584 S | 8/2004 | Schlieffers et al. | |
| 6,795,768 B2 | 9/2004 | Bragansa et al. | |
| 6,796,505 B2 | 9/2004 | Pellaumail et al. | |
| 6,837,436 B2 | 1/2005 | Swartz et al. | |
| 7,010,501 B1 | 3/2006 | Roslak et al. | |
| 7,040,541 B2 | 5/2006 | Swartz et al. | |
| 7,063,263 B2 | 6/2006 | Swartz et al. | |
| 7,142,205 B2 | 11/2006 | Chithambaram et al. | |
| 7,171,378 B2 | 1/2007 | Petrovich et al. | |
| 7,195,157 B2 | 3/2007 | Swartz et al. | |
| 7,358,985 B2 | 4/2008 | Uchihashi et al. | |
| 7,385,501 B2 | 6/2008 | Miller | |
| 2001/0030664 A1 | 10/2001 | Shulman et al. | |
| 2002/0191034 A1 | 12/2002 | Sowizral et al. | |
| 2004/0070602 A1 | 4/2004 | Kobuya et al. | |
| 2004/0130524 A1 * | 7/2004 | Matsui | 345/156 |

(Continued)

OTHER PUBLICATIONS

Jenabi, et al. Finteraction—Finger Interaction with Mobile Phone http://www.daimi.au.dk/mobile/experiences/pdf/Finteraction.pdf. Last accessed Mar. 17, 2009, 4 pages.

(Continued)

*Primary Examiner* — Amare Mengistu
*Assistant Examiner* — Antonio Xavier
(74) *Attorney, Agent, or Firm* — Nicholas Chen; Sergey Lamansky; Micky Minhas

(57) ABSTRACT

The subject disclosure provides a device, computer readable storage medium, and method for converting gestures undergone by a device into digital graffiti. The disclosure includes ascertaining an orientation of the device and a path traversed by the device. Gestures undergone by the device are identified as a function of the orientation and the path. Digital graffiti corresponding to the gestures are then superimposed onto a digital canvas.

22 Claims, 42 Drawing Sheets

(56) References Cited

U.S. PATENT DOCUMENTS

| | | | |
|---|---|---|---|
| 2004/0201500 A1 | 10/2004 | Miller et al. | |
| 2004/0236500 A1* | 11/2004 | Choi et al. | 701/200 |
| 2005/0172261 A1 | 8/2005 | Yuknewicz et al. | |
| 2005/0174324 A1* | 8/2005 | Liberty et al. | 345/156 |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2007/0021208 A1* | 1/2007 | Mao et al. | 463/36 |
| 2007/0024527 A1* | 2/2007 | Heikkinen et al. | 345/9 |
| 2007/0091292 A1* | 4/2007 | Cho et al. | 355/75 |
| 2007/0104348 A1* | 5/2007 | Cohen | 382/100 |
| 2007/0230747 A1* | 10/2007 | Dunko | 382/107 |
| 2007/0259716 A1 | 11/2007 | Mattice et al. | |
| 2008/0090591 A1 | 4/2008 | Miller et al. | |
| 2008/0122871 A1* | 5/2008 | Guday | 345/634 |
| 2008/0161018 A1 | 7/2008 | Miller et al. | |
| 2008/0192005 A1 | 8/2008 | Elgoyhen et al. | |
| 2009/0003659 A1 | 1/2009 | Forstall et al. | |
| 2009/0006345 A1* | 1/2009 | Platt et al. | 707/4 |
| 2009/0031258 A1 | 1/2009 | Arrasvuori | |
| 2009/0040370 A1* | 2/2009 | Varanasi | 348/376 |
| 2009/0051648 A1* | 2/2009 | Shamaie et al. | 345/156 |
| 2009/0054077 A1* | 2/2009 | Gauthier et al. | 455/456.1 |
| 2009/0076723 A1* | 3/2009 | Moloney | 701/209 |
| 2009/0111434 A1* | 4/2009 | Yu et al. | 455/414.1 |
| 2009/0237328 A1* | 9/2009 | Gyorfi et al. | 345/9 |
| 2009/0265671 A1* | 10/2009 | Sachs et al. | 715/863 |
| 2009/0287527 A1* | 11/2009 | Kolb et al. | 705/9 |
| 2009/0319166 A1* | 12/2009 | Khosravy et al. | 701/200 |
| 2010/0125622 A1* | 5/2010 | White et al. | 709/201 |
| 2010/0125816 A1* | 5/2010 | Bezos | 715/863 |
| 2010/0214111 A1* | 8/2010 | Schuler et al. | 340/686.1 |
| 2012/0190386 A1* | 7/2012 | Anderson | 455/456.3 |

OTHER PUBLICATIONS

Robinson, et al. Point-to-GeoBlog: Gestures and Sensors to Support User Generated Content Creation. Mobile HCI 2008, Sep. 2-5, 2008, Amsterdam, The Netherlands. ACM 978-1-59593-952—Apr. 8, 2009 http://www.cs.swan.ac.uk/negotiatedinteraction/publications/Point-to-GeoBlog.pdf. Last accessed Mar. 17, 2009, 10 pages.

Simon, et al. Towards Orientation-Aware Location Based Mobile Services http://p2d.ftw.at/papers/SimonKunczierAnegg.pdf. Last accessed Mar. 17, 2009, 8 pages.

* cited by examiner

FIG. 18
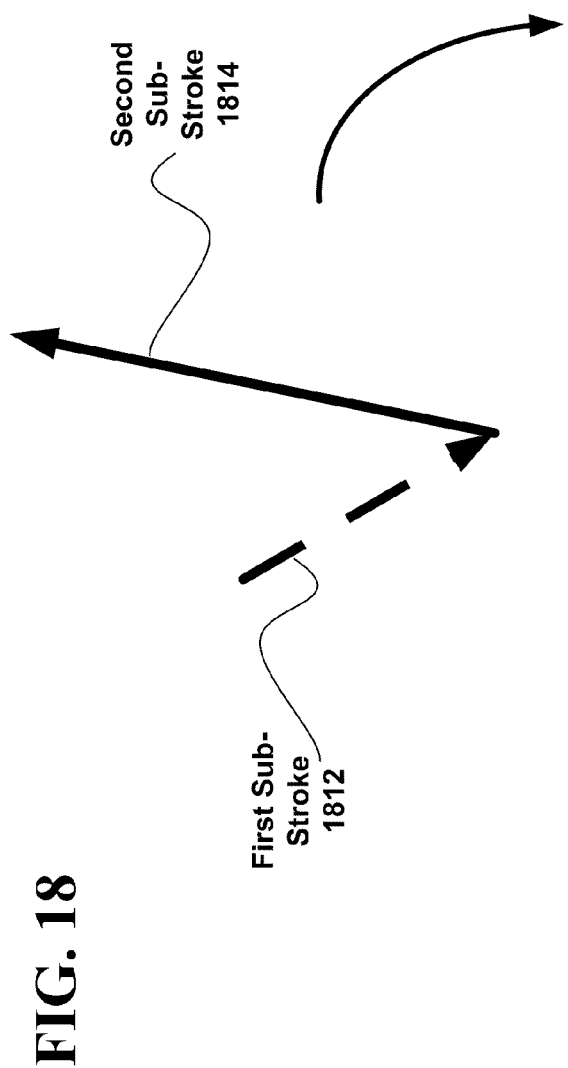
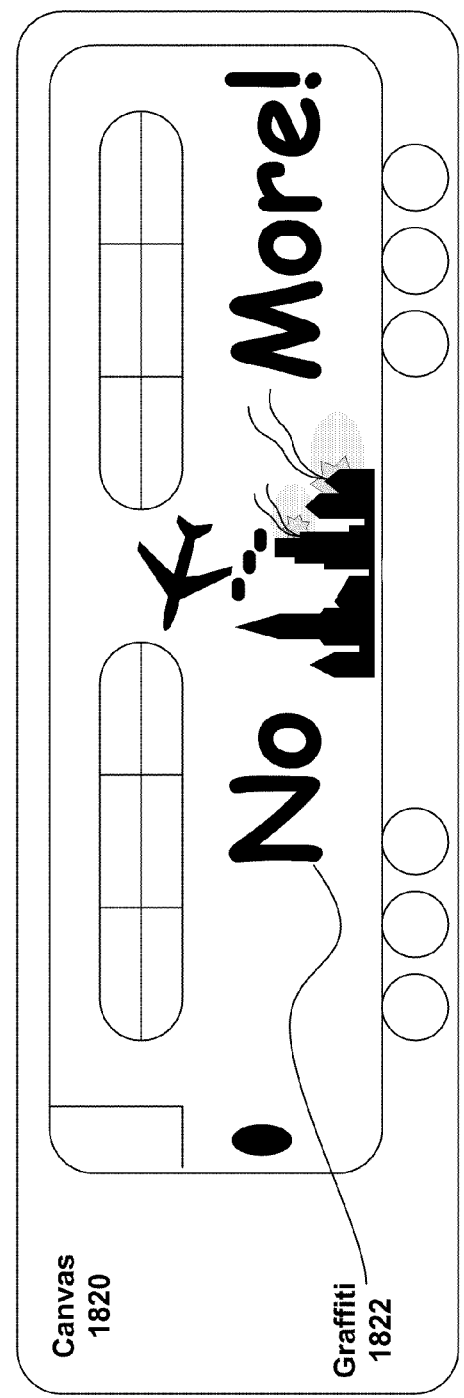

FIG. 21
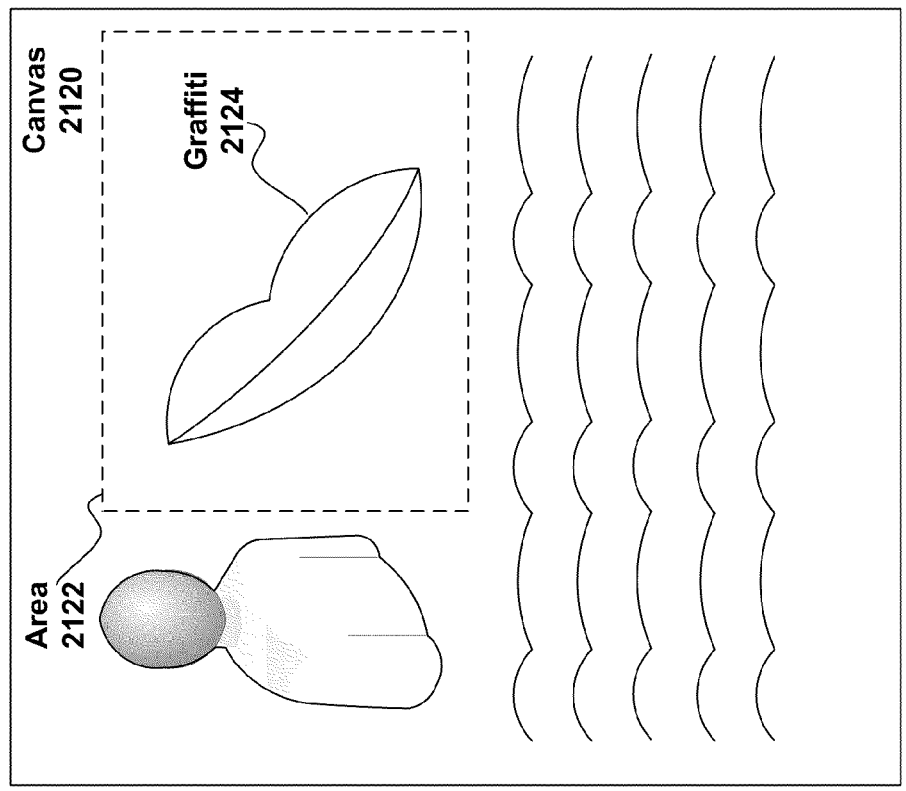
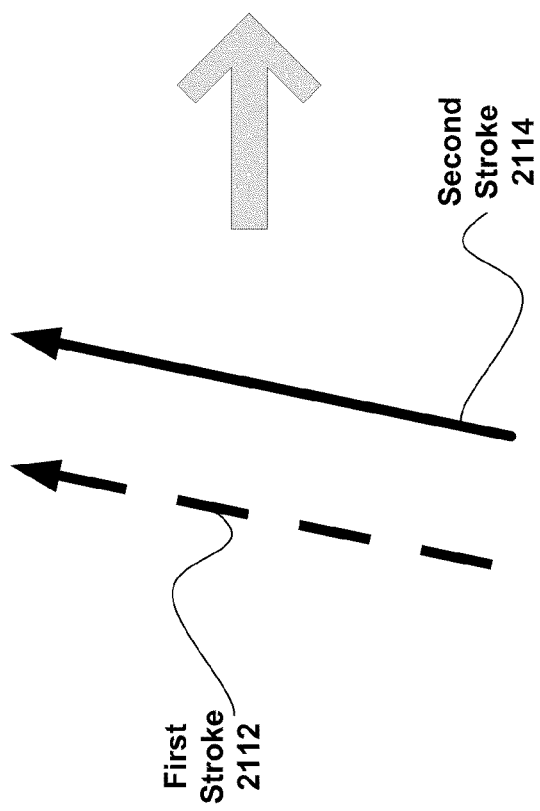

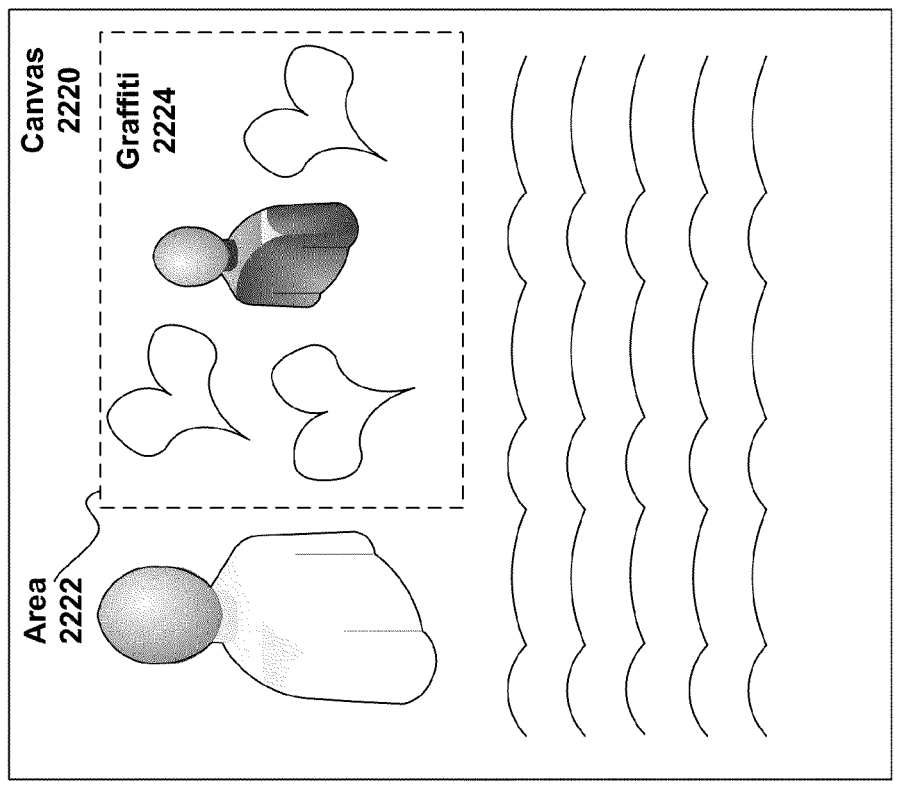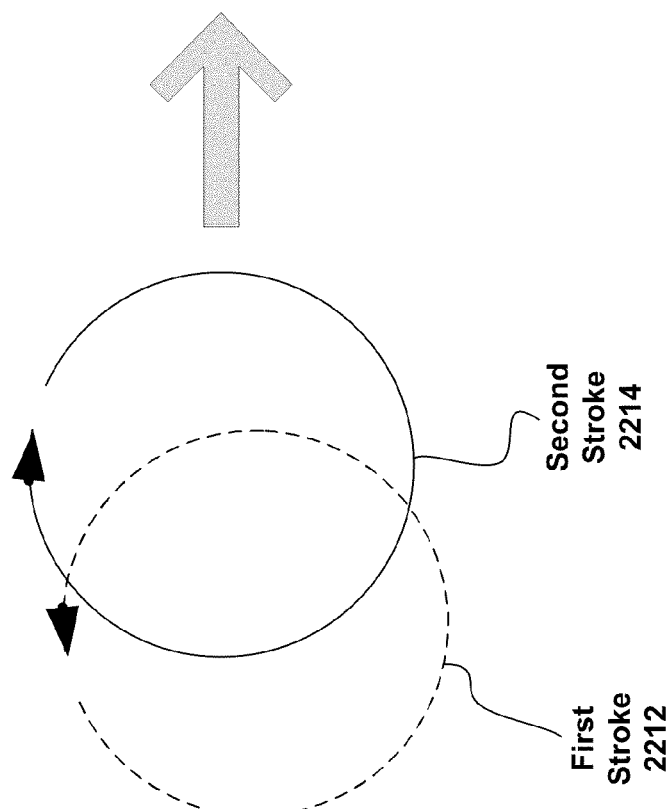
FIG. 22

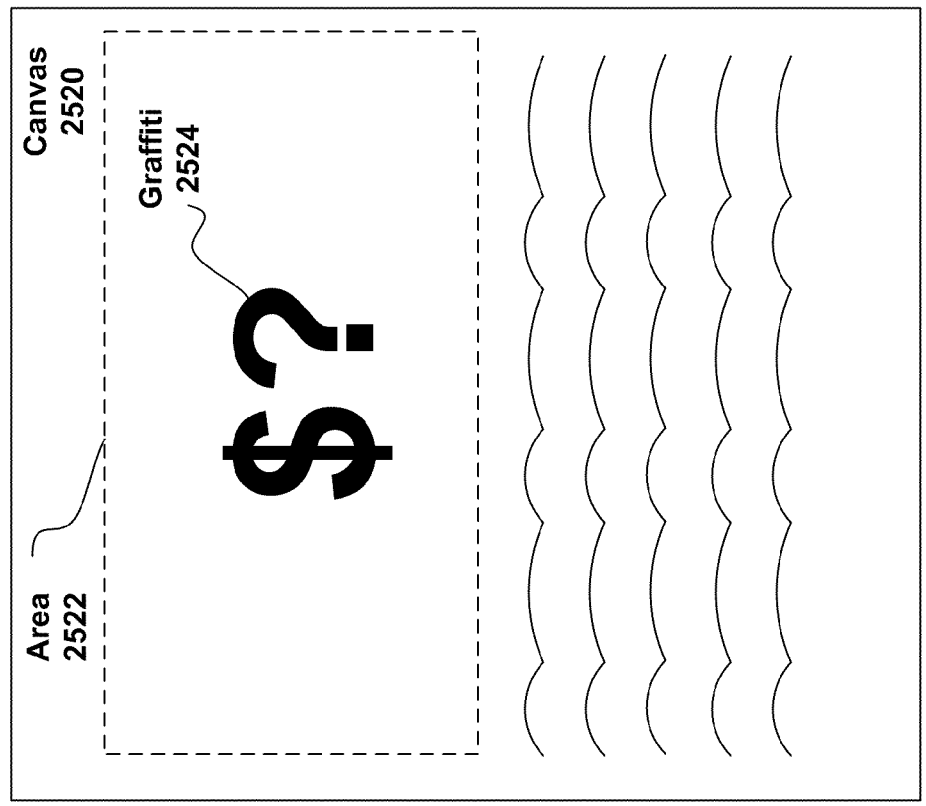
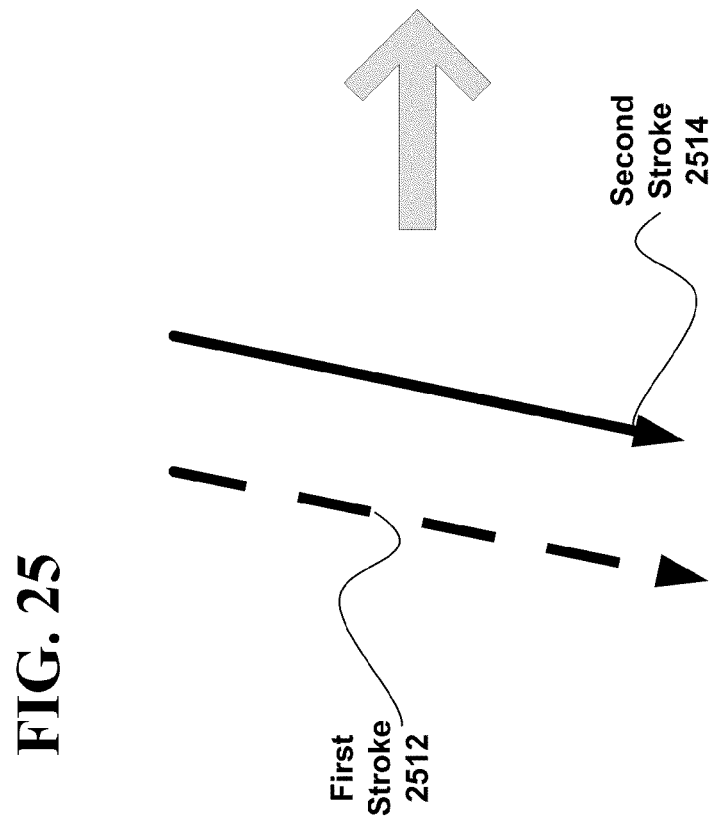
FIG. 25

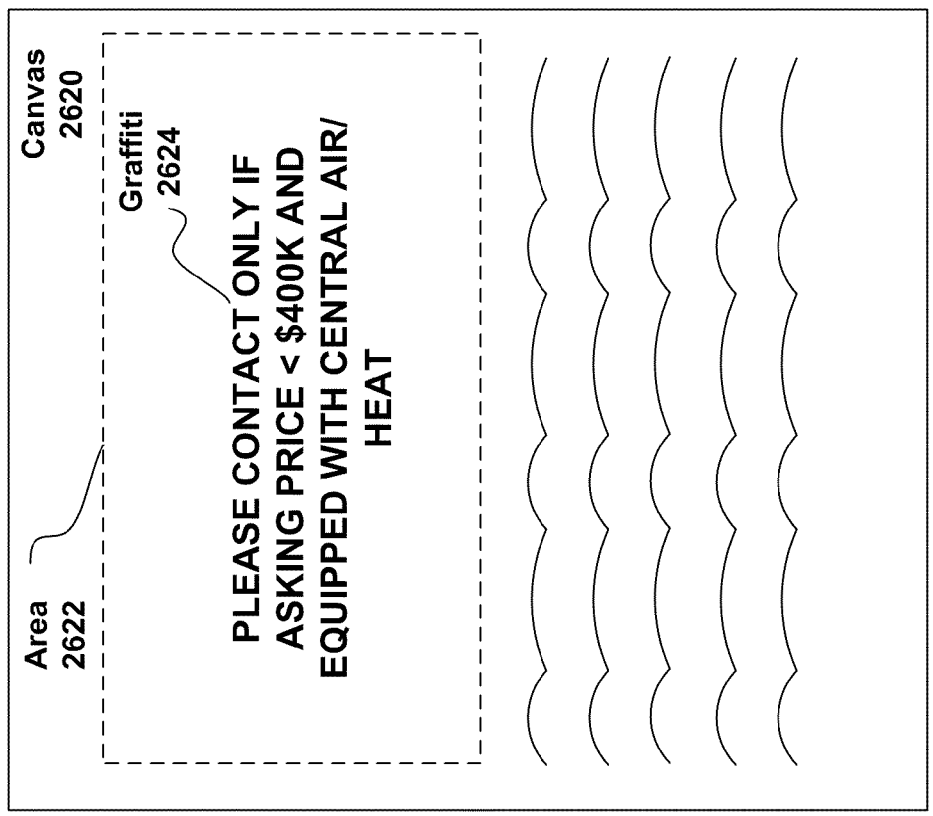
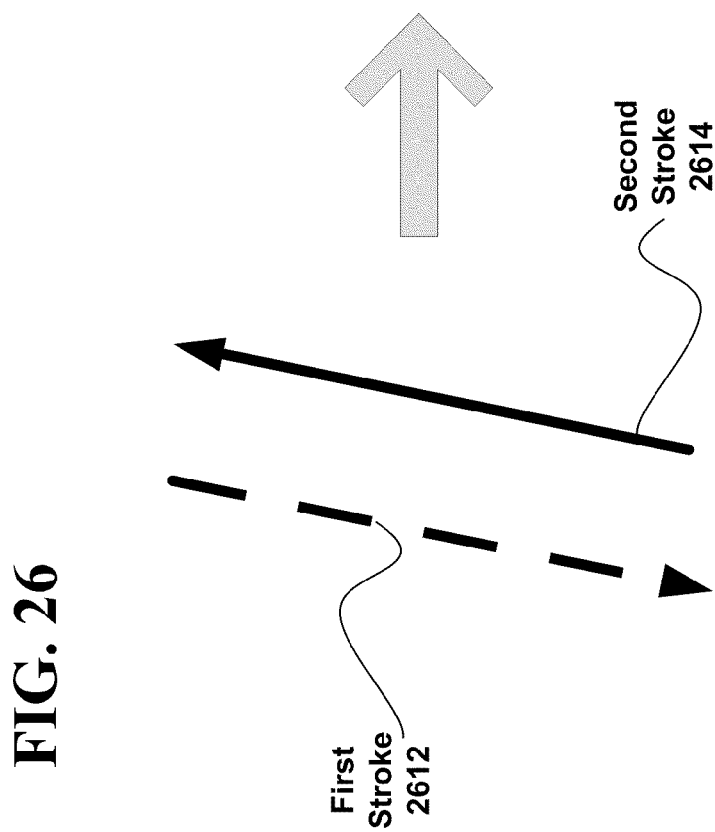
FIG. 26

Determine Object at which Mobile Device is Pointed based on Location (e.g., GPS) and Motion Vector (e.g., Compass, Accelerometer, etc.)

SYSTEM AND METHOD FOR CONVERTING GESTURES INTO DIGITAL GRAFFITI

TECHNICAL FIELD

The subject disclosure generally relates to mobile computing devices and more particularly to superimposing digital graffiti onto a digital canvas based on gestures undergone by a device.

BACKGROUND

By way of background concerning some conventional systems, mobile devices, such as portable laptops, PDAs, mobile phones, navigation devices, and the like have been equipped with location-based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location-based systems that help users of these devices to be found on a map and to facilitate point-to-point navigation in real-time and to search for locations near a point on a map.

However, such navigation and search scenarios are currently limited to displaying relatively static information about particular locations, wherein interacting with such locations require a user to provide an input via a touch screen and/or keypad. For many potential interactions though, considering the complexity of input on touch screens or tiny alphanumeric keypads typically provided for portable electronic devices, requiring an input via such an interface is inadequate for invoking benefits of location-based services. For instance, a user quickly driving by a location may find it cumbersome and unnecessarily time-consuming to both identify the location (e.g., by obtaining a digital profile for a restaurant, such as a Yelp profile) and provide an input pertaining to the location via a touch screen/keypad user interface (e.g., a drawing of an "unhappy face"). Accordingly, it would be desirable to develop a device with a user interface that provides users with location-based input capabilities unobtainable and/or impractical with a touch screen/keypad user interface.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various non-limiting embodiments, gestures are processed and converted into digital graffiti. In a first embodiment, a portable electronic device is described. Within such embodiment, the device includes a motion component that outputs motion information as a function of the device's movement. The device further includes a directional component that outputs direction information as a function of the device's orientation. The device also includes at least one processor configured to process the motion information and the direction information to track gestures undergone by the device. The at least one processor is further configured to superimpose digital graffiti corresponding to the gestures undergone by the device onto a digital canvas.

In another embodiment, a computer readable storage medium is described, which includes a memory component configured to store computer-readable instructions for performing various acts. Within such embodiment, instructions are included for ascertaining an orientation of a portable device as a function of direction information processed by a processor. Instructions are also included for ascertaining a path traversed by the portable device as a function of motion information processed by the processor. The instructions further include instructions for identifying a gesture undergone by the portable device as a function of the orientation and the path. For this embodiment, instructions are also included for superimposing digital graffiti corresponding to the gesture onto a digital canvas.

In yet another embodiment, a method is described, which includes employing a processor to execute computer executable instructions stored on a computer readable storage medium. Within such embodiment, the processor facilitates executing various acts including determining an orientation of a portable device as a function of data output by a compass. Further acts executed by the processor include determining a movement undergone by the device as a function of data output by an accelerometer unit, and determining a location of the device as a function of data output by a global positioning system (GPS) unit. For this embodiment, gestures corresponding to the device's movements are ascertained as a function of the data output by the compass and the data output by the accelerometer unit. Further acts include selecting a digital canvas as a function of the device's location, and superimposing digital graffiti corresponding to the gesture onto the digital canvas.

These and other embodiments are described in more detail below.

BRIEF DESCRIPTION OF THE DRAWINGS

Various non-limiting embodiments are further described with reference to the following accompanying drawings.

FIG. 18 illustrates an exemplary utilization of an object tool for superimposing a custom digital graffiti object onto a photographic digital canvas corresponding to a mobile entity.

FIG. 21 illustrates an exemplary utilization of an object tool for superimposing a generic digital graffiti object onto a canvas residing on an individual's digital profile.

FIG. 22 illustrates an exemplary utilization of an object tool for superimposing a custom digital graffiti object onto a canvas residing on an individual's digital profile.

FIG. 25 illustrates an exemplary utilization of an object tool for superimposing a generic digital graffiti object onto a canvas residing on a real estate property's digital profile.

FIG. 26 illustrates an exemplary utilization of an object tool for superimposing a custom digital graffiti object onto a canvas residing on a real estate property's digital profile.

DETAILED DESCRIPTION

Overview

Figure 1:
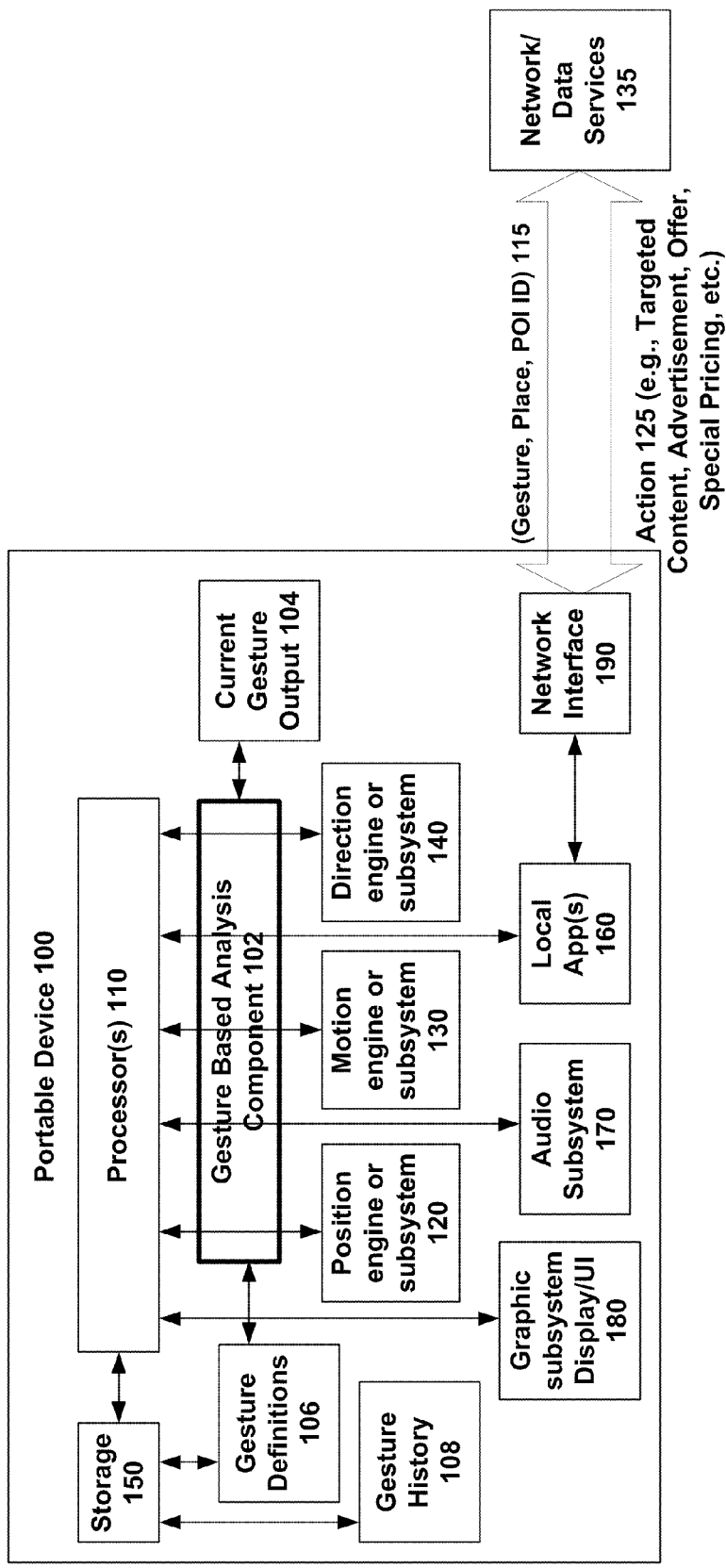
FIG. 1 illustrates a portable electronic device according to an embodiment including a positional component, a motion component and a directional component for performing gesture based analysis as described in one or more embodiments and scenarios.

As discussed in the background, among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static. In addition, input to engage such static location based services is frustrating at best for portable devices, such as cell phones, PDAs, music players, notebooks, netbooks, etc. For instance, input to such devices when the user is "on the go" has been conventionally limited to error prone input processes, e.g., due to limited space, which are error prone even when a user is not moving and the device is stationary.

At least partly in consideration of these deficiencies of conventional location based services, various embodiments of a portable device are provided that enable users to point a device directionally and receive static and/or dynamic information in response from a networked service, such as provided by one or more servers, or as part of a cloud services experience. Moreover, by determining gestured made by the device based on any one or more of direction information, motion information or location information, input for various scenarios and device contexts are greatly facilitated, and can be tailored to context based on the location, or given point(s) of interest pointed at by a pointing device.

In the various alternative embodiments described herein, leveraging digital compasses and location services to provide direction and location information enables a next-generation of direction or pointer based location search services, scan services, discoverability services, etc. In this regard, the digital compass and location information, such as GPS, can be used to point at objects of interest, thus defining the entry point for one or more data transactions or interactions between the device and one or more third party devices providing service(s) for the object(s) of interest at which the device is pointed. Using a digital compass, e.g., solid state, magnetic, sun/moon based, etc. on a mobile endpoint facilitates point and upload scenarios, point and synchronize geographical information to a Web service, cloud services or another endpoint.

As reflected in various embodiments, a device is provided that can hone in on, interact with, or otherwise transact with, a specific object or specific objects of interest by way of location and direction of the device, creating a new advertising model not previously known. As an example, when a user interacts with a particular product on a shelf at a retail store in connection with a direction based service, this creates an opportunity for anyone having an interest in the particular product to engage the user, e.g., communicate some information to that user. Any context that can be discerned from the user's actions and interactions can also be taken into account when acting on the opportunity. In this regard, a variety of gestures can facilitate these actions and interactions without requiring the complexity of input alluded to in the background.

In this regard, with a gesture (pre-defined or user defined), users can interact with the endpoints in a host of context sensitive ways to provide or update information associated with endpoints of interest, or to receive beneficial information or instruments (e.g., coupons, offers, etc.) from entities associated with the endpoints of interest, or according to any of the many non-examples described in more detail below.

In one embodiment, a portable electronic device comprises a positional component that outputs position information as a function of a location of the portable electronic device, a motion component that outputs motion information as a function of movement(s) of the portable device and a directional component that outputs direction information as a function of an orientation of the portable electronic device. The device is configured to process at least the position information to determine point(s) of interest relating to the position information and configured to process at least the motion information and the direction information to determine pre-defined gesture(s) undergone by the portable electronic device with respect to the point(s) of interest, wherein the portable electronic device automatically makes a request based on the pre-defined gesture(s) and the point(s) of interest.

The point(s) of interest can be determined from the position information and the direction information. The at least one pre-defined gesture can be determined from any one or more of the position information, the motion information and the direction information. The portable electronic device can automatically make a request based on the gesture(s) and identifier(s) associated with the point(s) of interest. The gesture(s) can be determined based on a pre-defined gesture definition or a user-defined gesture definition. A positional component can include a global positioning satellite (GPS) component for receiving and processing GPS signals or a component for receiving position information based on triangulation to wireless base stations, an image recognition system for recognizing at least one object in image data and determining a position of the device relative to the at least one object in the image data, or other means for measuring location.

The directional component can include a digital compass and can also include an image recognition system for recognizing an object in real space and determining the direction of the object and therefore the device by detecting the side of the object, or detecting the object relative to other objects fixed in real space. The motion component can include accelerometer(s) for measuring an acceleration of the device. The motion component can include at least two accelerometers for measuring a tilt or rotation of at least part of the device.

In one embodiment, a process determines a location of a portable device based on location information determined for the device, the location information representing a global position of the device. Direction information representing an orientation of the portable device and the location information are analyzed to determine point(s) of interest towards which the portable device is substantially oriented. In this regard, path information representing a path traversed by the portable device is analyzed based on at least the direction information to determine gesture(s) made by the portable device. A request is transmitted to a network service based on the gesture(s) and the point of interest.

The analyzing of path information can include processing acceleration information measuring acceleration of the device, processing velocity information measuring velocity of the device, analyzing the path information for a given time span or analyzing a set of vectors representing the path traversed by the device from a start time to a stop time. Moreover, the analyzing of path information can include analyzing three dimensional (3-D) path information representing three degrees of freedom of movement for the device, but can also include analyzing three dimensional (3-D) path information as 2-D path information by collapsing a degree of freedom.

In another embodiment, a method includes determining whether a viewing plane of a portable device is aligned with a substantially horizontal plane that is substantially parallel to a ground plane or aligned with a substantially vertical plane that is substantially orthogonal to the ground plane. If the portable device is aligned with the substantially horizontal plane, a topographical map view of a geographical area map determined based on location and direction information measured by the portable device is displayed and indication(s) of point(s) of interest on the geographical area map are displayed. If the portable device is aligned with the substantially vertical plane, an image based view of three-dimensional (3-D) space extending at least one pre-defined direction from the portable device is displayed and indication(s) of point(s) of interest pertaining to the 3-D space represented by the image based view can be displayed.

Details of various other exemplary, non-limiting embodiments are provided below

Gesture Based Input to Computing Device with Direction Information

With the addition of directional information in a location based environment, a variety of mobile scanning experiences are enabled on top of user identification of or interaction with specific object(s) of interest by pointing, or gesturing, at an object of interest. For instance, when a user gestures, e.g., points, at a particular item at a particular location or place, this creates an opportunity for anyone having an interest in that particular item to interact with the user regarding that item or related items at a point at a time when the user's focus is on the particular item. User context for the interaction can also be taken into account to supplement the provision of one or more interactive direction based services.

A gesture subsystem can optionally be included in a device, which can be predicated on any one or more of the motion information, location information or direction information. In this regard, not only can direction information and location information be used to define a set of unique gestures, but also motion information (such as speed and acceleration) can be used to define a more sophisticated set of gestures. In this regard, one can appreciate that a variety of algorithms could be adopted for a gesture subsystem. For instance, a simple click-event when in the "pointing mode" for the device can result in determining a set of points of interest for the user.

The pointing information, however produced according to an underlying set of measurement components and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

In addition, a device includes an algorithm for discerning items substantially along a direction at which the device is pointing, and those not substantially along a direction at which the device is pointing. In this respect, while motion vector might implicate POI, without a specific panning gesture that encompassed more directions/vectors, POIs would likely not be within the scope of points of interest defined by motion vector. The distance or reach of a vector can also be tuned by a user, e.g., via a slider control or other control, to quickly expand or contract the scope of endpoints encompassed by a given "pointing" interaction with the device.

Other gestures that can be of interest in for a gesturing subsystem include recognizing a user's gesture for zoom in or zoom out. Zoom in/zoom out can be done in terms of distance. A device pointed in direction may include a zoomed in view which includes points of interest within distance and arc, or a medium zoomed view representing points of interest between distance, or a zoomed out view representing points of interest beyond distance. These zoom zones correspond to POIs. More or less zones can be considered depending upon a variety of factors, the service, user preference, etc.

For another non-limiting example, with location information and direction information, a user can input a first direction via a click, and then a second direction after moving the device via a second click, which in effect defines an arc for objects of interest. For instance, via first pointing act by the user at time in direction and a second pointing act at time by the user in direction, an arc is implicitly defined. The area of interest implicitly includes a search of points of object within a distance, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions can also be implemented.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

FIG. 1 illustrates a portable electronic device 100 according to an embodiment including processor(s) 110, a positional component 120 that outputs position information as a function of location of the portable electronic device, a motion component 130 that outputs motion information as a function of movement of the portable device and a directional component 140 that outputs direction information as a function of orientation of the portable electronic device.

In cooperation with gesture based analysis component 102, and optionally local applications or services 160 (or remote services 135), processor(s) 110 process the position information and/or the direction information to determine a set of points of interest relating to the position/direction information. Processor(s) 110 also process the motion information, direction information and/or position information to determine pre-defined gesture(s) undergone by the portable electronic device with respect to one or more points of interest of the set. In response to the pre-defined gesture(s), the portable electronic device automatically makes a request based on the pre-defined gesture(s) and identifier(s) associated with the one or more points of interest of the set.

The gesture based analysis component 102 can determine a set of current gesture(s) 104 based on one or more of the position information, such as but not limited to GPS information, output from position engine or subsystem 120, the motion information, such as but limited to accelerometer information, of motion engine or subsystem 130, or the direction information, such as digital compass information, output from direction engine or subsystem 140. Gesture based analysis component 102 determines gesture(s) 104 relative to gesture definitions 106, which can be statically defined on the device, defined by the user of the device, retrieved from a gesture definition network provider (not shown), etc. Gesture history 108 coupled with other place and point of interest information can be a rich source for intelligent applications 160 or network services 135 to understand context for a given device gesture based on historical interaction.

Device 100 can include storage 150 for storing any of position information, motion information, direction information, gesture definitions 106, gesture history 108, application information, etc. The device 100 can also include a graphics subsystem display and associated user interface 180 for display of information and/or for receiving touch screen input. An audio subsystem 170 can also be included for voice or other sound input, or sound output in connection with the provision of gesture and pointing based services.

For instance, via network interface 190, based on a current gesture 104, an automatic request 115 can be made to network/data services 135 based on the gesture and place or point of interest identification. As a result, a variety of actions 125 can take place, e.g., targeted content, advertising, offers, deals, price comparisons, etc. Local applications 160 and storage 150 are optional as any of the functionality of providing gesture-based services can be pushed to the network data services 135, or conversely, functionality of data services 135 can be implemented by a local application 160.

Figure 2:
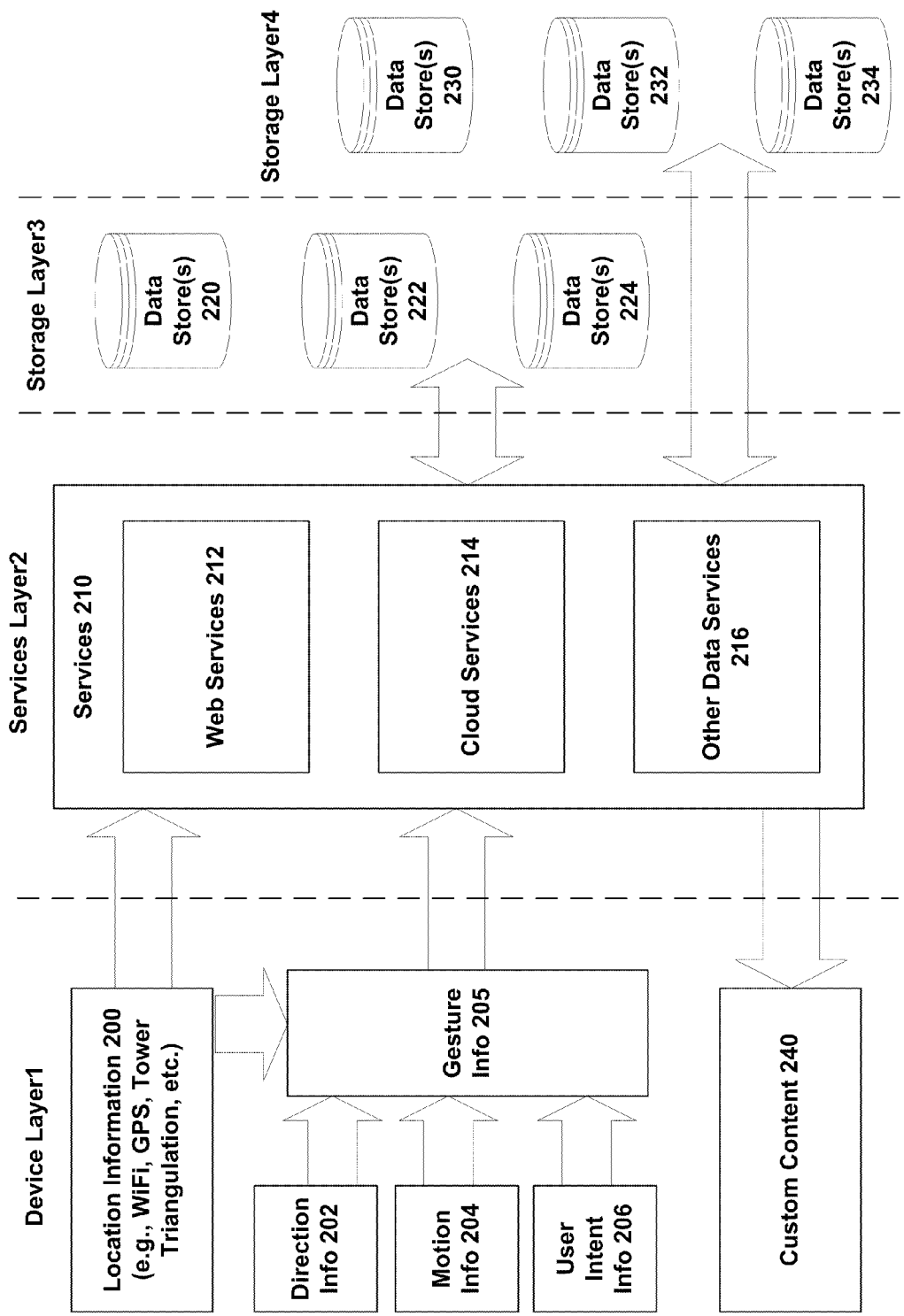
FIG. 2 is an exemplary non-limiting architecture for achieving one or more embodiments described herein.

FIG. 2 is an exemplary non-limiting diagram of an architecture for achieving one or more embodiments described herein. At the device layer Layer1, location information 200, direction information 202, motion information 204 and user intent information 206 can be input to a Layer2 with various service 210, including web services 212, cloud services 214, other data services 216, etc. Gesture information 205 can be derived from any of location information 200, direction information 202, motion information 204 or user intent information 206. Any of services 210 can have input to a set of brick and mortar store databases in Layer3, such as data store(s) 220, 222, 224, etc. or set of online or electronic retailer databases in Layer4, such as data store(s) 230, 232, 234, etc. In this regard, user intent 204 coupled with a place of the device can be utilized by one or more services 210 to retrieve and deliver custom content 240 to the device from a variety of retail and online vendors based on gesture information 205 of the device.

Figure 3:
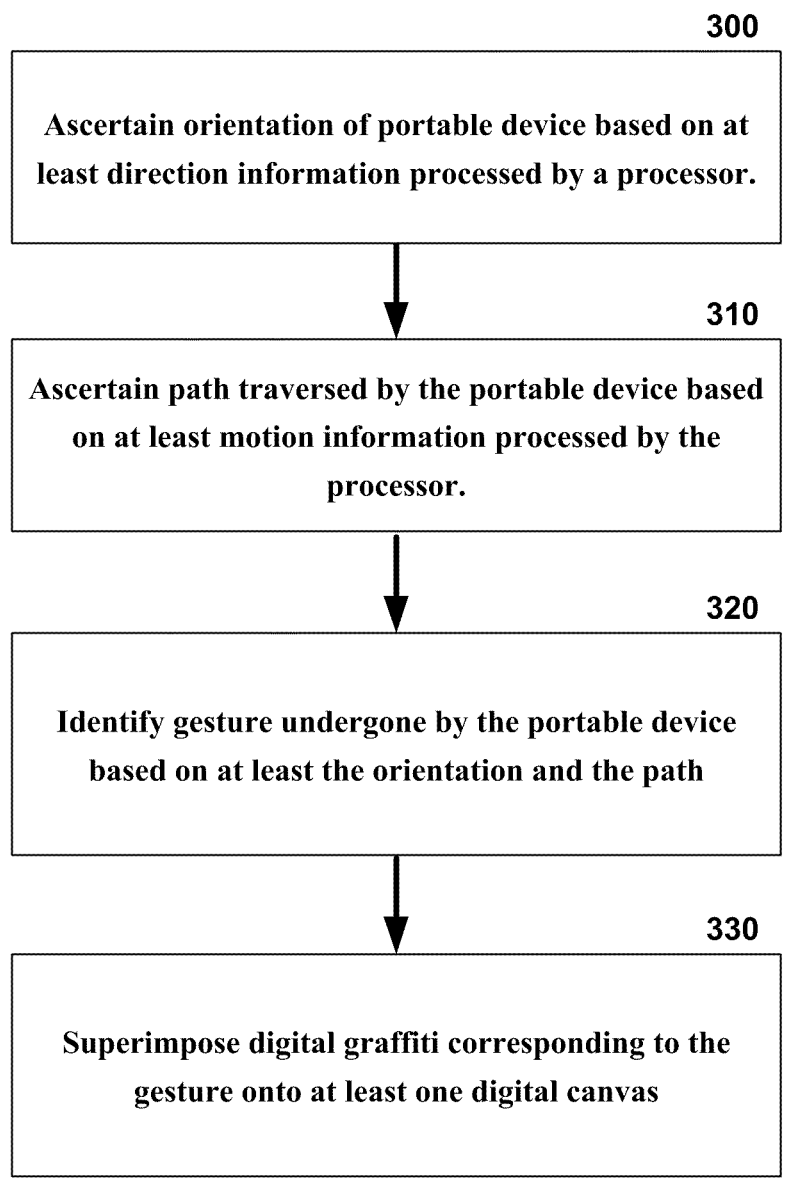
FIG. 3 is a flow diagram illustrating an exemplary sequence of actions of a non-limiting embodiment.

FIG. 3 is a flow diagram illustrating a methodology for providing digital graffiti with a portable device according to an exemplary embodiment. At step 300, the method begins by ascertaining an orientation for the portable device based on at least direction information processed by a processor. At step 310, the method continues by ascertaining a path traversed by the portable device based on at least motion information processed by the processor. A gesture undergone by the portable device is then identified at step 320 based on at least the orientation and the path. The method then concludes at 330 with a superimposition of digital graffiti corresponding to the gesture onto at least one digital canvas.

Figure 4:
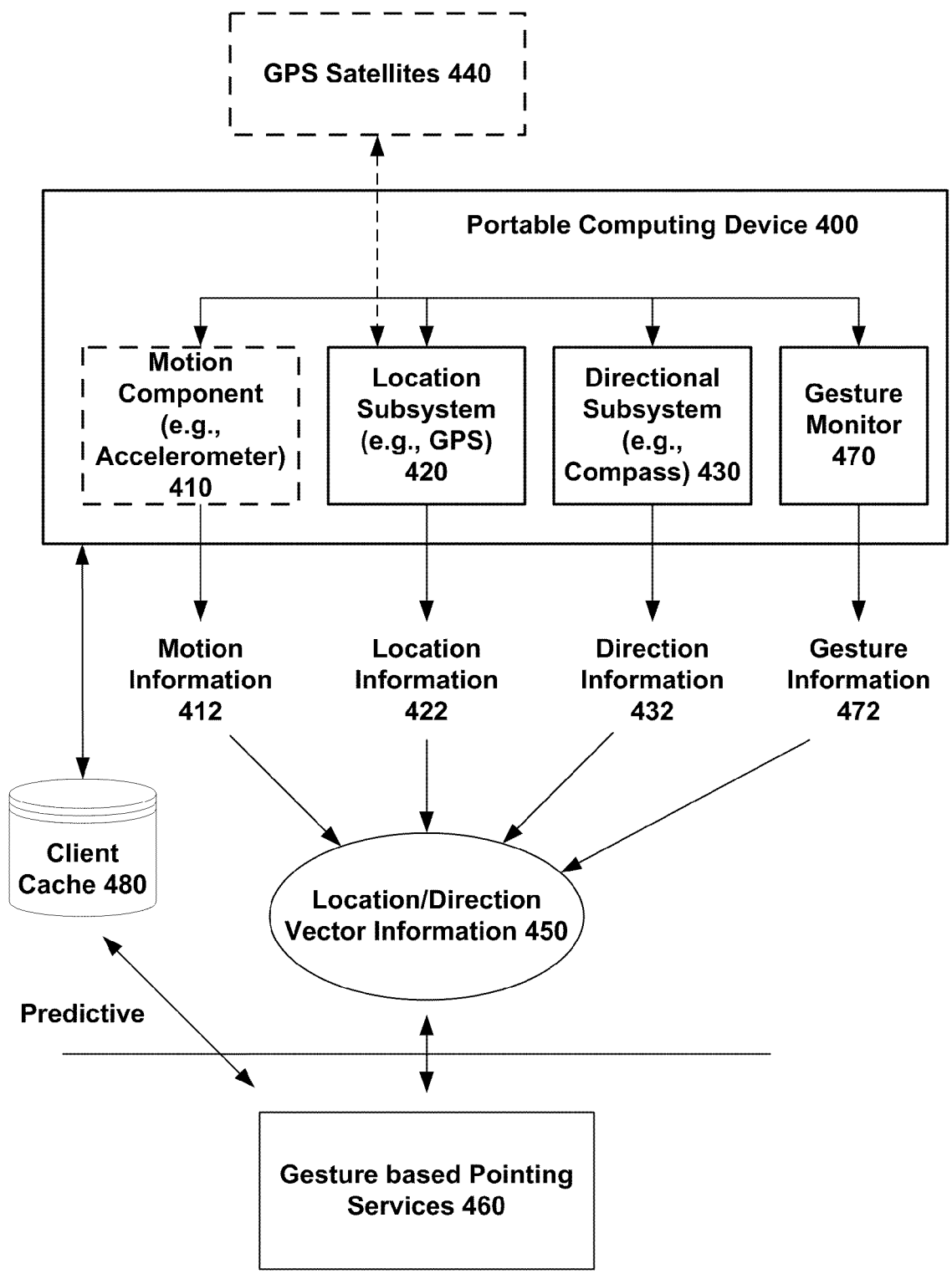
FIG. 4 illustrates a mobile computing device according to an embodiment upon which a set of gesture and direction based services can be built according to one or more embodiments.

Referring next to FIG. 4, a block diagram illustrates an exemplary portable computing device 400. In this regard, a set of services 460 are built based on motion information 412, location information 422, and/or direction information 432 collected by a mobile device, such as a phone. For instance, in an embodiment, location information 422 can be recorded by a location subsystem 420 such as a GPS subsystem communicating with GPS satellites 440. Direction or pointing information 432 can be collected by a direction subsystem 430, such as a compass, e.g., gyroscopic, magnetic, digital compass, etc. In addition, movement information 412 can be gathered by the device 400, e.g., via tower triangulation algorithms, and/or acceleration of the device 400 can be measured as well, e.g., with an accelerometer. From any one or more of the motion information 412, location information 422 and/or direction information 432, gesture information 472 can be determined by a gesture monitor component 470.

The collective information 450 can be used to gain a sense of, not only where the device 400 is located in relation to other potential points of interest tracked or known by the overall set of services 460, but to also understand in what direction the user is pointing the device 400. By ascertaining such information, the services 460 can appreciate at whom or what the user is pointing the device 400 so as to gain a sense of how the user wishes to interact with the place or point of interest via the gesture information 472.

In an aspect, gesture subsystem 470 utilizes any one or more of the motion information 412, location information 422, and/or direction information 432. In this regard, for example, not only can direction information 432 and location information 422 be used to define a set of unique gestures, but also motion information 412 (such as speed and acceleration) can be used to define a more sophisticated set of gestures.

FIG. 4 thus illustrates a gesture subsystem 470 that can be included in a device 400 to enable a host of scenarios where the user may not be able to make detailed input to the device 400 by conventional methods. In this regard, one can appreciate that a variety of algorithms could be adopted for a gesture subsystem 470. For a non-limiting example of a simple gesture, a click and aim event when in the "pointing mode" for the device 400 can result in determining a set of points of interest for the user. A client cache 480 can be included in the system. By saving information about potential points of interest in client cache 480, a user of device 400 need not always derive the benefit of the gesture based interaction from a network service 460, but rather can be satisfied locally by predictively pre-fetching information of probable interest to the device 400.

Figure 5:
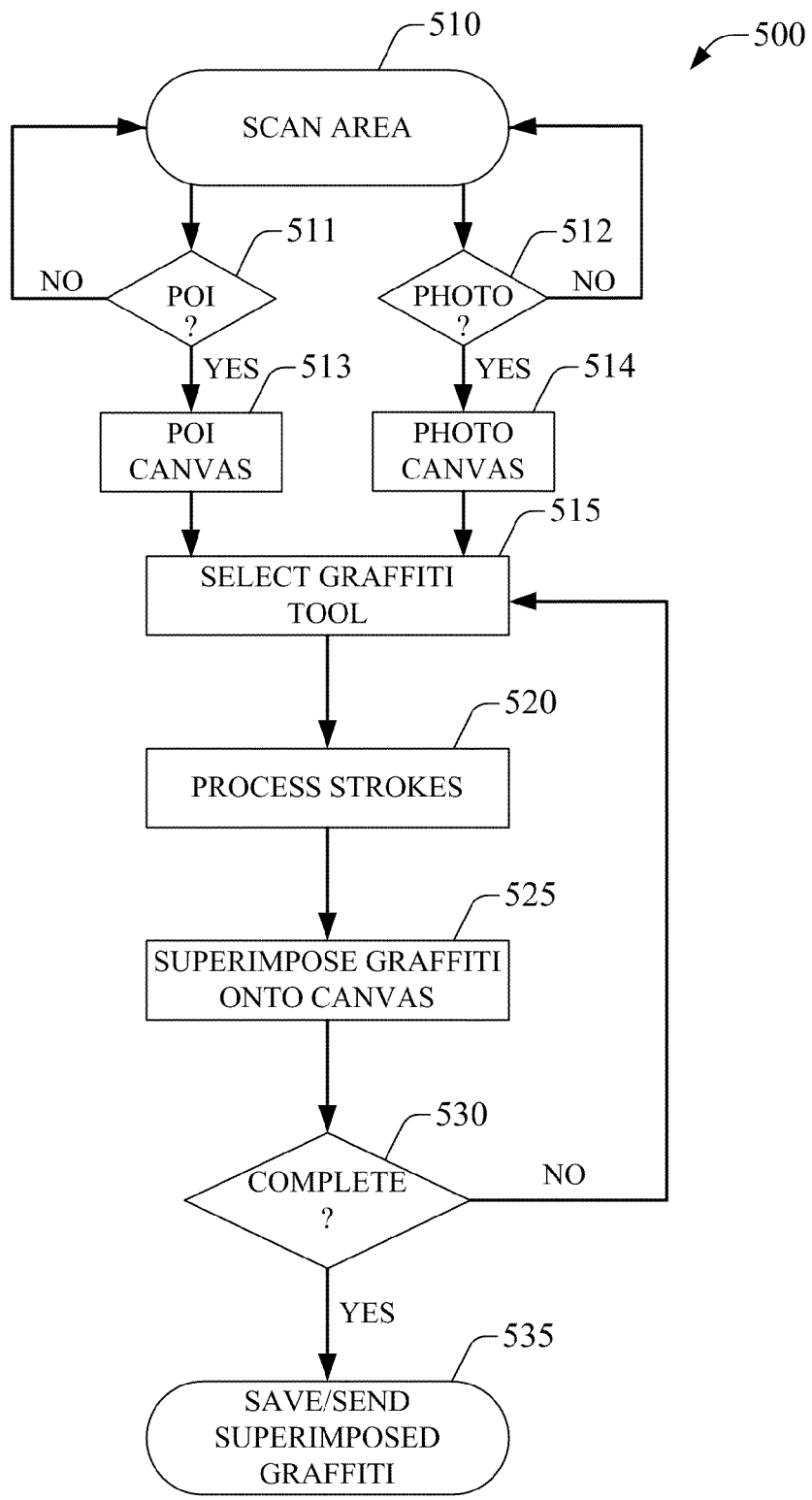
FIG. 5 is a flow diagram illustrating an exemplary methodology for superimposing digital graffiti onto a digital canvas according to an embodiment.

Referring next to FIG. 5, a flow diagram illustrates an exemplary methodology for superimposing digital graffiti onto a digital canvas. As shown, process 500 begins at step 510 where an area proximate to device 400 is scanned to ascertain a desired digital canvas. In an embodiment, such a digital canvas may correspond to particular points of interest detected by device 400. Here, one of ordinary skill will appreciate that points of interest are detectable in any of a plurality of ways. For instance, in an aspect, device 400 includes a scanning component that outputs sensory information pertaining to a signal received from entities proximate to device 400 (e.g., restaurants, theaters, trains, mobile devices, etc.). Moreover, at step 510, the scanning component scans for signals emanating from entities proximate to device 400 and outputs sensory information corresponding to any of a plurality of detected signals. Next, at step 511, process 500 determines whether any detectable signals are present. If a signal is indeed present, process 500 ascertains at least one digital canvas by processing the sensory information corresponding to the signal. However, if no signal is detected, process 500 loops back to step 510 where the area proximate to device 400 continues to be scanned.

In another embodiment, points of interest proximate to device 400 are identifiable without detecting signals emanating from the points of interest. For instance, device 400 may identify such points of interest by utilizing any combination of information from motion component 410 (e.g., an accelerometer unit), location subsystem 420 (e.g., a GPS unit), and/or directional subsystem 430 (e.g., a compass). In an aspect, device 400 transmits any combination of motion information 412, location information 422, and/or directional information 432 to an external entity via a network for further processing. Here, to facilitate interfacing with the external entity via the network, a network component may be included in device 400. Within such embodiment, the external entity is a centralized database that stores data corresponding to any of a plurality of identifiable points of interest. Moreover, the external entity utilizes information received from device 400 to identify points of interest in the database, and subsequently transmits data corresponding to the identified points of interest to device 400.

When interfacing with a network, process 500 may thus include performing step 510 externally, wherein an area proximate to device 400 is scanned as a function of motion information 412, location information 422, and/or directional information 432. Next, at step 511, process 500 determines whether any points of interest are proximate to device 400. If no point of interest is identified, process 500 loops back to step 510 where the area proximate to device 400 continues to be scanned. However, if the external entity indeed identifies a point of interest, process 500 ascertains at least one digital canvas corresponding to the point of interest, at step 513. In an aspect, the at least one digital canvas is ascertainable from the external entity via the network.

In another embodiment, device 400 ascertains a digital canvas independent of a network and/or signals emanating from points of interest. For instance, in an aspect, device 400 includes a camera. Within such embodiment, process 500 thus includes having a user manually scan an area proximate to device 400 at step 510. At step 512, process 500 then includes determining whether an image of the area obtained/obtainable by the camera is adequate. If indeed adequate, process 500 proceeds by configuring a digital canvas to include the image at step 514. Otherwise, if the image is inadequate, process 500 loops back to step 510 where the user continues to scan the area for desirable images.

After ascertaining a digital canvas, process 500 continues by selecting a desired graffiti tool at step 515. As will be discussed later with respect to FIG. 6 and FIG. 7, device 400 can provide any of a plurality of graffiti tools including an ink graffiti tool and/or an object graffiti tool. After selecting the desired graffiti tool, a processing of strokes undergone by device 400 occurs at step 520. Next, at step 525, digital graffiti corresponding to such strokes are then superimposed onto the at least one digital canvas previously identified. For instance, if utilizing an ink graffiti tool, the digital graffiti may include a two-dimensional trace of the strokes undergone by device 400. On the other hand, if utilizing an object graffiti tool, the digital graffiti may include a saved digital image corresponding to a particular stroke sequence.

After superimposing the digital graffiti onto the digital canvas, process 500 continues by determining, at step 530, whether the graffiti session is complete. If incomplete, process 500 loops back to step 515 where a user is again able to select a graffiti tool. However, if the graffiti session is indeed complete, process 500 continues to step 535 where the superimposed digital graffiti is saved/transmitted.

Figure 6:
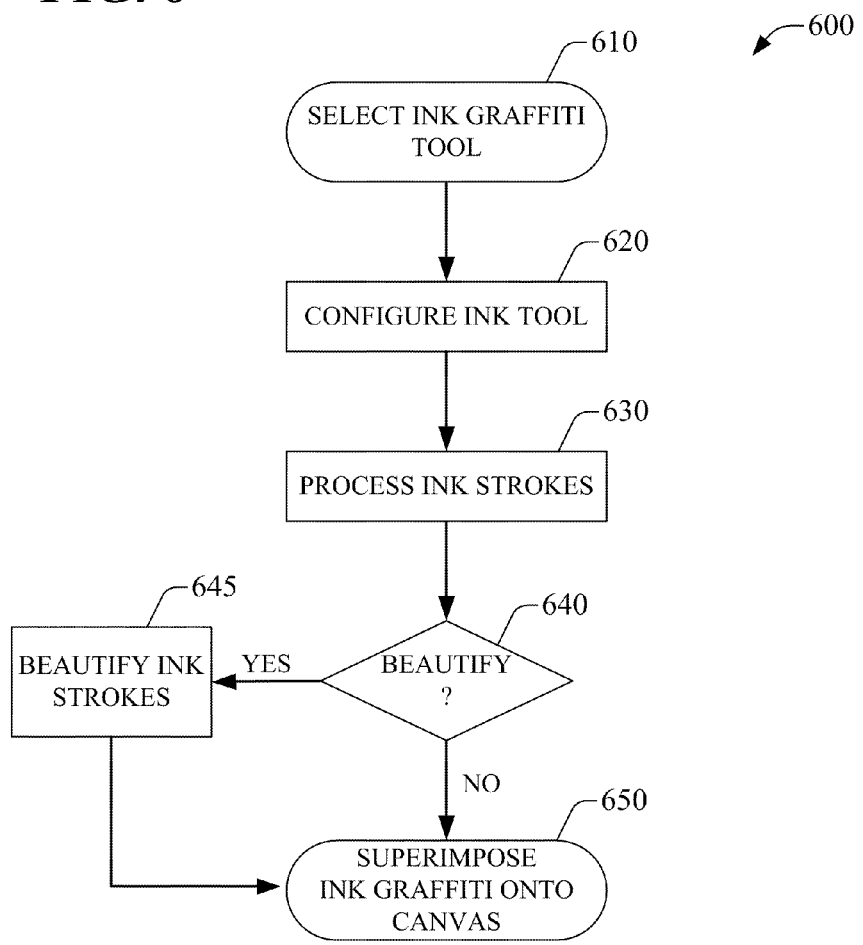
FIG. 6 is a flow diagram illustrating an exemplary methodology for utilizing an ink graffiti tool according to an embodiment.

Referring next to FIG. 6, a flow diagram illustrates an exemplary methodology for utilizing an ink graffiti tool according to an embodiment. As stated previously, digital graffiti generated via an ink graffiti tool may include a two-dimensional tracing of strokes undergone by device 400. Moreover, a user may utilize the ink graffiti tool to create two-dimensional freehand images corresponding to an in-air path undertaken by device 400 (e.g., motioning device 400 in a path that traces letters corresponding to the word "hello", a path that traces an outline of a "happy face", etc.). Here, although a two-dimensional tracing is described, it should be appreciated that another embodiment may include a three-dimensional tracing of strokes undergone by device 400, wherein the three-dimensional tracing is saved as a three-dimensional digital graffiti object.

As illustrated, process 600 begins at step 610 by selecting the ink graffiti tool. In an embodiment, the ink graffiti tool is configurable to output graffiti in any of a plurality of styles. For instance, at step 620, a user may configure the ink tool settings to trace a "graffiti path" with any of a plurality of colors (e.g., black, blue, red, etc.), patterns (e.g., solid, dashed, dotted, etc.), and/or line thicknesses. Here, although a user may manually select the desired ink tool settings, device 400 may also include a set of pre-programmed default settings (set by the user and/or the manufacturer).

At step 630, process 600 continues with the processing of strokes undergone by device 400. In an embodiment, device 400 may include a "continuity button," which a user may utilize to discontinue particular ink strokes within a given graffiti session. With respect to drawing alphanumeric characters, such a button is particularly desirable since multiple distinct strokes are often preferred. For instance, if a user desires to draw the letter "T", a first stroke (e.g., a stroke that is substantially vertical) may be separated from a second stroke (e.g., a stroke that is substantially horizontal) by releasing the continuity button between the two strokes.

In an embodiment, device 400 may also include a beautification component for performing a beautification of graffiti generated by the ink tool. Namely, because an exact freehand version of a user's graffiti may be aesthetically undesirable, a beautification component may warp/replace such undesirable portions of the user's graffiti. For instance, the beautification component may analyze data corresponding to the graffiti generated at step 630 (e.g., an image of the graffiti, temporal/sequential information about the strokes, etc.) to identify/infer portions to modify (e.g., identifying/inferring that the user drew a "happy face" and replacing the free hand version with a computerized version). Accordingly, process 600 may include a determination, at step 640, of whether to beautify portions of the user's graffiti. If beautification is indeed desired and possible, process 600 proceeds with a beautification of the user's graffiti at step 645 followed by a superimposition of the beautified graffiti onto an appropriate digital canvas at step 650. However, if at step 640 it is determined that a beautification will not occur, process 600 proceeds directly to step 650 where the user's un-beautified graffiti is superimposed onto an appropriate digital canvas.

Figure 7:
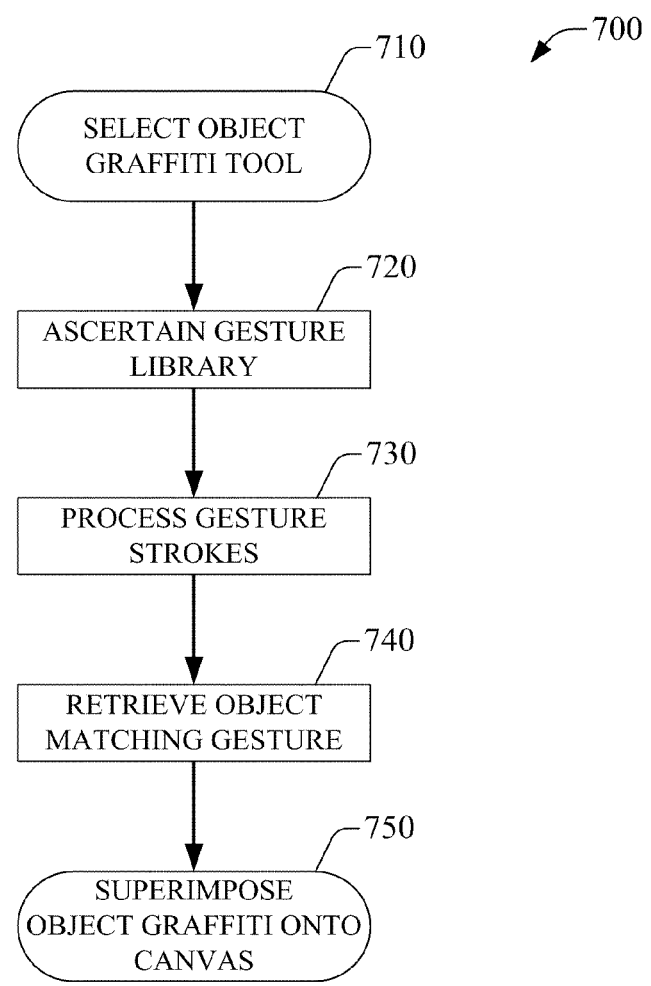
FIG. 7 is a flow diagram illustrating an exemplary methodology for utilizing an object graffiti tool according to an embodiment.

Referring next to FIG. 7, a flow diagram illustrates an exemplary methodology for utilizing an object graffiti tool according to an embodiment. As stated previously, digital graffiti generated via an object graffiti tool may include a saved digital image corresponding to a particular stroke sequence undergone by device 400. Moreover, a user may utilize the object graffiti tool as a short cut to access any of a plurality of images stored either locally or externally (e.g., a generic "happy face" image stored locally, a photo stored on a device accessible via a network, etc.).

As illustrated, process 700 begins at step 710 by selecting the object graffiti tool. In an embodiment, the object graffiti tool may have access to any of a plurality of gesture libraries, wherein the same gesture may output a different image in a different library. For instance, in a first library, a circular gesture may correspond to a "happy face" image, whereas the same circular gesture may correspond to a particular photo in a second library. Accordingly, process 700 includes ascertaining an appropriate gesture library at step 720.

Process 700 then continues at step 730 with a processing of the gesture strokes undergone by device 400. Here, as discussed with respect to process 600, device 400 may include a continuity button, which a user may utilize to discontinue particular strokes of a gesture. Indeed, since more gestures are definable with multiple distinct strokes than with single continuous strokes, including a continuity button to device 400 desirably increases the number of images accessible to the object tool.

At step 740, process 700 proceeds by retrieving the image corresponding to the gesture performed by device 400. Here, as stated previously, such an image may reside in a gesture library either within device 400 and/or within an external entity accessible via a network. Upon retrieving the desired image, process 700 proceeds by superimposing the image onto an appropriate digital canvas at step 750.

Figure 8:
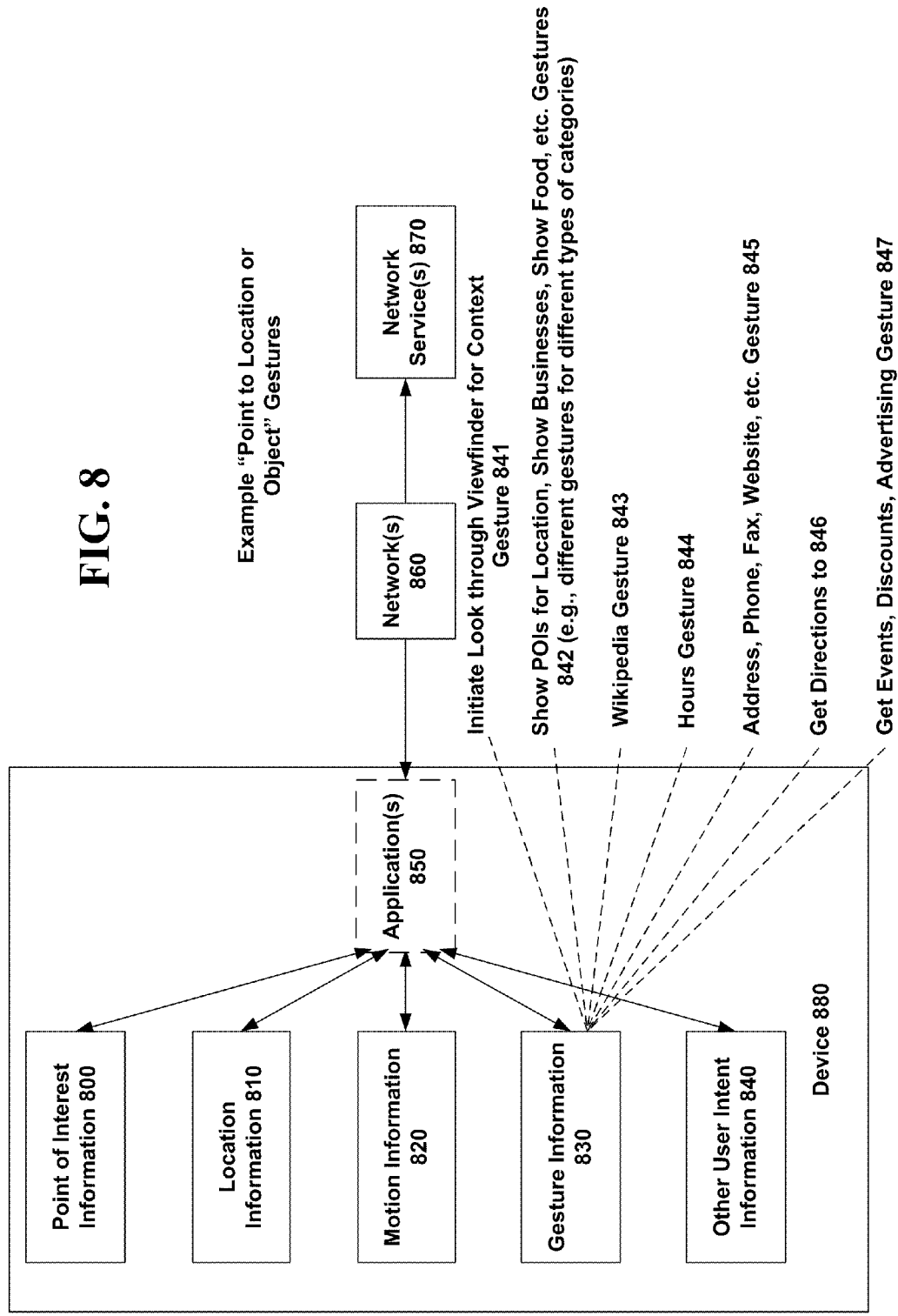
FIG. 8 illustrates that a variety of pre-defined gestures can be designed to represent gestures in a general environment having items or points of interest, or locations, that can be pointed at or to by a device.

Referring next to FIG. 8, a block diagram of a device 880 illustrates an exemplary embodiment of a variety of gesture-based actions that device 880 may undertake. Within such embodiment, these actions are based on any of point of interest information 800, location information 810, motion information 820, gesture information 830 or other user intent information 840 brokered by the device 880 to network services 870 via networks 860, and optionally via applications 850.

More specifically, FIG. 8 illustrates that a variety of pre-defined gestures can be designed to represent gestures in a general environment having items or points of interest, or locations, that can be pointed at or to by a device 880. As illustrated, such gestures may include a gesture requesting to analyze the image content of a viewfinder for context 841, as well as gestures to show particular POIs 842 (i.e., different gestures for different types of categories). In an aspect, device 880 may also undertake a Wikipedia gesture 843 (e.g., to bring up Wikipedia knowledge regarding the given POI based on an associated keyword), as well as an hours gesture 844 (e.g., to bring up current status and/or when the POI maintains business hours). Other exemplary gestures that device 880 may undertake include a gesture to request information about a POI 845 (e.g., to request an address, phone, fax, website, etc.), a gesture to request directions to a POI 846, and a gesture to retrieve events, discounts, and/or advertising associated with a POI 847.

Figure 9:
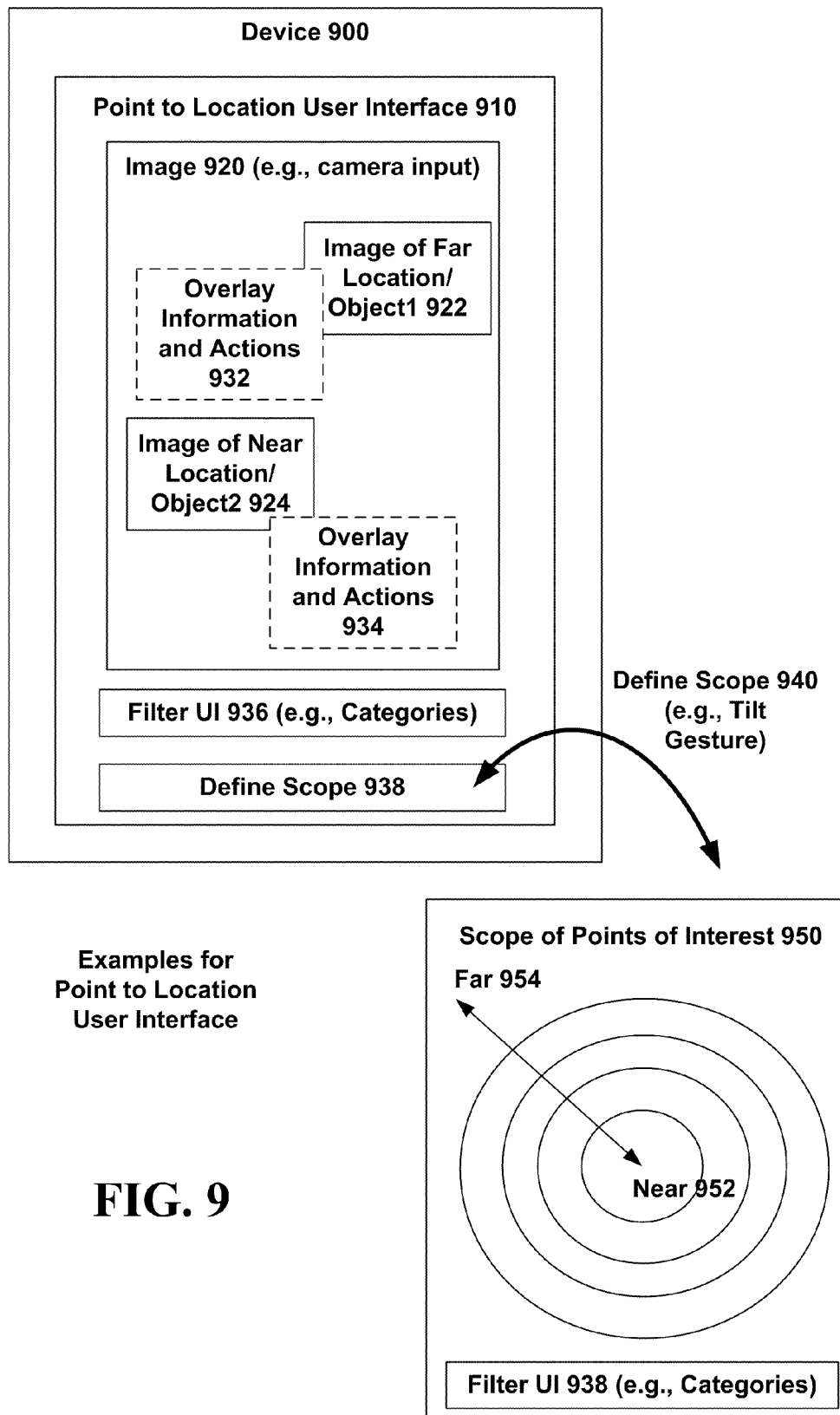
FIG. 9 is a block diagram providing a non-limiting implementation for a point to location user interface for a device.

In FIG. 9, a block diagram provides a non-limiting implementation for a point to location user interface 910 for a device 900. In an embodiment, the point to location user interface 910 includes an image section 920 (e.g., input from a camera included with the device 900), wherein various POIs 922, 924, etc. in the scene are identifiable. For instance, overlay information and actions 932, 934 can be displayed over or near the POIs 922, 924, respectively (exemplary non-limiting locations for overlay shown). Filter UI 936 allows a user of the device 900 to filter the kinds or types of POIs within the image section 920. A gesture or other explicit input can also define the scope of POIs shown in the image section 920 (e.g., the scope of POIs in terms of distance from the device 900).

In an aspect, UI 950 displays a scope of points of interest according to a user-defined scope definition 940 in which the user selects a degree of scope ranging between near 952 and far 954. Similarly, device 900 may include an elevation scope implementation to capture towering POIs (e.g., buildings, mountains, lighthouses, etc.). For this particular example, POI 922 is far whereas POI 924 is near, and so depending on how the gesture or input is made, one or the other POI may be selected based on the scope of POIs. In one embodiment, a tilt gesture achieves the desired effect. For instance, tilting the viewfinder of a camera up may extend the scope outwards, whereas tilting toward the ground may retract the scope inwards. A user may also pre-define unique gestures via a gesture definition application that helps users customize gestures.

Figure 10:
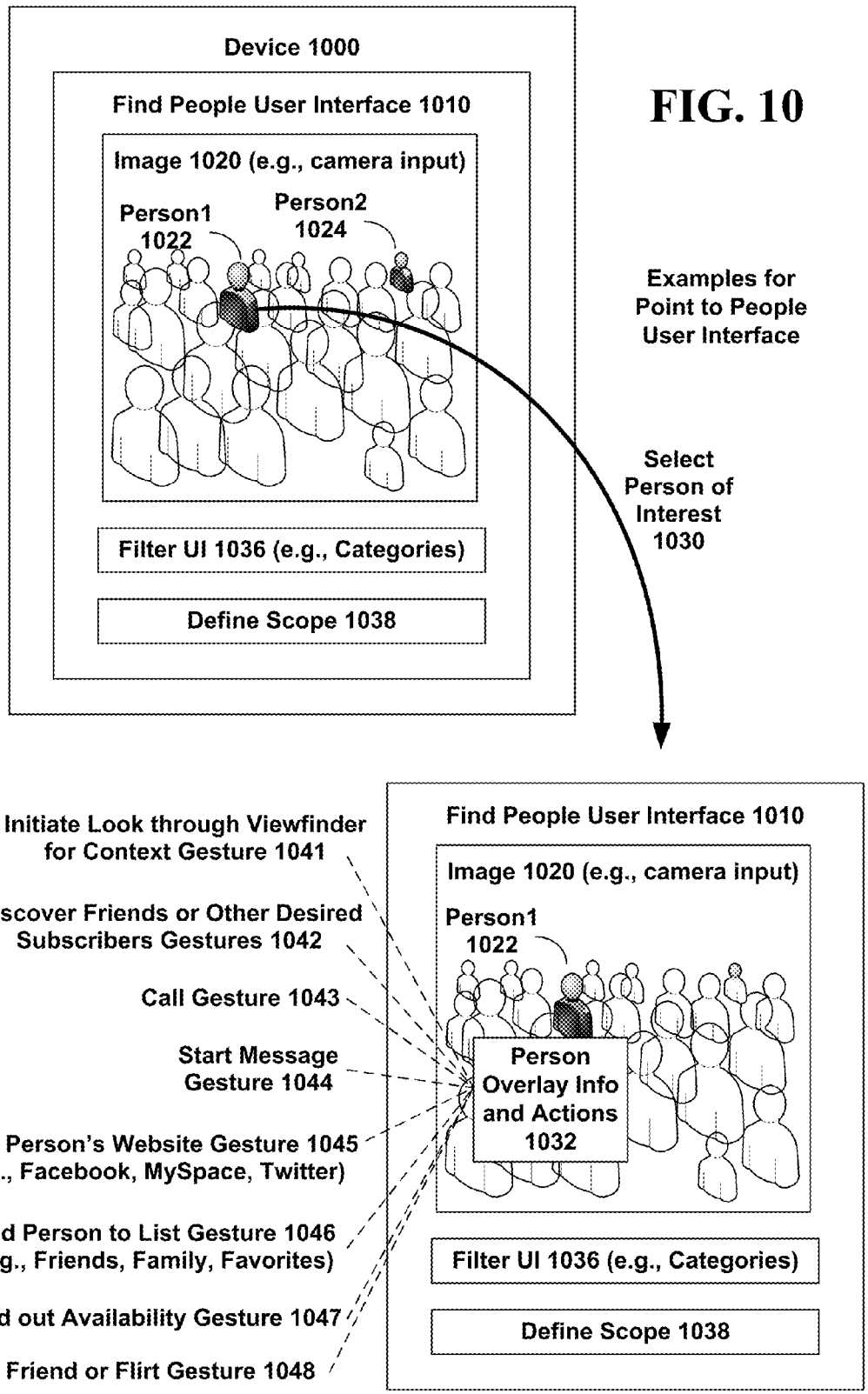
FIG. 10 is a block diagram providing a non-limiting implementation for a point to people user interface for a device.

Referring next to FIG. 10, a block diagram provides a non-limiting implementation for a point to people user interface 1010 for a device 1000. In this regard, user interface 1010 includes an image section 1020 (e.g., camera input), whereby a first person of interest 1022 and second person of interest 1024 are illustrated for simplicity of example in a crowd of people. Here again, a filter UI 1036 is used to sort categories and a scope definition UI 1038 is used to help define the scope of physical space encompassed by the POI discovery. In the present example, a gesture towards a given person could initiate an action or interaction in relation to that user. In so doing, a selection of a person of interest, such as person of interest 1022, results in a display of overlay information and actions 1032 over or nearby the selected person of interest.

Upon selecting a person, a user can initiate various actions by performing any of a plurality of pre-defined or user-defined gestures. For instance, a user may initiate a "look through viewfinder for context" application by performing gesture 1041; a "discover friends or other desired subscribers" application by performing gesture 1042; a "call person" application by performing gesture 1043, a "start message" application by performing gesture 1044; a "view person's website" application by performing gesture 1045 (e.g., Facebook, MySpace, Twitter); an "add person to contact list" application by performing gesture 1046 (e.g., Friends, Family, Favorites); a "find out schedule availability" application by performing gesture 1047; and/or a "friend or flirt" application by performing gesture 1048 (e.g., make a heart shape in 2-D with the device with respect to a person).

Exemplary Digital Graffiti Implementations

One of ordinary skill will appreciate that a user may create digital graffiti of various styles and forms. One of ordinary skill will also appreciate that the subsequent superimposition of such digital graffiti onto a digital canvas can include any of various types of digital canvasses. To facilitate a better understanding of the numerous potential digital graffiti implementations, the following discussion describes various non-limiting embodiments illustrating exemplary combinations of different forms of digital graffiti and different types of digital canvasses.

Figure 11:
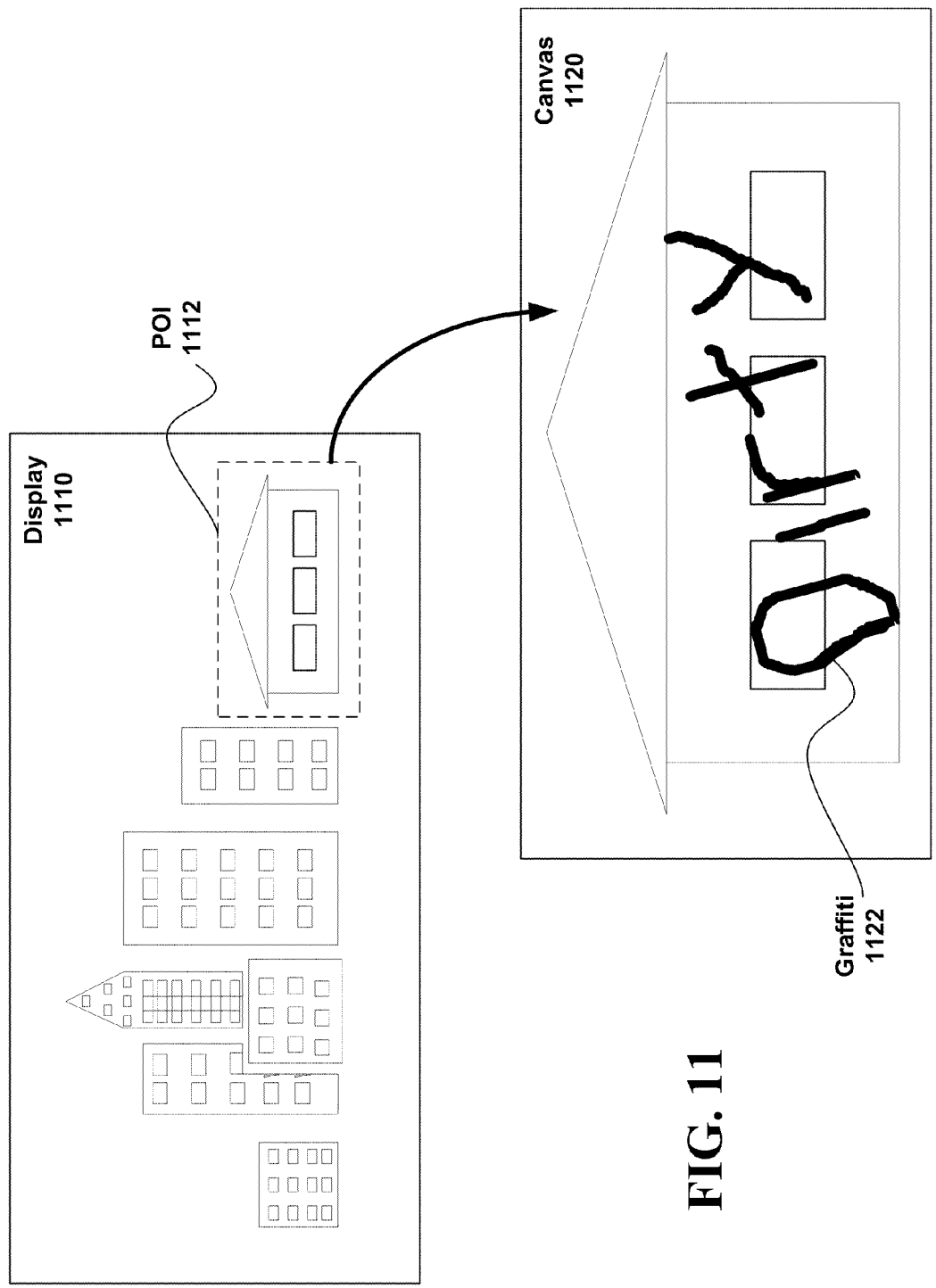
FIG. 11 illustrates an exemplary utilization of an ink tool for superimposing free-hand digital graffiti onto a photographic digital canvas corresponding to a stationary entity.

Referring first to FIGS. 11-14, exemplary implementations include digital graffiti created within the context of a restaurant scenario. For instance, FIG. 11 illustrates an exemplary superimposition of free-hand digital graffiti 1122 onto a photographic digital canvas 1120 of a restaurant. Within such embodiment, a user may point the device towards an area that includes a particular restaurant, wherein the device displays the restaurant as a point of interest 1112 within the device's display 1110. As stated previously, point of interest 1112 is ascertainable in any of a plurality of ways. For example, ascertaining point of interest 1112 may result from the device sensing a signal emanating from the restaurant and/or processing device-specific information (e.g., any combination of the device's direction information, motion information, and position information).

In various embodiments, a derivation of photographic digital canvas 1120 utilizes a photo originating from any of a plurality of locations. For instance, in a first embodiment, digital canvas 1120 may originate from a photo provided by the restaurant, wherein the device receives the digital canvas 1120 directly from a signal emanating from the restaurant. In another embodiment, digital canvas 1120 originates from an external entity accessible via a network. In yet another embodiment, a user may simply take a photo of the restaurant, wherein the photo itself serves as digital canvas 1120.

Figure 12:
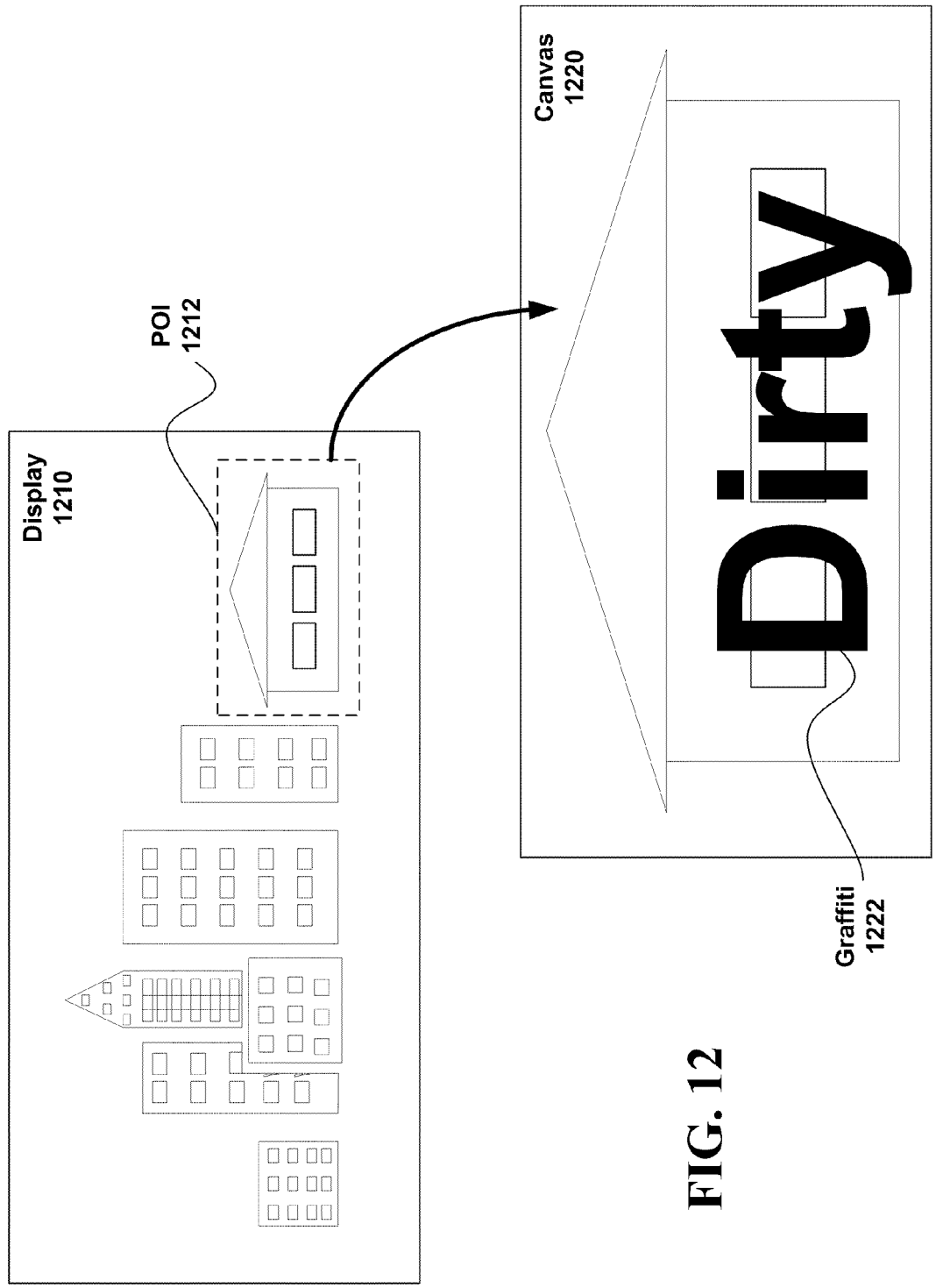
FIG. 12 illustrates an exemplary beautification of the free-hand digital graffiti of FIG. 11.

As stated previously, a user may utilize any of various tools to create digital graffiti. For instance, an unsatisfied customer of the restaurant may utilize an ink graffiti tool to superimpose the word "DIRTY" as free-hand graffiti 1122 onto digital canvas 1120, as shown in FIG. 11. FIG. 12 illustrates an exemplary beautification 1222 of free-hand graffiti 1122, wherein the device superimposes beautification 1222 onto digital canvas 1220.

Figure 13:
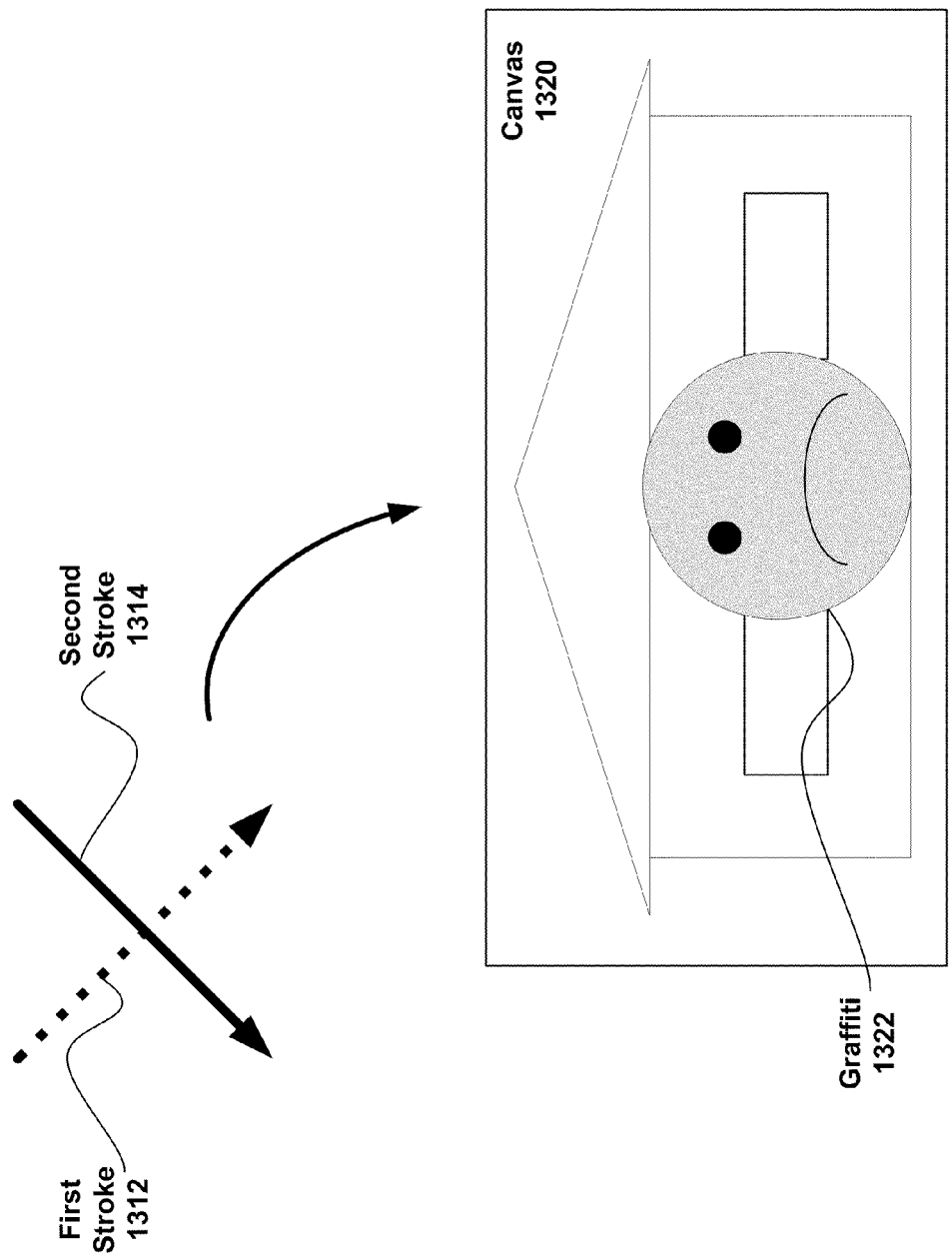
FIG. 13 illustrates an exemplary utilization of an object tool for superimposing a generic digital graffiti object onto a photographic digital canvas corresponding to a stationary entity.

In another embodiment, a user may utilize an object graffiti tool to retrieve any of a plurality of generic images stored either locally or externally. Moreover, a user may access generic images stored within an internal/external library by performing particular gestures. For instance, as illustrated in FIG. 13, the customer may superimpose a generic image 1322 of a "sad face" onto digital canvas 1320. To retrieve generic image 1322, the user may have to perform a particular library-specific gesture corresponding to generic image 1322. For example, as shown in FIG. 13, such a gesture may include a first stroke 1312 in a substantially southeast direction followed by a second stroke 1314 in a substantially southwest direction. Here, as stated previously, a user may utilize a continuity button to provide a "path break" between stroke 1312 and stroke 1314.

Figure 14:
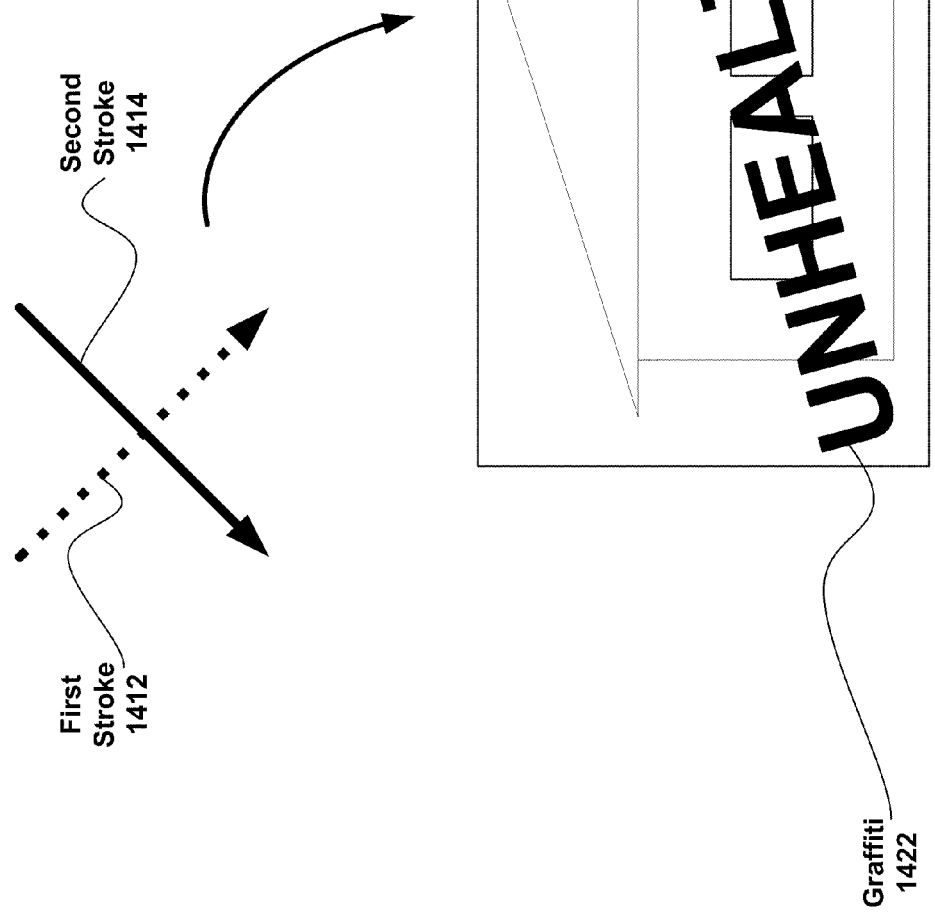
FIG. 14 illustrates an exemplary utilization of an object tool for superimposing a custom digital graffiti object onto a photographic digital canvas corresponding to a stationary entity.

In yet another embodiment, a user may utilize the object graffiti tool to retrieve any of a plurality of customized images, which are also stored either locally or externally. FIG. 14, for example, exemplifies a scenario whereby a health inspector visits an unsanitary restaurant. In this scenario, it may be desirable for the health inspector to generate graffiti that is unique and readily distinguishable from graffiti generated by other users. To facilitate generating such graffiti, the health inspector may be given secure access to a library of authenticated images (e.g., images with an official seal), wherein each image is retrievable via a unique gesture. For instance, retrieving graffiti 1422 corresponding to an authenticated "UNHEALTHY" assessment by the health inspector may require performing a unique gesture that superimposes graffiti 1422 onto digital canvas 1420. As illustrated, such unique gesture may include a first stroke 1412 in a substantially southeast direction followed by a second stroke 1414 in a substantially southwest direction. Here, although strokes 1412 and 1414 are essentially the same as strokes 1312 and 1314, the respective outputs from these gestures are differentiable if different libraries are used. For example, whereas strokes 1312 and 1314 may correspond to a "sad face" stored locally, strokes 1412 and 1414 may correspond to an "official sealed assessment" stored externally on a secure site.

In an aspect, a user may save and/or transmit graffiti 1122, 1222, 1322, and/or 1422. Here, one of ordinary skill will appreciate that such graffiti can be saved and/or transmitted with or without a particular digital canvas. Indeed, because it may sometimes be desirable to superimpose graffiti onto different digital canvasses, a user may wish to save such graffiti without a particular canvas. One of ordinary skill will further appreciate that saved graffiti may also include metadata for the graffiti (e.g., authorship information, date of creation, hyperlink to user's website, audio, etc.).

Figure 15:
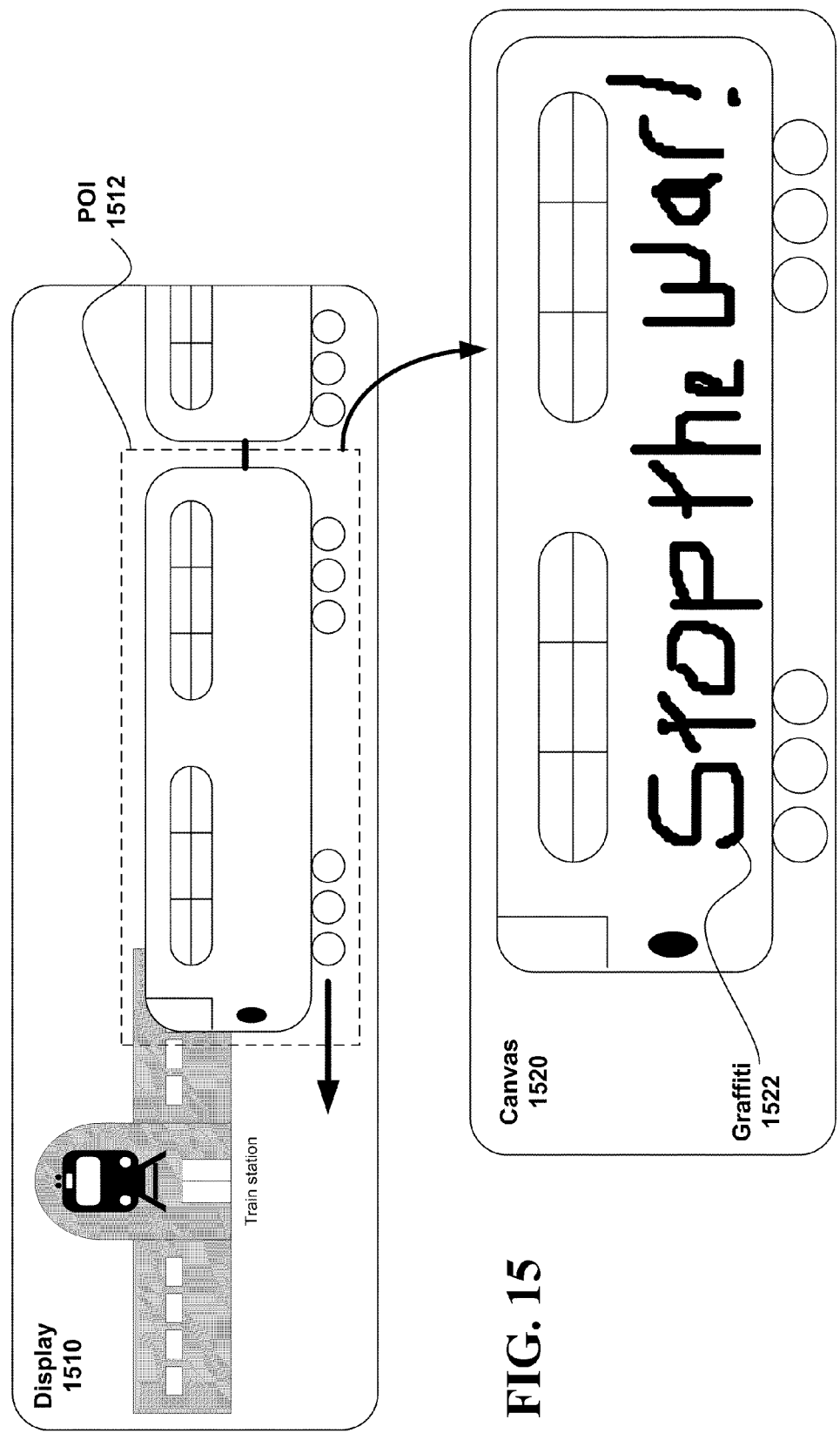
FIG. 15 illustrates an exemplary utilization of an ink tool for superimposing free-hand digital graffiti onto a photographic digital canvas corresponding to a mobile entity.

Referring next to FIGS. 15-18, exemplary implementations include superimposing digital graffiti onto a digital canvas corresponding to a mobile object. For instance, FIG. 15 illustrates an exemplary superimposition of free-hand digital graffiti 1522 onto a photographic digital canvas 1520 of a train. Within such embodiment, a user may point the device towards an area that includes the train, wherein the device displays the train as a point of interest 1512 within the device's display 1510. For this particular example, similar to the aforementioned restaurant example, ascertaining point of interest 1512 may result from the device sensing a signal emanating from the train and/or processing device-specific information (e.g., any combination of the device's direction information, motion information, and position information).

In an aspect, photographic digital canvas 1520 is a "shared" canvas upon which any of a plurality of users may view and/or superimpose graffiti. For instance, a user's device may receive digital canvas 1520 (either directly from a signal emanating from the train and/or from a network entity that processes any combination of the device's location information, motion information, and/or direction information), wherein digital canvas 1520 already includes graffiti generated by a previous user. Accordingly, graffiti superimposed onto digital canvas 1520 may comprise an evolving collage of individual graffiti entries from different users. This collage of graffiti entries may thus "follow" the train wherever it goes, wherein the parameters of each graffiti entry may be managed by the canvas owner/administrator. For example, to ensure that graffiti space is always available, a city may configure digital canvas 1520 such that individual graffiti entries vanish after a pre-determined span of time and such that no entry exceeds a pre-determined dimensional threshold.

Figure 16:
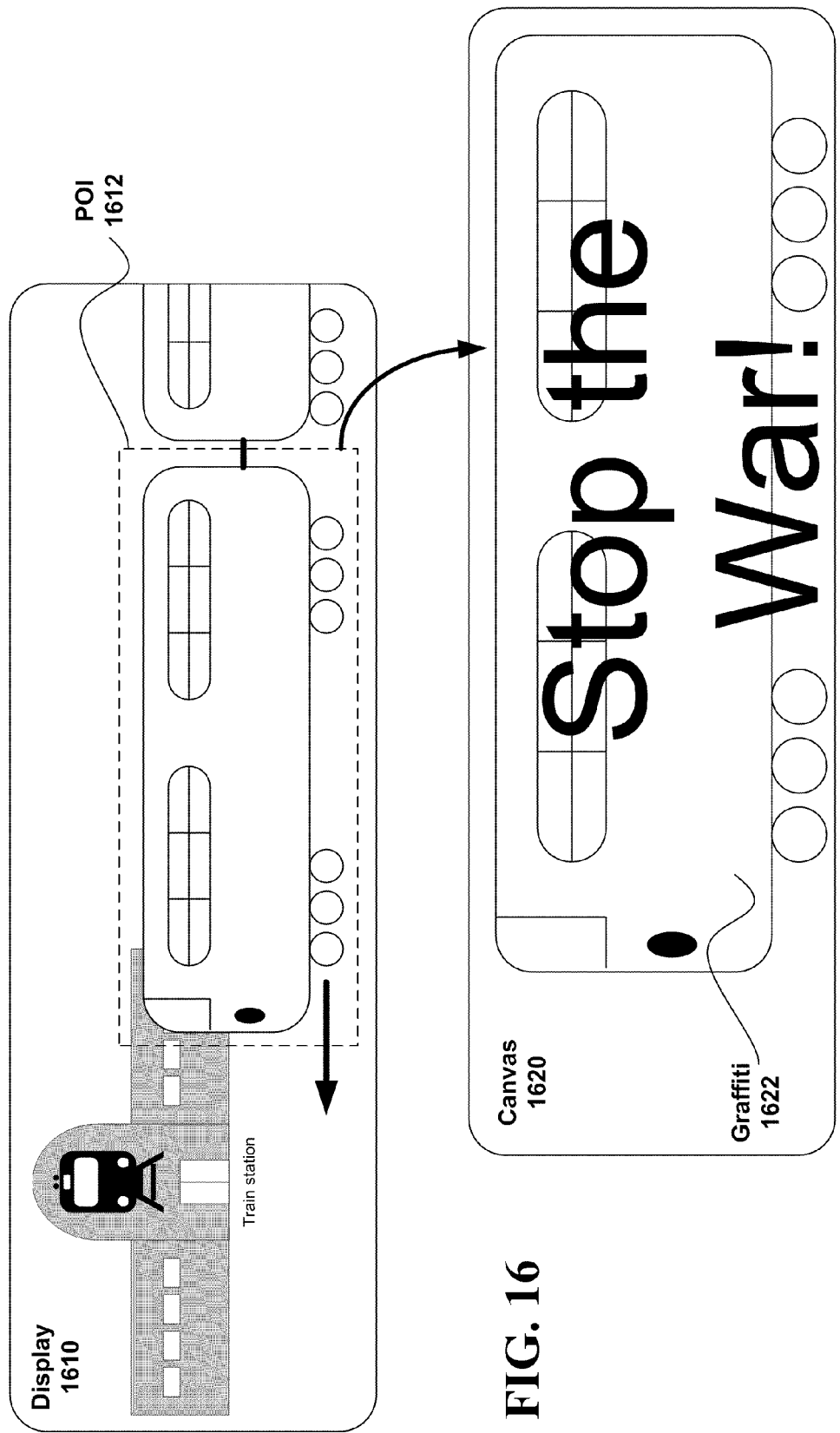
FIG. 16 illustrates an exemplary beautification of the free-hand digital graffiti of FIG. 15.

As stated previously, a user may again utilize any of various tools to create digital graffiti. For instance, an anti-war activist may utilize an ink graffiti tool to superimpose the phrase "STOP THE WAR!" as free-hand graffiti 1522 onto digital canvas 1520, as shown in FIG. 15. FIG. 16 illustrates an exemplary beautification 1622 of free-hand graffiti 1522, wherein the device superimposes beautification 1622 onto digital canvas 1620. In an aspect, a user may toggle between any of a plurality of different fonts when utilizing the beautification feature (i.e., the font shown for beautification 1622 is interchangeable with other fonts).

Figure 17:
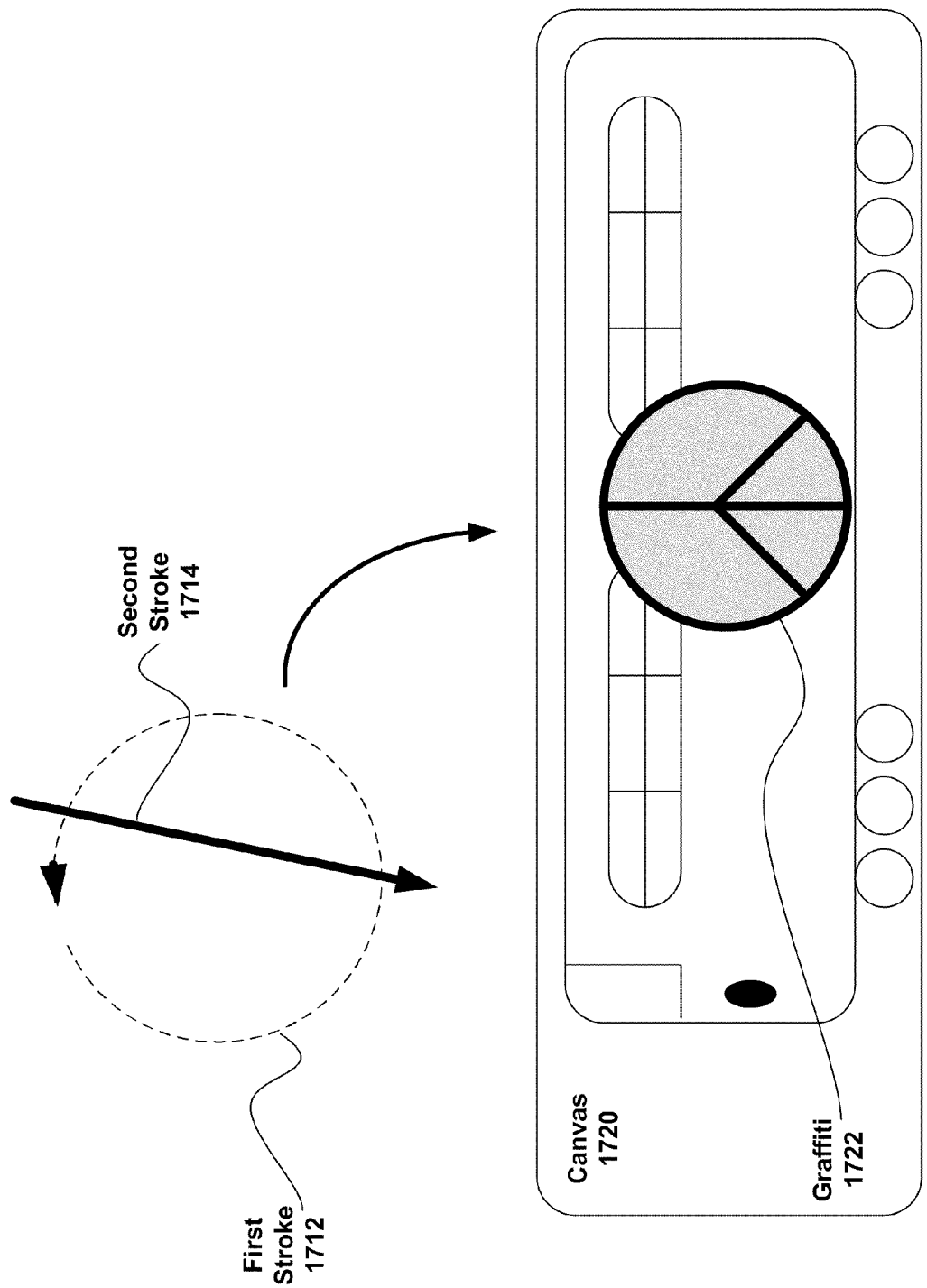
FIG. 17 illustrates an exemplary utilization of an object tool for superimposing a generic digital graffiti object onto a photographic digital canvas corresponding to a mobile entity.

As illustrated in FIG. 17, a user may also utilize an object graffiti tool to retrieve any of a plurality of generic images. For this particular example, the anti-war activist may superimpose a generic image 1722 of a "peace" sign onto digital canvas 1720. Within such embodiment, a user may retrieve generic image 1722 by performing a particular library-specific gesture corresponding to generic image 1722. For example, as shown in FIG. 17, such a gesture may include a first stroke 1712 in a substantially counterclockwise direction followed by a second stroke 1714 directed substantially downwards.

Referring next to FIG. 18, an exemplary illustration demonstrates how a user may utilize the object graffiti tool to retrieve a customized image. Here, prior to seeing a train, the anti-war activist may have already saved graffiti 1822 onto the network or his/her device. For instance, the anti-war activist may have spent a substantial amount of time developing graffiti 1822 at home with tools that are perhaps unavailable on the device. It should thus be appreciated that digital graffiti, as described herein, is not restricted to sensor-based graffiti generation. Here, for example, graffiti 1822 may take the form of a personalized banner created on a PC (i.e., independent of the sensor-based electronics of the mobile device) in which people leave comments/notes on that can either be discovered broadly or just shared amongst friends.

Once developed, the user might transfer graffiti 1822 onto a personal library on the device, wherein a unique gesture superimposes graffiti 1822 onto digital canvas 1820. For this particular embodiment, the unique gesture corresponds to a single continuous stroke comprising two sub-strokes, 1812 and 1814 (i.e., no break between sub-strokes facilitated by a continuity button). Moreover, as illustrated, the unique gesture includes a first sub-stroke 1812 in a substantially southeast direction followed by a second sub-stroke 1814 in a substantially northeast direction.

Figure 19:
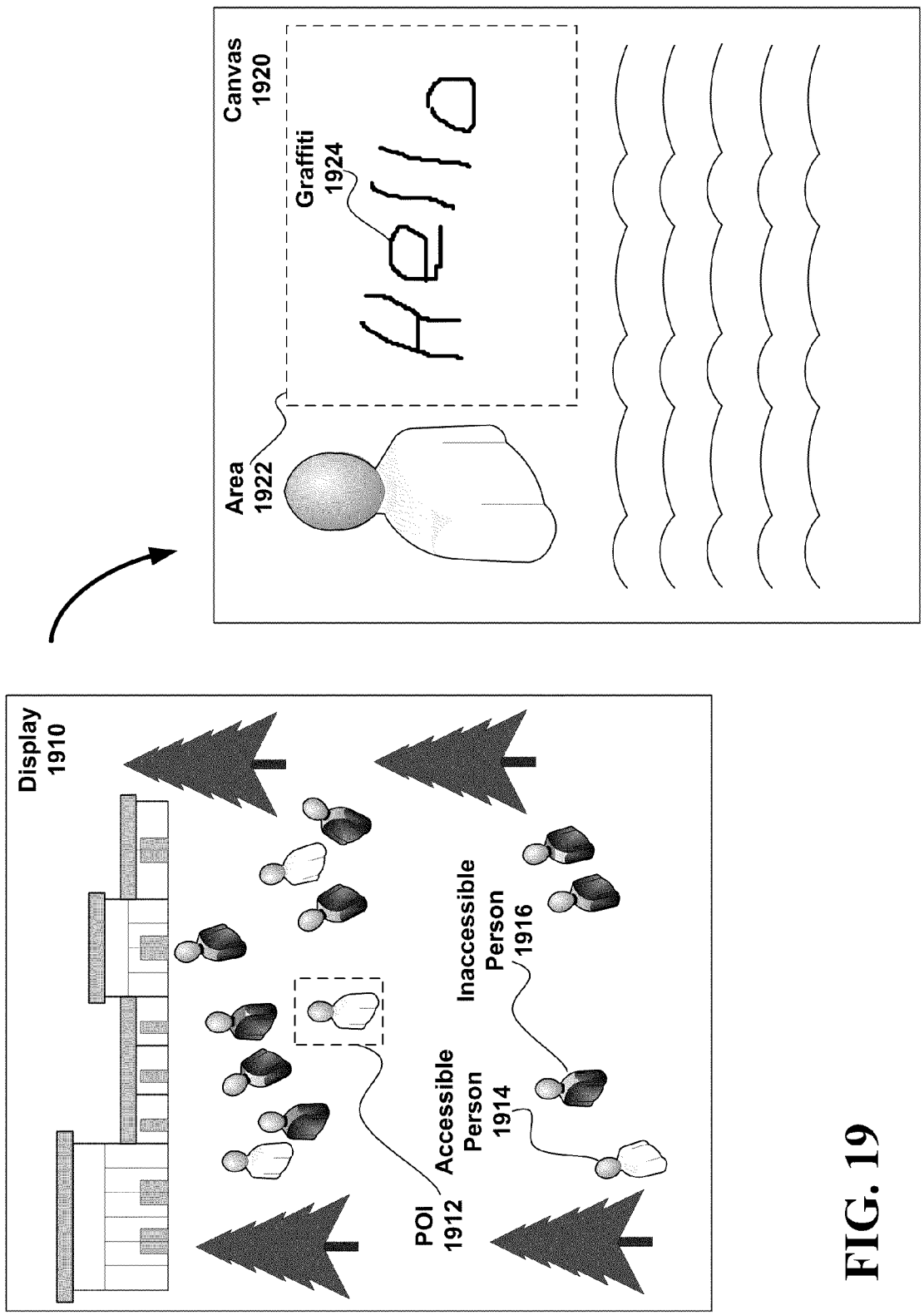
FIG. 19 illustrates an exemplary utilization of an ink tool for superimposing free-hand digital graffiti onto a canvas residing on an individual's digital profile.

Referring next to FIGS. 19-22, exemplary implementations include digital graffiti for interacting with people in a social setting. For instance, FIG. 19 illustrates an exemplary superimposition of free-hand graffiti 1924 onto a canvas 1920 corresponding to a target person's digital profile. To facilitate launching canvas 1920, a user may point the device towards an area that includes a plurality of accessible people 1914 (i.e., people with identifiable devices) and inaccessible people 1916 (i.e., people without identifiable devices). Here, as illustrated, the device may display any of accessible people 1914 as the target person 1912 within the device's display 1910. Similar to the aforementioned examples, ascertaining point of interest 1912 may result from the device sensing a signal emanating from the target person's device and/or processing information specific to the user's device (e.g., any combination of direction information, motion information, and position information from the user device).

For this particular embodiment, a graffiti area 1922 is included within canvas 1920. To this end, one of ordinary skill will appreciate that the derivation of digital canvas 1920 may occur in any of a plurality of locations. For instance, in a first embodiment, a user's device generates canvas 1920 upon receiving a target person's profile directly from the target person's device. In another embodiment, a target person's device generates digital canvas 1920 and emanates a signal that includes canvas 1920 to an area proximate to the target person's device. In yet another embodiment, an external entity accessible via a network stores a plurality of digital profiles and subsequently generates an appropriate canvas 1920 for a selected target person upon request (e.g., a digital profile from a social networking website).

Figure 20:
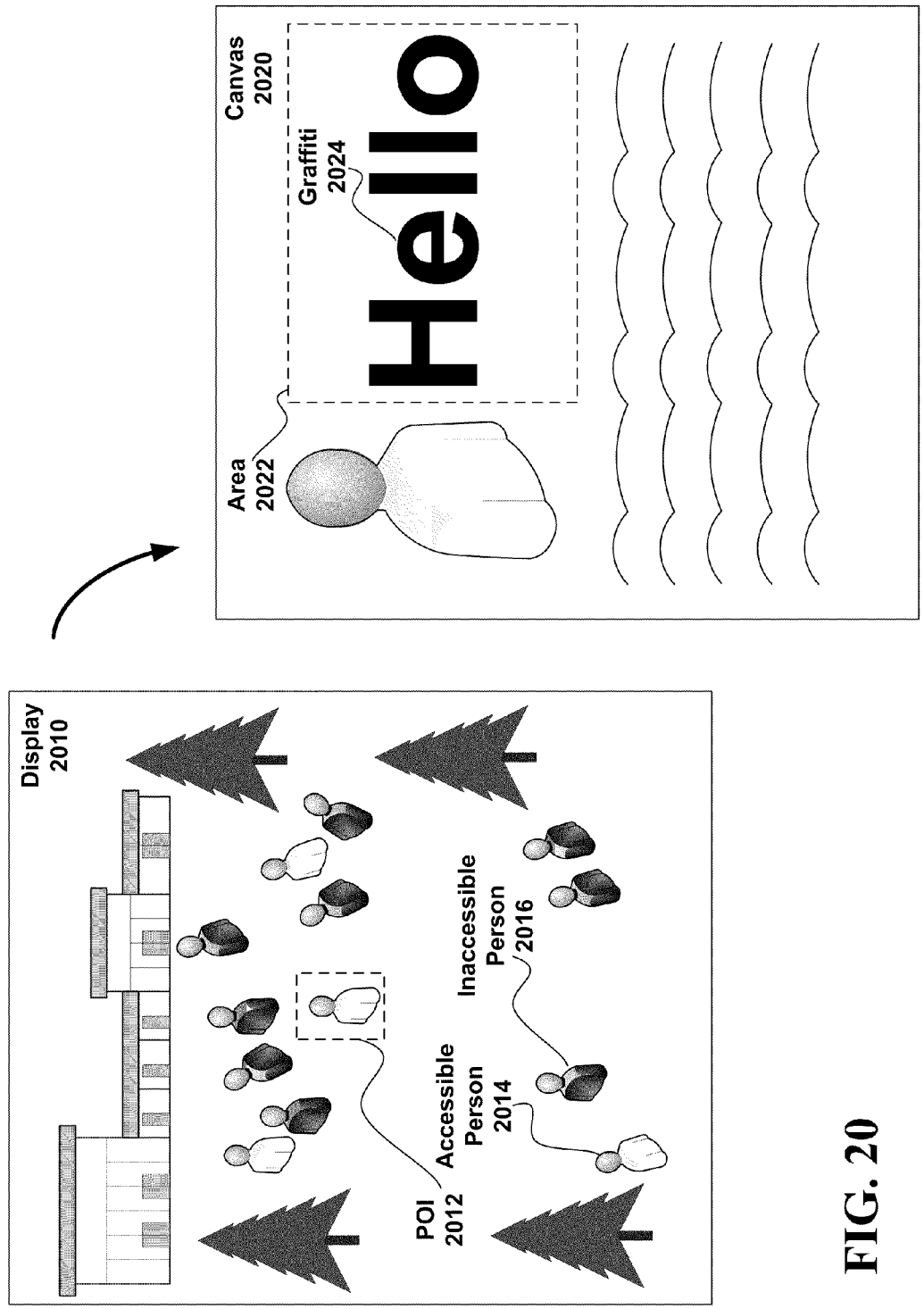
FIG. 20 illustrates an exemplary beautification of the free-hand digital graffiti of FIG. 19.

In an exemplary scenario, a user may wish to initiate a conversation with a target person. To facilitate such conversation, the user may create digital graffiti 1924 with an ink graffiti tool. For instance, a user may utilize the ink graffiti tool to superimpose the word "HELLO" as free-hand graffiti 1924 onto graffiti area 1922, as shown in FIG. 19. FIG. 20 illustrates an exemplary beautification 2024 of graffiti 1924, wherein canvas 2020 includes beautification 2024 superimposed on graffiti area 2022.

In a related scenario, a user may wish to flirt with a target person. To facilitate such flirtation, the user may create digital graffiti 2124 with an object graffiti tool, as illustrated in FIG. 21. For this particular example, the user may superimpose a generic image 2124 of a "kiss" onto graffiti area 2122 of digital canvas 2120. Within such embodiment, the user may retrieve generic image 2124 by performing a particular library-specific gesture corresponding to generic image 2124. For example, as shown in FIG. 21, such a gesture may include a first stroke 2112 in a substantially upward direction followed by a second stroke 2114 also directed substantially upwards.

Referring next to FIG. 22, an exemplary illustration demonstrates how a user may utilize the object graffiti tool to retrieve a customized image. For this particular example, customized image 2224 includes a photo of the user surrounded with hearts, as shown. Here, the user might retrieve image 2224 from either a personal library on the user's device or an external library on a network, wherein a unique gesture superimposes image 2224 onto area 2222 of canvas 2220. For this particular embodiment, the unique gesture includes a first stroke 2212 in a substantially counterclockwise direction followed by a second stroke 2214 directed in a substantially clockwise direction.

Figure 23:
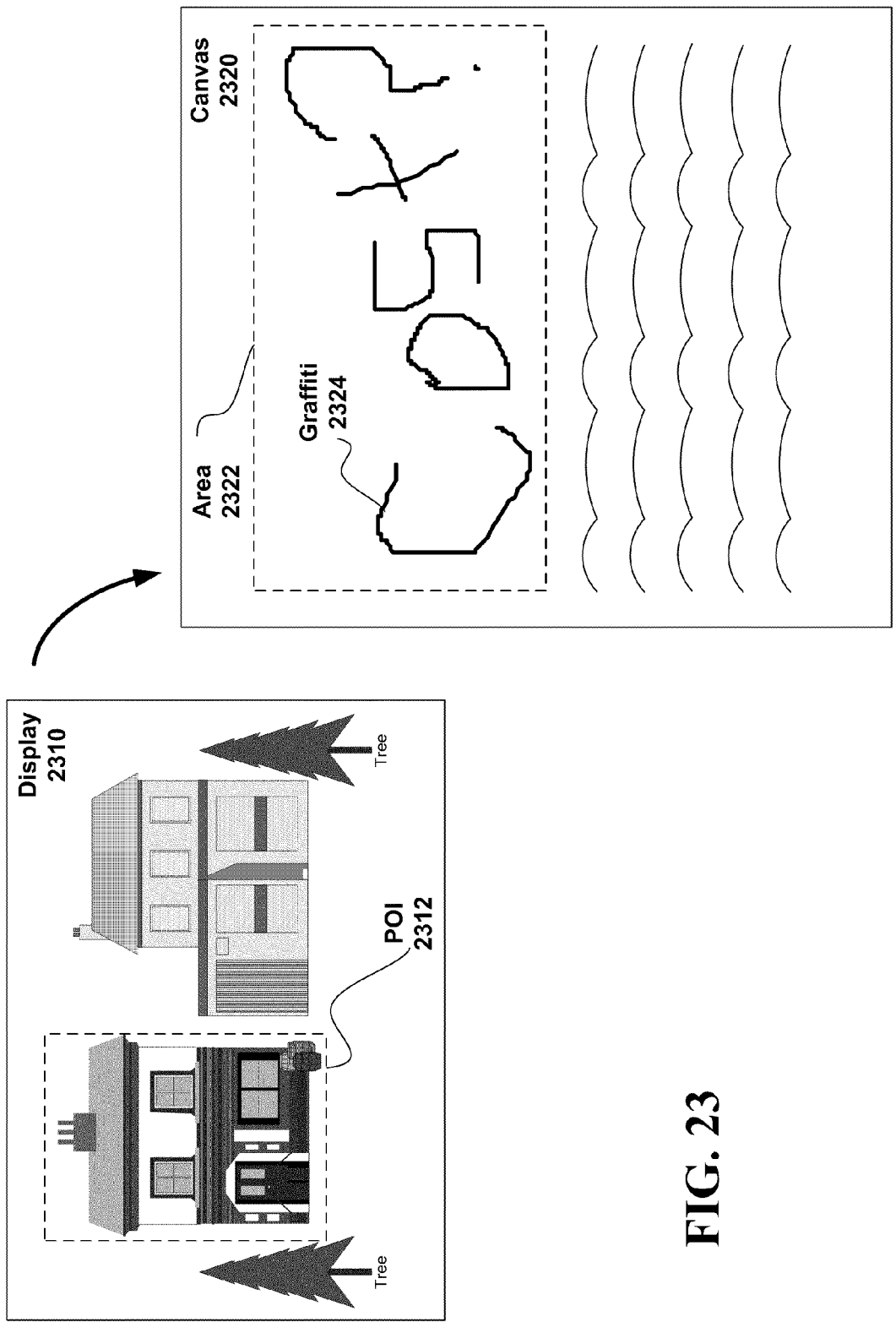
FIG. 23 illustrates an exemplary utilization of an ink tool for superimposing free-hand digital graffiti onto a canvas residing on a real estate property's digital profile.

Referring next to FIGS. 23-26, exemplary implementations include digital graffiti created within the context of purchasing real estate. For instance, FIG. 23 illustrates an exemplary superimposition of free-hand graffiti 2324 onto a canvas 2320 corresponding to a particular real estate property. To facilitate launching canvas 2320, a user may point the device towards a group of houses that includes a particular house of interest 2312 displayed within the device's display 2310.

One of ordinary skill will appreciate that the prospective buyer's device may identify house of interest 2312 in any of a plurality of ways. For instance, in an embodiment, a real estate agent may embed a transmitter that emanates identifiable information within house of interest 2312. For such embodiment, the prospective buyer's device may sense the emanated signal to identify house of interest 2312. In another embodiment, rather than embedding house of interest 2312 with a transmitter, the prospective buyer's device identifies house of interest 2312 as function of the device's direction information, motion information, and/or position information.

In an aspect, canvas 2320 is again ascertainable in any of plurality of ways, wherein graffiti area 2322 may be included, as shown. In a first embodiment, a prospective buyer's device generates canvas 2320 upon receiving purchase information via the embedded transmitter. In another embodiment, the embedded transmitter emanates a signal that includes canvas 2320 to an area proximate to house of interest 2312. In yet another embodiment, a centralized website may store a plurality of profiles for available properties, wherein the prospective buyer's device receives an appropriate canvas 2320 from the website upon request (e.g., a digital profile from a multiple listings service website).

Figure 24:
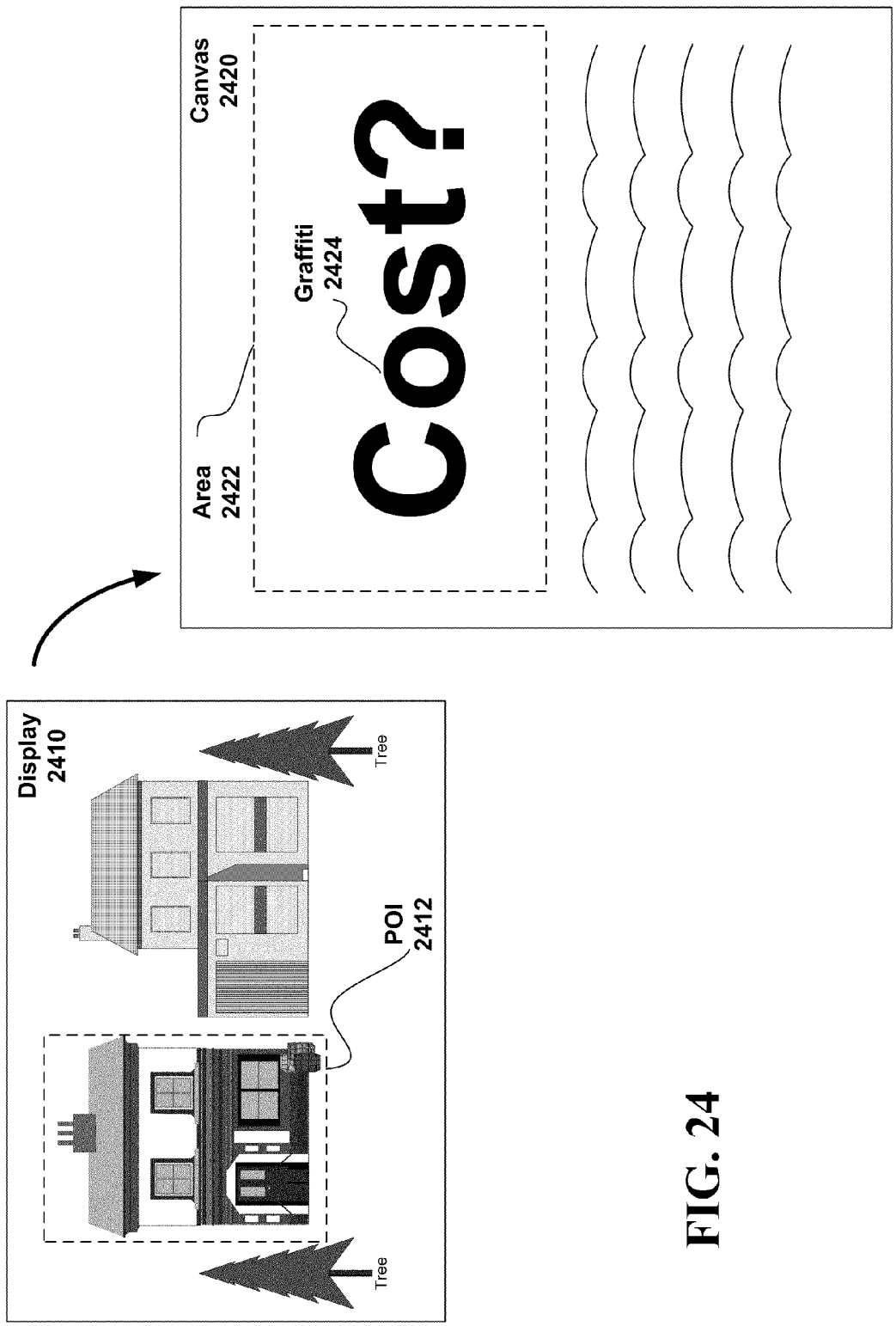
FIG. 24 illustrates an exemplary beautification of the free-hand digital graffiti of FIG. 23.

In an exemplary scenario, a user may wish to know the asking price for house of interest 2312. To facilitate such a query, the user may create digital graffiti 2324 with an ink graffiti tool. For instance, a user may utilize the ink graffiti tool to superimpose the phrase "COST?" as free-hand graffiti 2324 onto graffiti area 2322, as shown in FIG. 23. FIG. 24 illustrates an exemplary beautification 2424 of graffiti 2324, wherein canvas 2420 includes beautification 2424 superimposed on graffiti area 2422.

However, the prospective buyer may create digital graffiti 2524 with an object graffiti tool, as illustrated in FIG. 25. For this particular example, the prospective buyer may superimpose a generic image 2524 which displays "$?" onto graffiti area 2522 of canvas 2520. Indeed, within such embodiment, a shortcut gesture corresponding to generic image 2524 may desirably provide the prospective buyer with a convenient alternative to performing a more tedious gesture with the ink graffiti tool. For example, as shown in FIG. 25, such a gesture may include a first stroke 2512 in a substantially downward direction followed by a second stroke 2514 also directed substantially downwards.

Referring next to FIG. 26, an exemplary illustration demonstrates how the prospective buyer may utilize the object graffiti tool to retrieve a customized image. For this particular example, customized image 2624 includes text specifying particular buyer-defined conditions (i.e., a request to only contact if the asking price is below $400,000 and only if the home is equipped with central air/heat). Similar to the aforementioned examples, the prospective buyer might retrieve image 2624 from either a personal library on the prospective buyer's device or an external library on a network, wherein a unique gesture superimposes image 2624 onto area 2622 of canvas 2620. For this particular embodiment, the unique gesture includes a first stroke 2612 in a substantially downward direction followed by a second stroke 2614 directed in a substantially upward direction.

Figure 27:
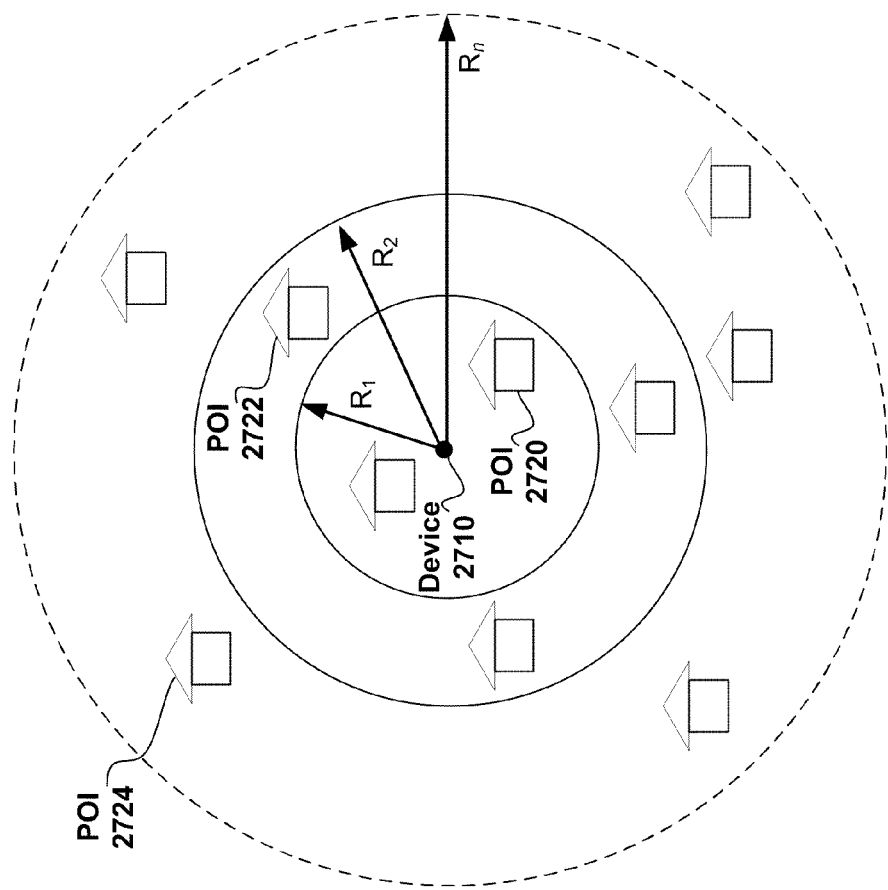
FIG. 27 is an exemplary diagram illustrating a plurality of potential points of interest proximate to a device.
Figure 28:
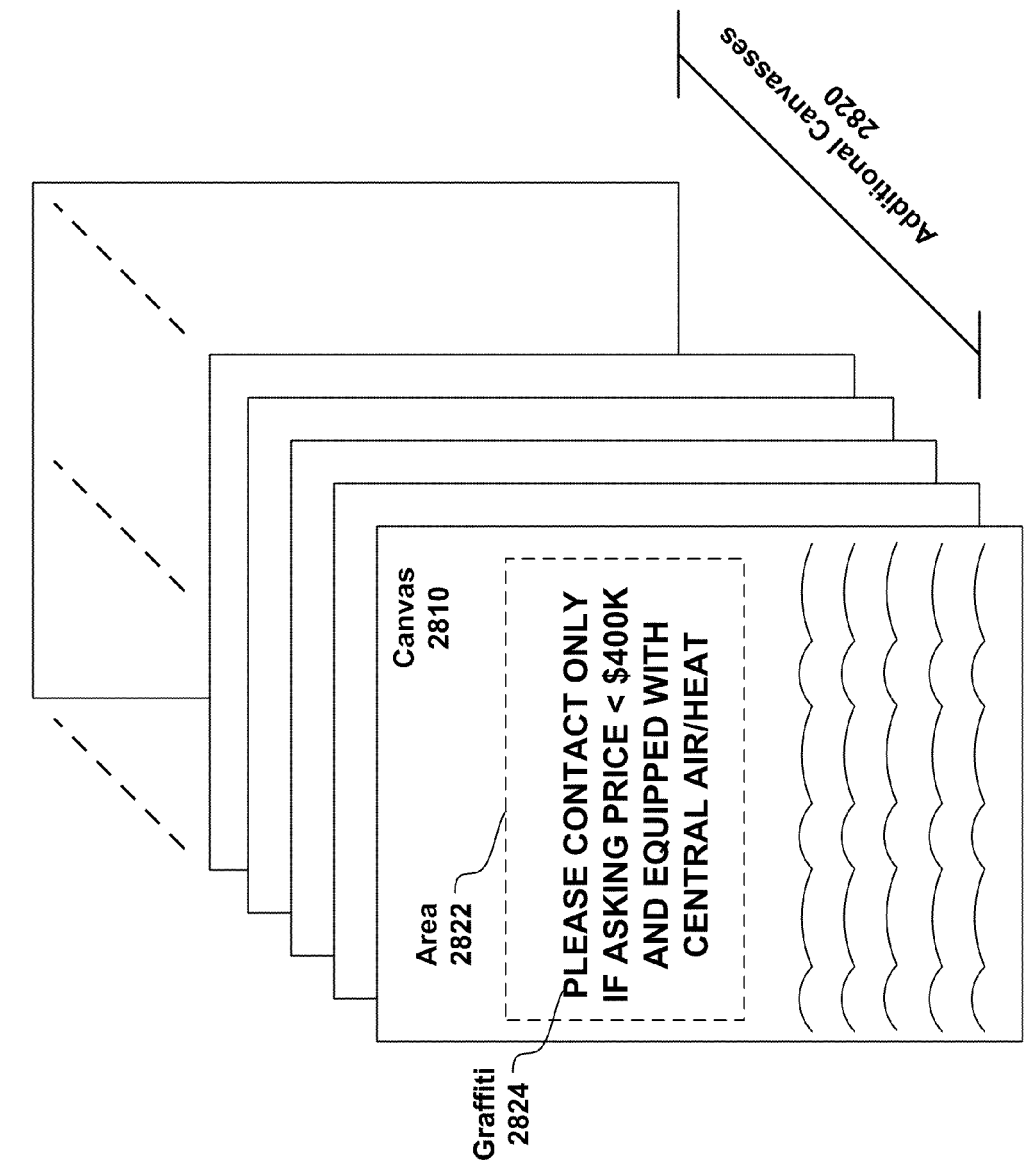
FIG. 28 is an exemplary diagram illustrating a plurality of digital profiles corresponding to a plurality of points of interest selected by a device.

It may sometimes be desirable to superimpose graffiti onto multiple canvasses. For instance, with respect to the real estate example above, it may be desirable make inquiries into multiple properties simultaneously. In FIG. 27, an exemplary diagram for facilitating such an inquiry illustrates a plurality of points of interest proximate to a device. Specifically, FIG. 27 illustrates a device 2710 surrounded by houses of interest 2720 within a first radius $R_1$, houses of interest 2722 within a second radius $R_2$, and houses of interest 2724 within a third radius $R_3$. To this end, an exemplary scenario is contemplated, wherein the prospective buyer fortuitously visits a desirable neighborhood and wishes to ascertain real estate information for all available properties within a particular radius. As illustrated in FIG. 28, an inquiry into multiple properties may include simultaneously superimposing graffiti onto multiple corresponding canvasses. For this particular example, the prospective buyer's device may superimpose graffiti 2824 onto a graffiti area 2822, wherein a first canvas 2810 corresponds to a first property, and wherein additional canvasses 2820 correspond to additional properties within the selected radius of the prospective buyer's device. Here, as illustrated, the prospective buyer may again utilize an object graffiti tool to create the custom graffiti discussed in FIG. 26.

Exemplary Implementations for Holding the Pointing Device in Different Planes

In an aspect, a device provides the user with different functions/views for facilitating graffiti generation according to the device's orientation. For instance, in FIG. 29, a flow diagram illustrates an exemplary non-limiting process that anticipates that a user will hold a device substantially in a horizontal plane, such as in the palm of the user's hand while viewing the device. At step 2900, a map on display is oriented according to a direction relative to the device based on pointing information. Next, at step 2910, the device displays place(s) or item(s) of interest on the map according to an indication of type of place or item. At step 2920, the place(s) or item(s) are then filtered (e.g., to show only nearby tourist sites). At 2930, as the device turns, the map continuously updates and re-orients based on any new direction the device points at, in order to maintain proper direction relative to real space. The process proceeds with a selection of a place or item on the map at step 2940, followed by the superimposition of digital graffiti on a digital canvas corresponding to the selected place or item at step 2950. In this regard, because it is intuitive to give a ground view when the viewing plane is parallel to the ground plane, in the present embodiment, the device implements a 2-D map view when held substantially in the horizontal plane.

Figure 30:
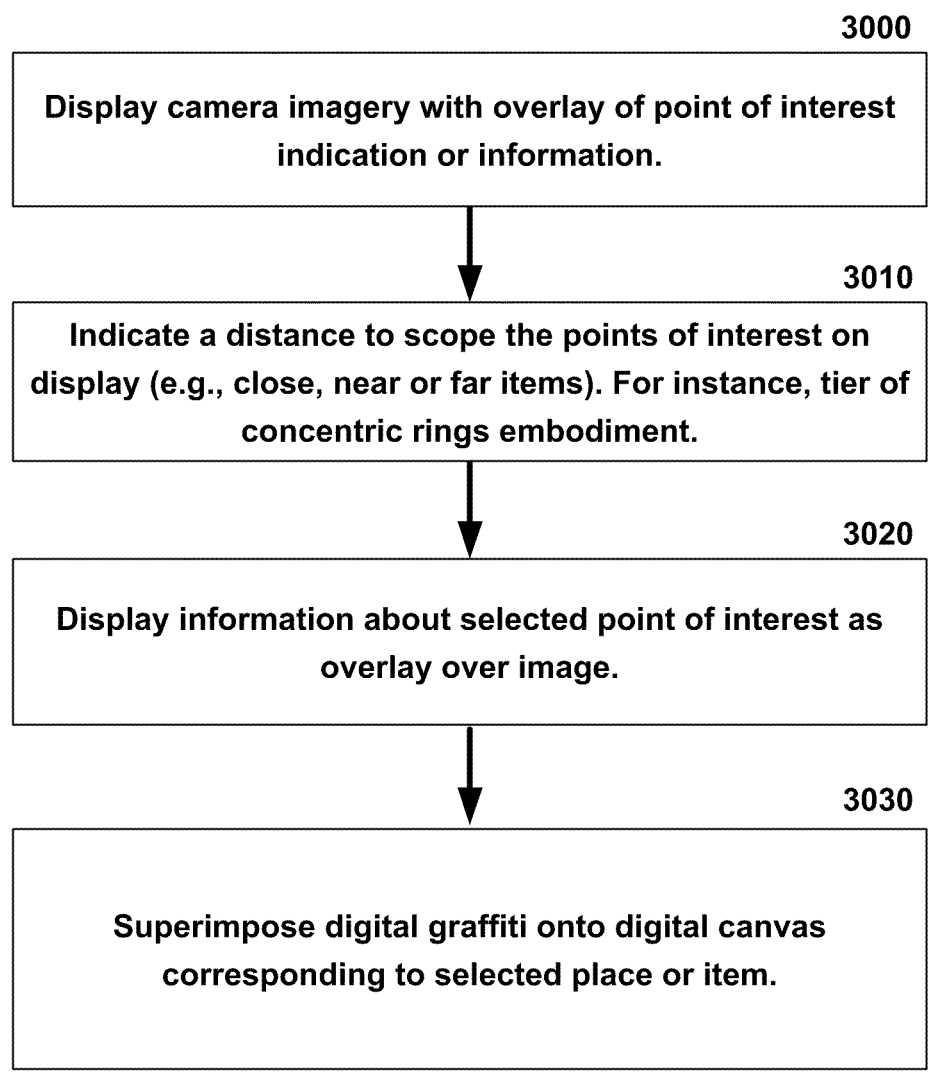
FIG. 30 is a flow diagram of a non-limiting process whereby it is anticipated that a user will hold a device substantially in a vertical plane.

Referring next to FIG. 30, a flow diagram illustrates an exemplary non-limiting process that anticipates that a user will hold a device substantially in a vertical plane (e.g., as if scanning an area in a camera viewfinder with overlay information and actions introduced to give the viewfinder context for POI action). In an aspect, the device utilizes motion information to ascertain when the device is substantially in a vertical plane, at step 3000, wherein the device subsequently displays camera imagery with an overlay of a point of interest indication or information. At step 3010, the device provides distance indications to scope the points of interest on display (e.g., close, near or far items).

Next, at step 3020, the process proceeds with the device displaying information about a selected point of interest as an overlay over the image, followed by the superimposition of digital graffiti on a digital canvas corresponding to the selected place or item at step 3030. In this regard, because it is intuitive to give a 3-D perspective view when the viewing plane is orthogonal to the ground plane, the present embodiment displays a 3-D perspective view with POI information overlay when the device is substantially in the vertical plane. In effect, the camera shows the real space behind the device, and indications of points of interest in that space as if the user was performing a scan of his or her surroundings with the device. Direction information of the device enables data and network services to know what the scope of objects for interaction with the device is.

Figure 29:
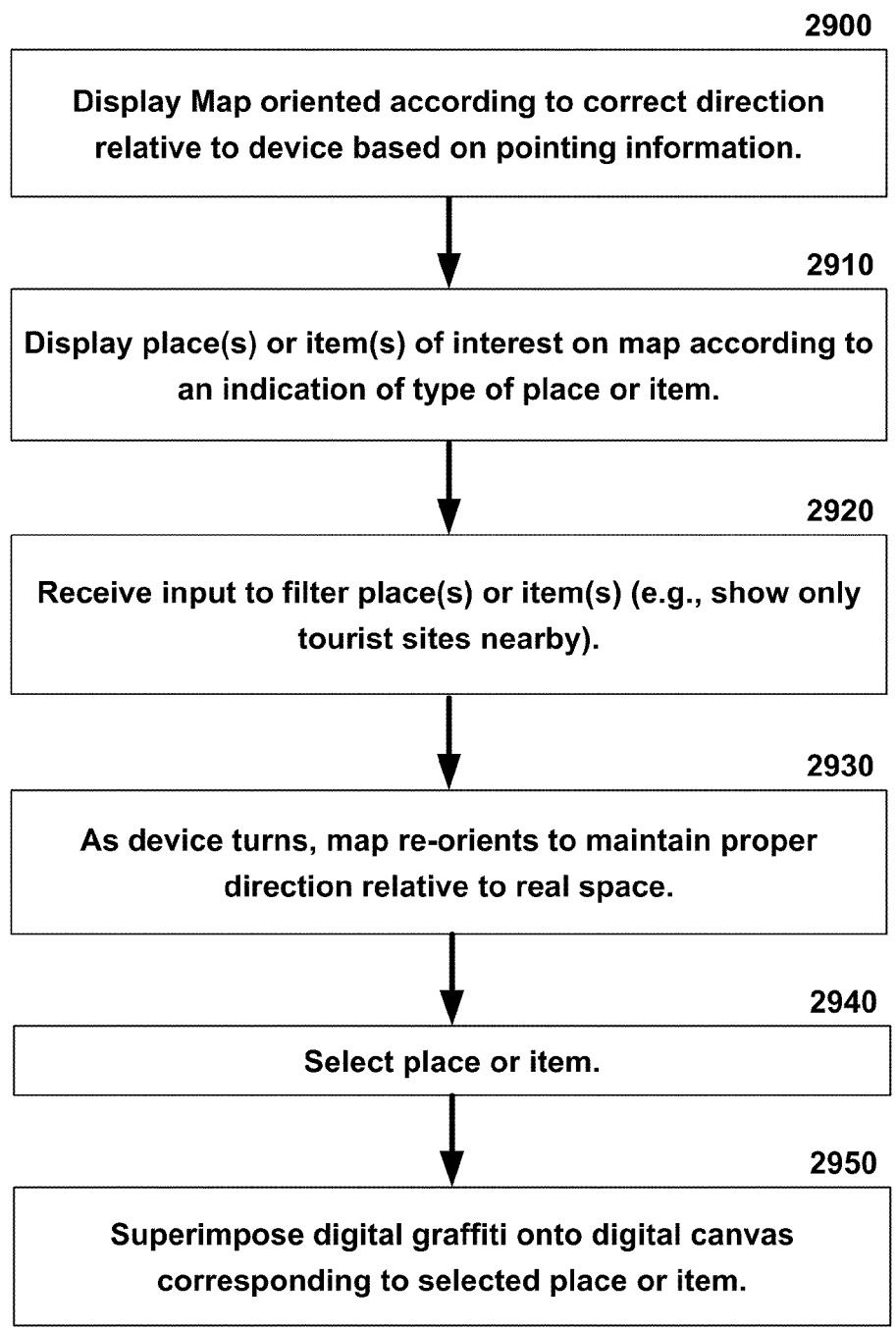
FIG. 29 is a flow diagram of a non-limiting process whereby it is anticipated that a user will hold a device substantially in a horizontal plane.
Figure 31:
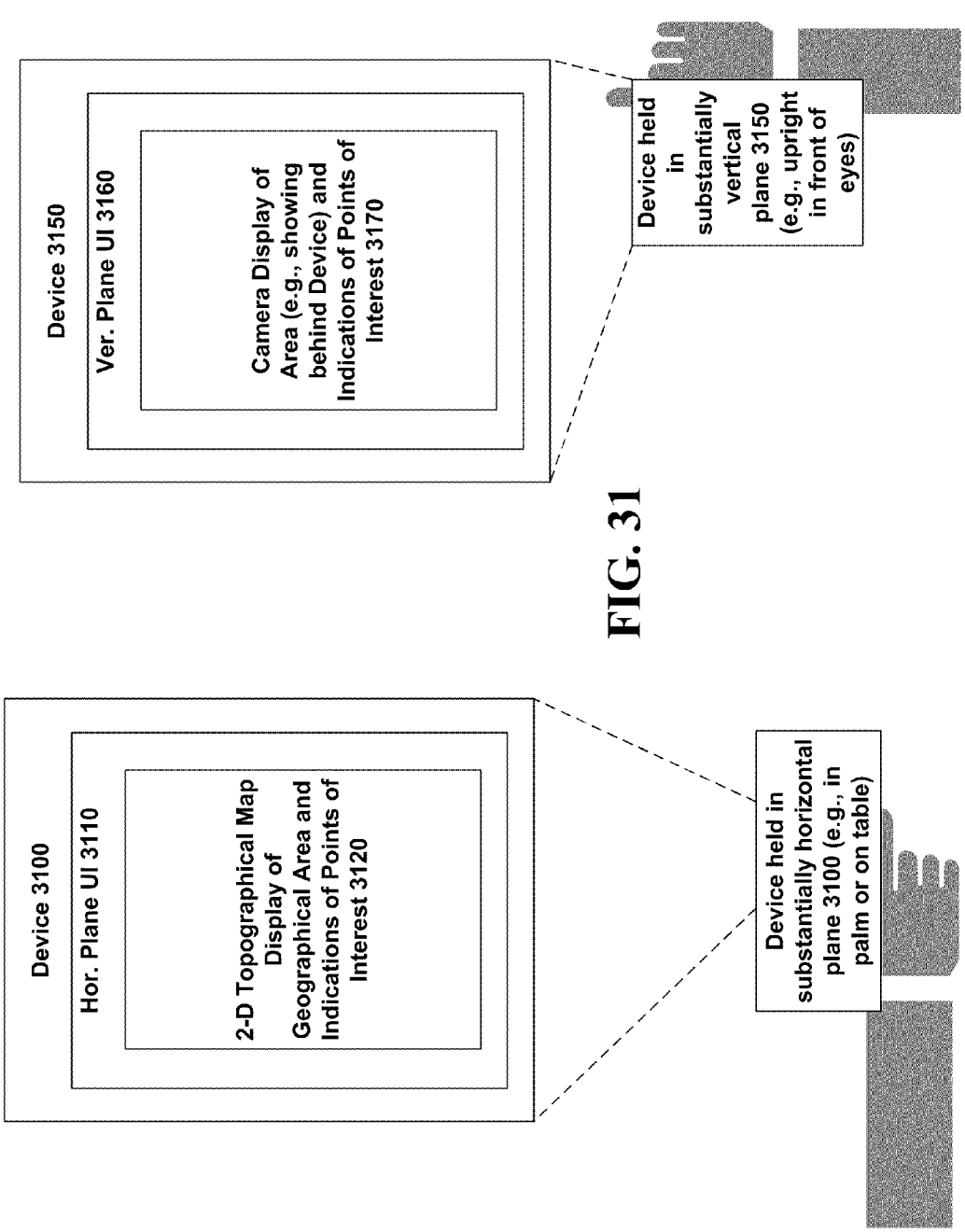
FIG. 31 illustrates a switching between the embodiments of FIGS. 29 and 30 according to planar orientation.

FIG. 31 illustrates a general difference between the embodiments of FIGS. 29 and 30. With device 3100 in the horizontal plane, the device displays a 2-D topographical map display of geographical area and indications of points of interest 3120. In this regard, when device 3100 detects an orientation that is substantially in the horizontal plane, the device displays a 2-D topographical map 3120 within UI 3110. However, when device 3150 detects an orientation that is substantially in the vertical plane, the device displays a 3-D perspective view 3170 within UI 3160 (as reflected by the 2-D imagery of the camera input).

Figure 32:
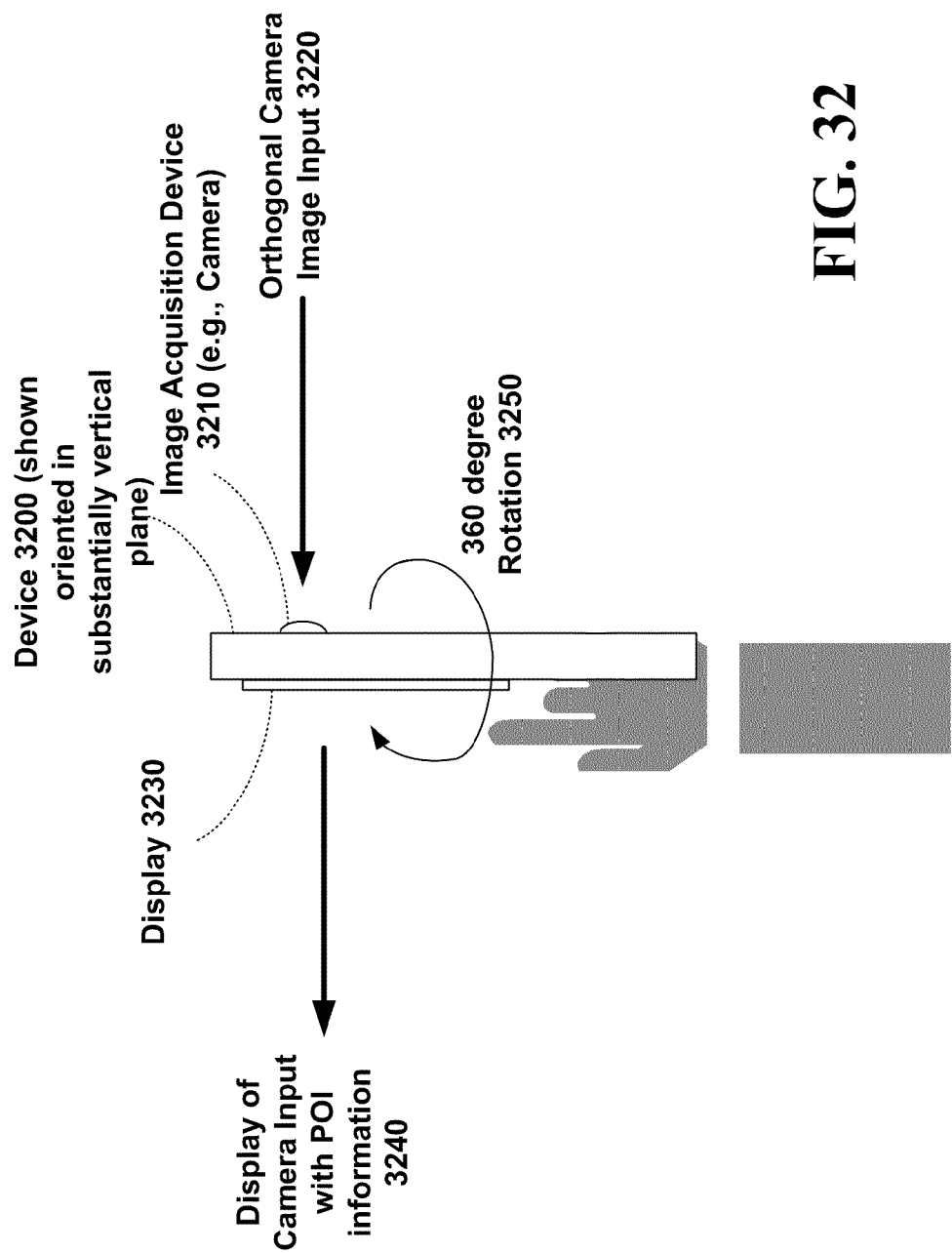
FIG. 32 further illustrates an embodiment that detects the device is substantially in the vertical plane or horizontal plane.

FIG. 32 further illustrates an embodiment that detects the device 3200 is substantially in a vertical plane, thereby invoking the image acquisition device 3210 to acquire input 3220 and display the input on display 3230 with POI information 3240. In this regard, as the user rotates the camera according to the arrow 3250, the POI information changes along with the scope of the camera input 3210 as it changes with the device 3200 spinning around.

Supplemental Context Regarding Pointing Devices, Architectures and Services

Figure 33:
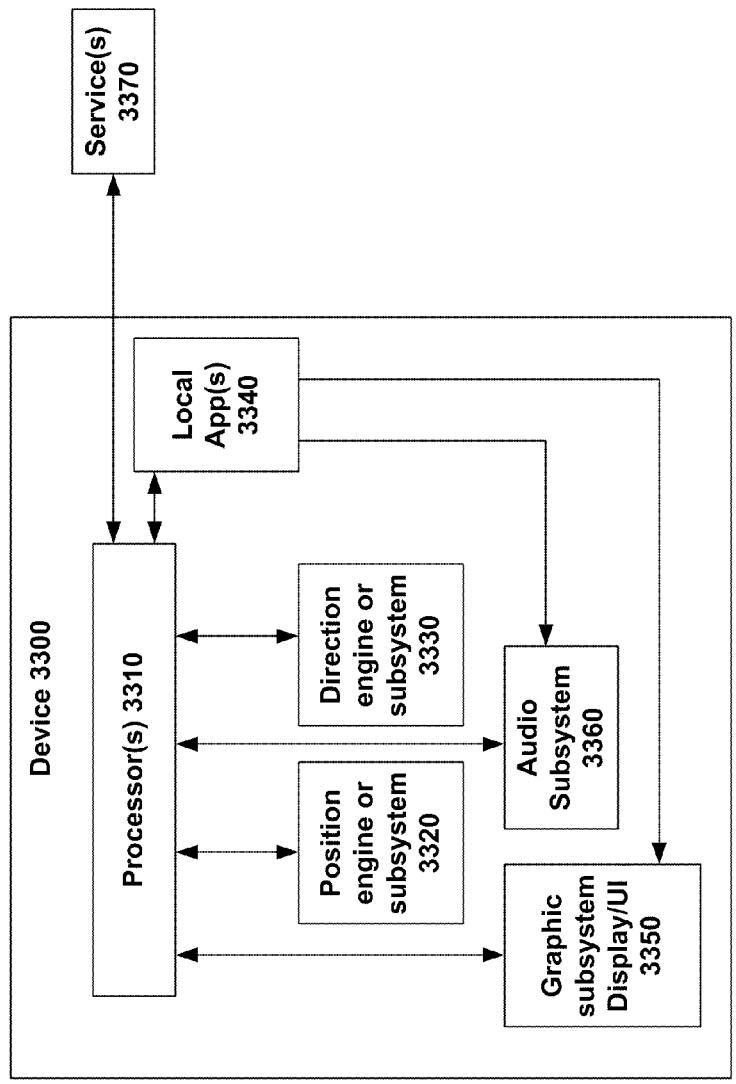
FIG. 33 illustrates a block diagram of a non-limiting device consistent with one or more embodiments described herein.

FIG. 33 illustrates an exemplary non-limiting device 3300 including processor(s) 3310 having a position engine or subsystem 3320 for determining a location of the device 3300 and a direction engine or subsystem 3330 for determining a direction or orientation of the device 3300. By interacting with local application(s) 3340 and/or service(s) 3370, content can be delivered to the device, which is tailored to device intent and a place in which the device is present. The tailored content can be rendered by graphic subsystem or display/UI 3350 or audio subsystem 3360.

The following description contains supplemental context regarding potential non-limiting pointing devices, architectures and associated services to further aid in understanding one or more of the above embodiments. Any one or more of any additional features described in this section can be accommodated in any one or more of the embodiments described above with respect to direction-based services at a particular location. While such combinations of embodiments or features are possible, for the avoidance of doubt, no embodiments set forth in the subject disclosure should be considered limiting on any other embodiments described herein.

As mentioned, a broad range of scenarios can be enabled by a device that can take location and direction information about the device and build a service on top of that information. For example, by effectively using an accelerometer in coordination with an on board digital compass, an application running on a mobile device updates what each endpoint is "looking at" or pointing towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well. As described herein, these techniques can become more granular to particular items within a Starbucks, such as "blueberry cheesecake" on display in the counter, enabling a new type of graffiti interaction.

Accordingly, a general device for accomplishing this includes a processing engine to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-dimensional (3D) or N-dimensional directional-based search, discovery, and interactivity services are enabled for endpoints in the system of potential interest to the user.

In this regard, the pointing information and corresponding algorithms ultimately depend upon the assets available in a device for producing the pointing or directional information. The pointing information, however produced according to an underlying set of measurement components, and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest (e.g., those that span a certain angle defined by a panning gesture by the user).

In this respect, a device can include a variety of spatial and map components and intelligence to determine intersections for directional arcs. For instance, objects of interest could be represented with exact boundaries, approximated with spheres, sub-shells (e.g., stores in a mall) of a greater shell (e.g., a mall), hierarchically arranged, etc. Dynamically generated bounding boxes can also be implemented (i.e., any technique can be used to obtain boundary information for use in an intersection algorithm). Thus, such boundaries can be implicitly or explicitly defined for the POIs.

A device can also include an intersection component that interprets pointing information relative to a set of potential points of interest. The engine can perform such intersections knowing what the resolution of the measuring instruments are on the device, such as a given resolution of a GPS system. Such techniques can include taking into account how far a user is from a plane of objects of interest, such as items on a shelf or wall, the size of the item of interest and how that is defined, as well as the resolution of location instrumentation, such as the GPS system. The device can also optionally include an altimeter, or any other device that gives altitude information, such as measuring radar or sonar bounce from the floor. The altitude information can supplement existing location information for certain specialized services where points of interest vary significantly at different altitudes. It is noted that a GPS system itself has some information about altitude in its encoding.

In a non-limiting embodiment, a portable electronic device includes a positional component for receiving positional information as a function of a location of the portable electronic device, a directional component that outputs direction information as a function of an orientation of the portable electronic device and a location-based engine. Within such embodiment, the location-based engine processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks (e.g., Wi-Fi, a GPRS network, etc.), or communicate with other users of the service (e.g., Bluetooth). For the avoidance of doubt, the embodiments are in no way limited to a REST-based implementation, but rather any other state or stateful protocol could be used to obtain information from the service to the devices.

The directional component outputs direction information including compass information based on calibrated and compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the vectors themselves can also be taken into account to distinguish between pointing a device from the top of a building (likely pointing to other buildings, bridges, landmarks, etc.) and pointing the device from the bottom of the building (likely pointing to a shop at ground level). Other distinctions can be made between pointing towards a ceiling or floor to differentiate among shelves in a supermarket. A 3-axis magnetic field sensor can also be used to implement a compass to obtain tilt readings.

Secondary sensors, such as altimeters or pressure readers, can also be included in a mobile device and used to detect a height of the device, e.g., what floor a device is on in a parking lot or floor of a department store (changing the associated map/floorplan data). Where a device includes a compass with a planar view of the world (e.g., a 2-axis compass), the inclusion of one or more accelerometers in the device can be used to supplement the motion vector measured for a device as a virtual third component of the motion vector (e.g., to provide measurements regarding a third degree of freedom). This option is deployable where the provision of a 3-axis compass is too expensive, or otherwise unavailable.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

For instance, web services can effectively resolve vector coordinates sent from mobile endpoints into <x,y,z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

Figure 34:
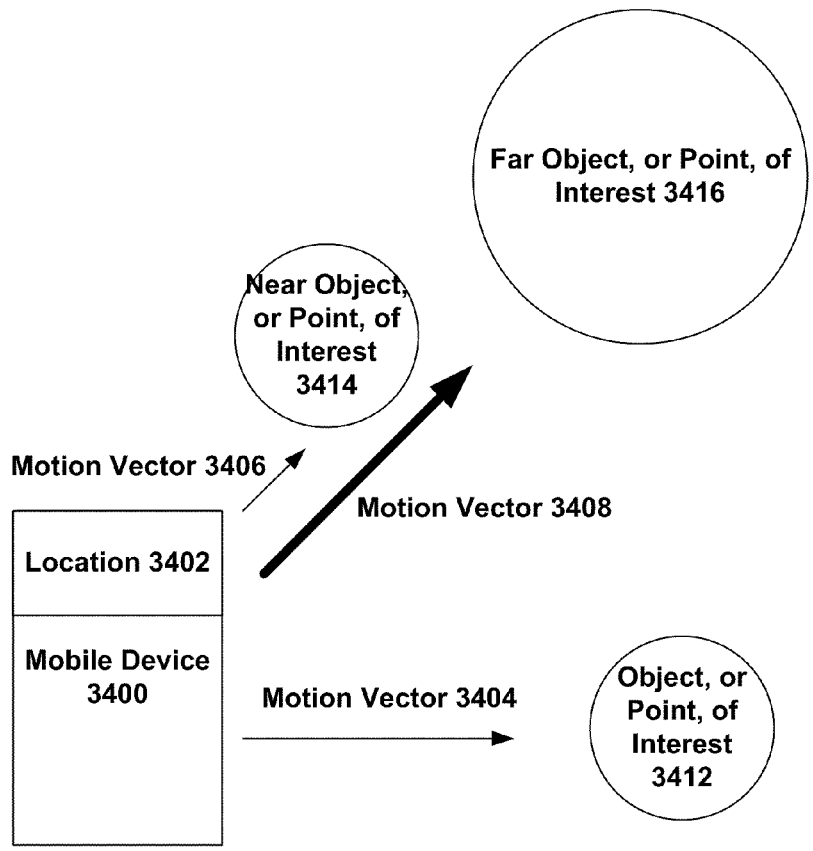
FIG. 34 is a block diagram illustrating the formation of motion vectors for use in connection with location-based services.

Among other algorithms for interpreting position/motion/direction information, as shown in FIG. 34, a device 3400 employing the direction-based location-based services 3402 as described herein in a variety of embodiments herein include a way to discern between near objects, such as POI 3414 and far objects, such as POI 3416. Depending on the context of usage, the time, the user's history, the device state, the speed of the device, the nature of the POIs, etc., the service can determine a general distance associated with a motion vector. Thus, a motion vector 3406 will implicate POI 3414, but not POI 3416, and the opposite would be true for motion vector 3408.

In addition, a device 3400 includes an algorithm for discerning items substantially along a direction at which the device is pointing, and those not substantially along a direction at which the device is pointing. In this respect, while motion vector 3404 might implicate POI 3412, without a specific panning gesture that encompassed more directions/vectors, POIs 3414 and 3416 would likely not be within the scope of points of interest defined by motion vector 3404. The distance or reach of a vector can also be tuned by a user (e.g., via a slider control or other control) to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed (i.e., any additional filter). For instance, for an apartment search service, endpoints falling within the look vector that are not apartments ready for lease, can be pre-filtered.

In addition to the look vector determination, the engine can also compensate for, or begin the look vector, where the user is by establishing positioning (~15 feet) through an A-GPS stack (or other location-based or GPS subsystem including those with assistance strategies) and also compensate for any significant movement/acceleration of the device, where such information is available.

As mentioned, in another aspect, a device can include a client-side cache of potentially relevant points of interest, which, based on the user's movement history can be dynamically updated. The context, such as geography, speed, etc. of the user can be included in the updating calculation. For instance, if a user's velocity is two miles per hour, the user may be walking and interested in updates at a city block by city block level, or at a lower level granularity if they are walking in the countryside. Similarly, if a user is moving on a highway at sixty miles per hour, the block-by-block updates of information are no longer desirable, but rather a granularity can be provided and predictively cached on the device in a manner appropriate for the speed of the vehicle.

In an automobile context, the location becomes the road on which the automobile is travelling, and the particular items are the places and things that are passed on the roadside much like products in a particular retail store on a shelf or in a display. The pointing-based services thus create a virtual "billboard" opportunity for items of interest generally along a user's automobile path. Proximity to location can lead to an impulse buy (e.g., a user might stop by a museum they are passing and pointing at with their device) if offered a discount on admission.

In various alternative embodiments, gyroscopic or magnetic compasses can provide directional information. A REST-based architecture enables data communications to occur over different networks, such as Wi-Fi and GPRS architectures. REST-based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing-based services enabled by the embodiments described herein.

A device as provided herein according to one or more embodiments can include a file system to interact with a local cache, store updates for synchronization to the service, exchange information by Bluetooth with other users of the service, etc. Accordingly, when operating from a local cache, at least the data in the local cache is still relevant at a time of disconnection, and thus, the user can still interact with the data. Finally, the device can synchronize according to any updates made at a time of re-connection to a network, or to another device that has more up to date GPS data, POI data, etc. In this regard, a switching architecture is adoptable for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can also be rendered or handled as input by the device. For instance, voice input can be handled by the service to explicitly point without the need for a physical movement of the device. For instance, a user could say into a device "what is this product right in front of me? No, not that one, the one above it" and have the device transmit current direction/movement information to a service, which in turn intelligently, or iteratively, determines what particular item of interest the user is pointing at, and returns a host of relevant information about the item.

Figure 35:
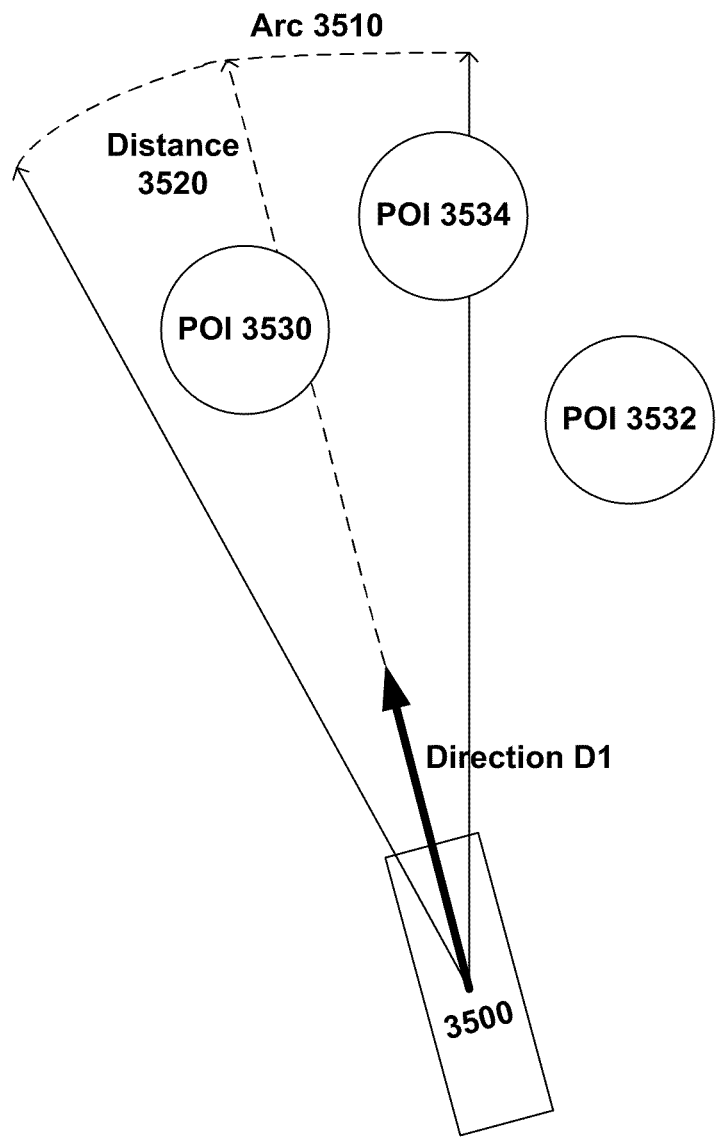
FIG. 35 illustrates a first aspect of algorithms for determining intersection endpoints with a pointing direction of a device.

FIG. 35 illustrates a non-limiting way for determining a set of points of interest. As illustrated, a device 3500 is pointed (e.g., point and click) in a direction D1, which according to the device or service parameters, implicitly defines an area within arc 3510 and distance 3520 that encompasses POI 3530, but does not encompass POI 3532. Such an algorithm will also need to determine any edge case POIs (i.e., whether POIs such as POI 3534 are within the scope of pointing in direction D1), where the POI only partially falls within the area defined by arc 3510 and distance 3520.

Figure 36:
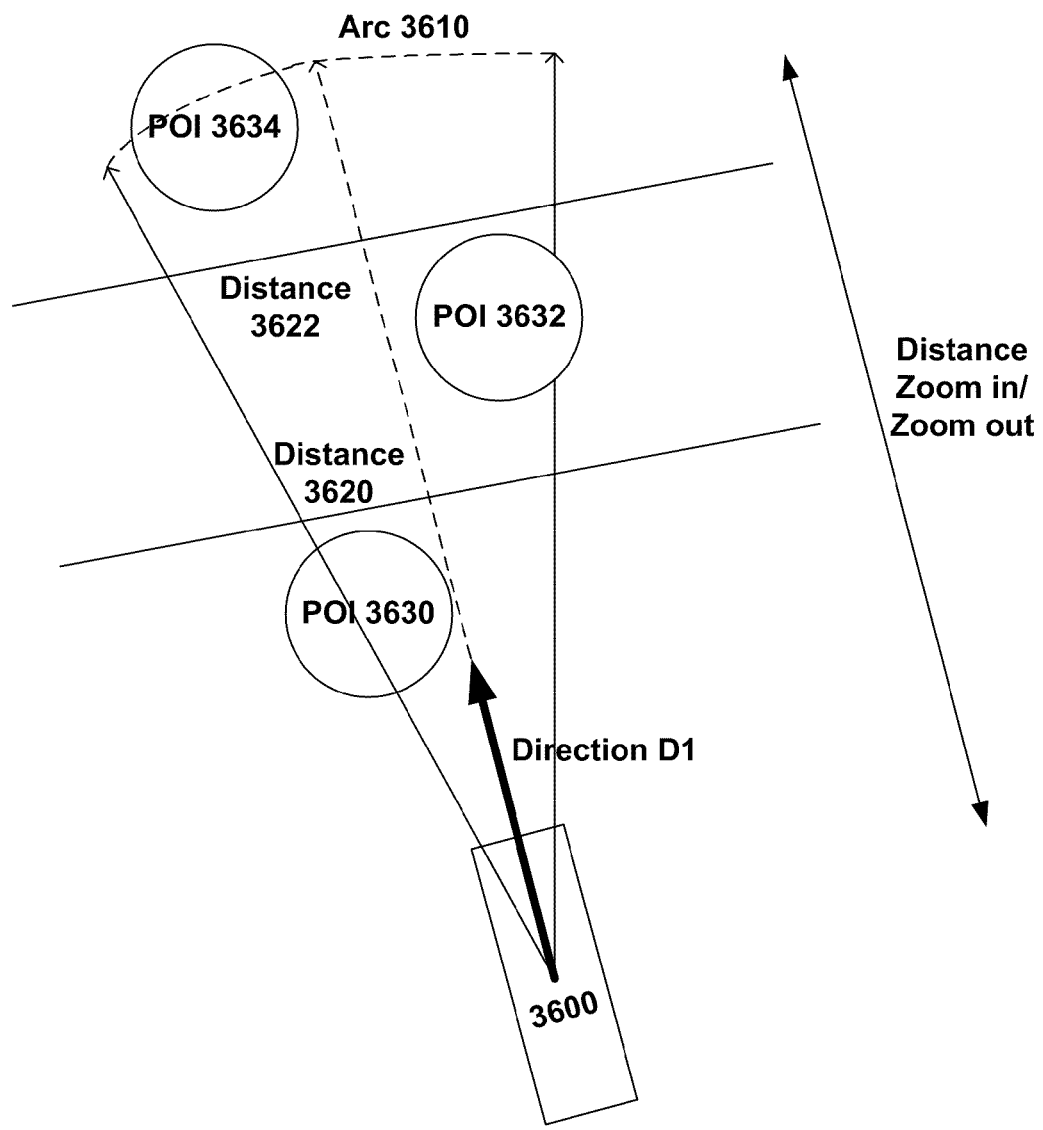
FIG. 36 illustrates a second aspect of algorithms for determining intersection endpoints with a pointing direction of a device.

Other gestures that can be of interest for a gesturing subsystem include recognizing a user's gesture for zoom in or zoom out. Zoom in/zoom out can be performed in terms of distance like FIG. 36. In FIG. 36, a device 3600 pointed in direction D1 may include a zoomed in view which includes points of interest within distance 3620 and arc 3610, or a medium zoomed view representing points of interest between distance 3620 and 3622, or a zoomed out view representing points of interest beyond distance 3622. These zoom zones correspond to POIs 3630, 3632 and 3634, respectively. More or fewer zones can be considered depending upon a variety of factors (e.g., the service, user preference, etc.).

Figure 37:
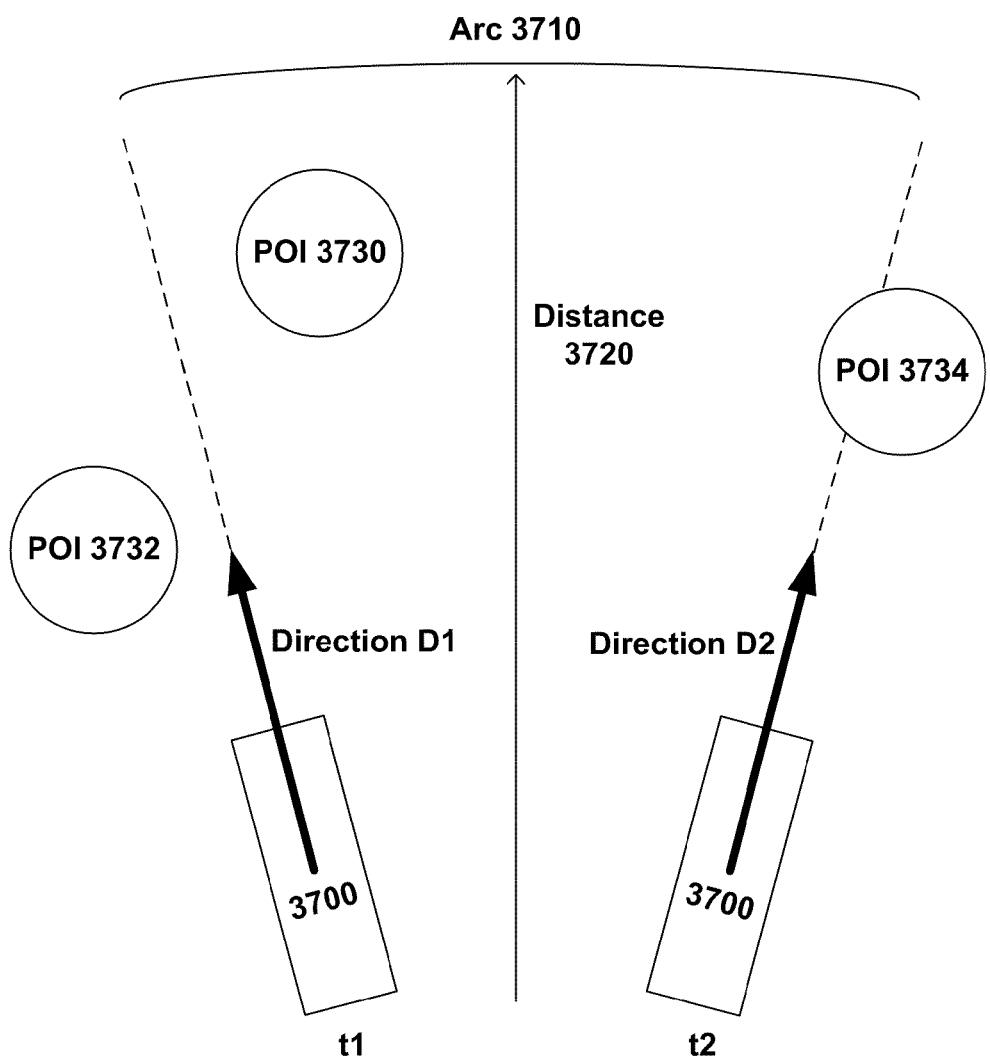
FIG. 37 illustrates a third aspect of algorithms for determining intersection endpoints with a pointing direction of a device.

In another non-limiting example, with location information and direction information, a user can input a first direction via a click, and then a second direction after moving the device via a second click, which in effect defines an arc 3710 for objects of interest in the system, such as objects 3730, 3732, 3734 as illustrated in FIG. 37. For instance, via a first pointing act by the user at time t1 in direction D1 and a second pointing act at time t2 by the user in direction D2, an arc 3710 is implicitly defined. The area of interest implicitly includes a search of objects of interest within a distance 3720, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented. In the example, POI 3730 is encompassed by the arc 3710 defined by the gesture.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment, and to help users generate and superimpose graffiti.

Furthermore, with relatively accurate upward and downward tilt of the device, in addition to directional information such as calibrated and compensated heading/directional information, other services can be enabled. Typically, if a device is at ground level, the user is outside, and the device is "pointed" up towards the top of buildings. Here, the granularity of information about points of interest sought by the user (e.g., building level) is different than if the user was pointing at the first floor shops of the building (e.g., shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, time varying location can be factored into the mathematics and engine of resolving at what the user is pointing with the device to compensate for the user experience.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank Internet search without context, a form of real-time visual search for users in real 3-D environments is provided.

In one non-limiting embodiment, the direction-based pointing services are implemented in connection with a pair of glasses, headband, etc. having a corresponding display means that acts in concert with the user's looking to highlight or overlay features of interest around the user.

Figure 38:
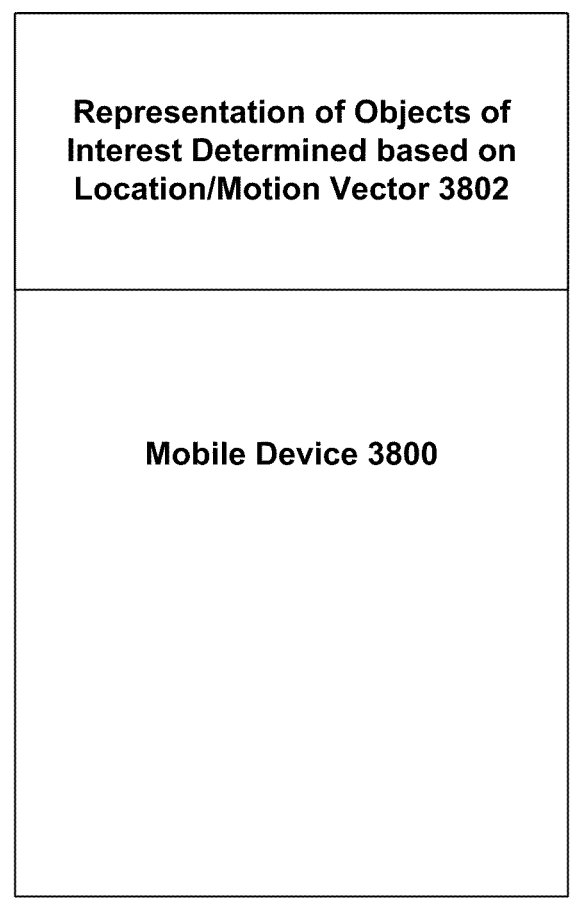
FIG. 38 represents a generic user interface for a mobile device for representing points of interest based on pointing information.

As shown in FIG. 38, once a set of objects is determined from the pointing information according to a variety of contexts of a variety of services, a mobile device 3800 can display the objects via representation 3802 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 39:
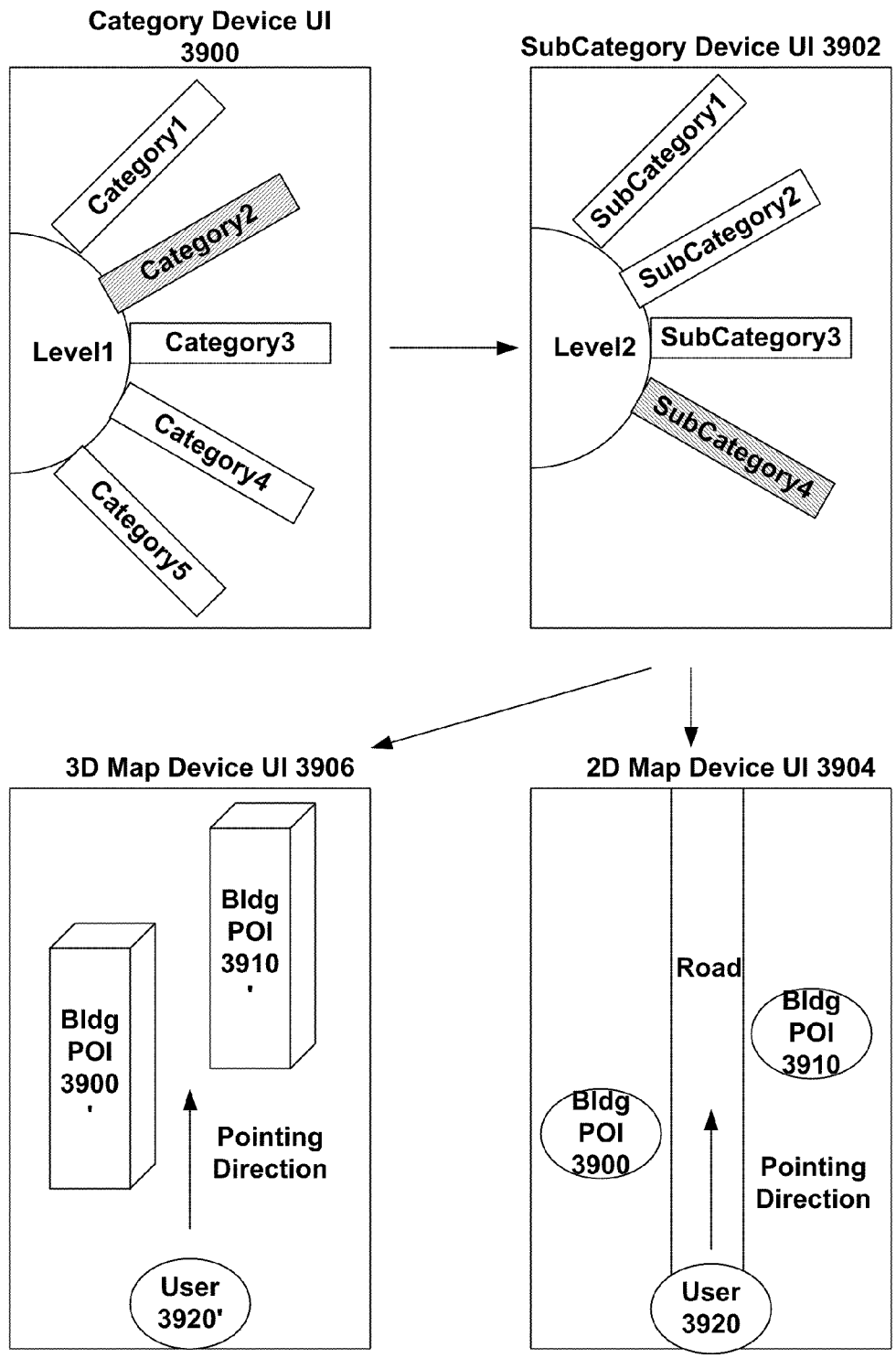
FIG. 39 represents some exemplary, non-limiting alternatives for user interfaces for representing point of interest information.

For instance, a set of different choices are shown in FIG. 39, wherein UI 3900 and 3902 illustrate an exemplary navigation of hierarchical POI information. For instance, level1 categories may include category1, category2, category3, category4 and category5, such that a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 3900 and 3910 are found in the subcategory in order to display on a 2D map UI 3904 along the pointing direction, or alternatively as a 3D virtual map view 3906 along the pointing direction.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to the services ecosystem where the user interacts. The system thus advantageously supports both static and dynamic content.

Figure 40:
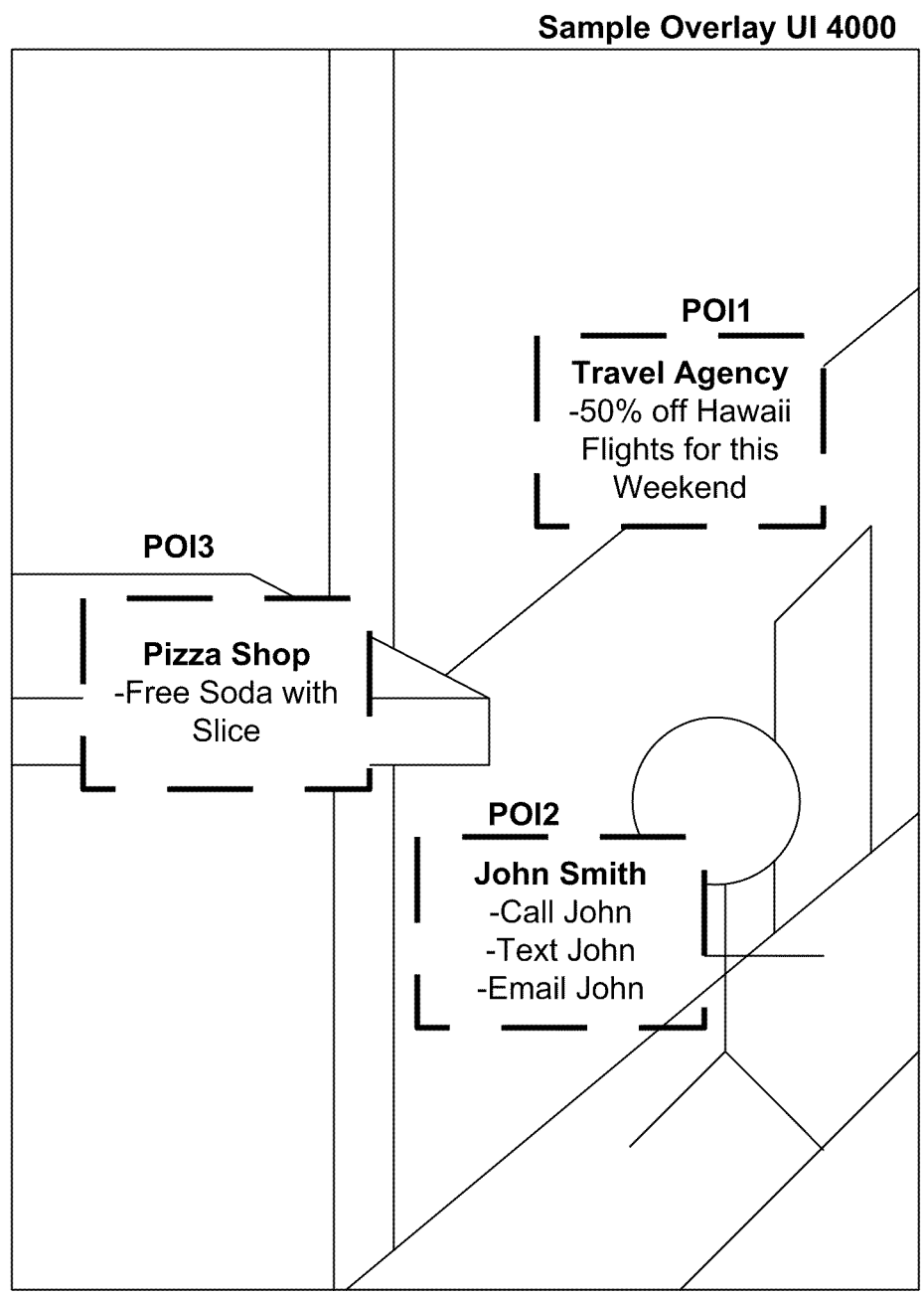
FIG. 40 illustrates a sample overlay user interface for overlaying point of interest information over a camera view of a mobile device.

Other user interfaces can be considered such as left-right, or up-down arrangements for navigating categories or a special set of soft-keys can be adaptively provided.

Where a device includes a camera, in one embodiment shown in FIG. 40, a representative non-limiting overlay UI 4000 is shown having three POIs POI1, POI2 and POI3. The POIs are overlaid over actual image data being viewed in real time on the device via an LCD screen or like display. The actual image data can be of products on a shelf or other display or exhibit in a store. Thus, as the user aims the camera around his or her environment, the lens becomes the pointer, and the POI information can be overlaid intelligently for discovery of endpoints of interest. Moreover, a similar embodiment can be imagined even without a camera, such as a UI in which 3-D objects are virtually represented based on real geometries known for the objects relative to the user. Thus, the device UI can be implemented consistent with a camera, or virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in, zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured (e.g., five most likely, five closest, five closest to one hundred feet away, five within category or sub-category, alphabetical order, etc.). In each case, based on a pointing direction, implicitly a cone or other cross section across physical space is defined as a scope of possible points of interest. In this regard, the width or deepness of this cone or cross section can be configurable by the user to control the accuracy of the pointing (e.g., narrow or wide radius of points and how far out to search).

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about "in the here" and "in the now" through the act of pointing with the device, the system generates high cost per impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

In an aspect, different location subsystems (such as tower triangulation, GPS, A-GPS, E-GPS, etc.) can have different tolerances. For instance, with GPS, tolerances can be achieved to about ten meters. With A-GPS, tolerances can be tightened to about twelve feet. In turn, with E-GPS, tolerance may be a different error margin still. Compensating for the different tolerances is part of the interpretation engine for determining intersection of a pointing vector and a set of points of interest. In addition, as shown in FIGS. 34-37, a distance to project out the pointing vector can be explicit, configurable, contextual, etc.

In this regard, the various embodiments described herein can employ any algorithm for distinguishing among boundaries of the endpoints (such as boundary boxes, or rectangles, triangles, circles, etc.). For example, one hundred fifty feet could be selected as a default radius, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data from Zillow, for example, can be integrated with GPS information from Starbucks.

In addition, similar techniques can be implemented in a moving vehicle client that includes a GPS, compass, accelerometer, etc. By filtering based on scenarios (e.g., I need gas), different subsets of points of interest (e.g., gas stations) can be determined for the user based not only on distance, but an actual time it may take to get to the point of interest. In this regard, while a gas station may be one hundred yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

Exemplary Networked and Distributed Environments

One of ordinary skill in the art can appreciate that the various embodiments of methods and devices for generating digital graffiti and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 41:
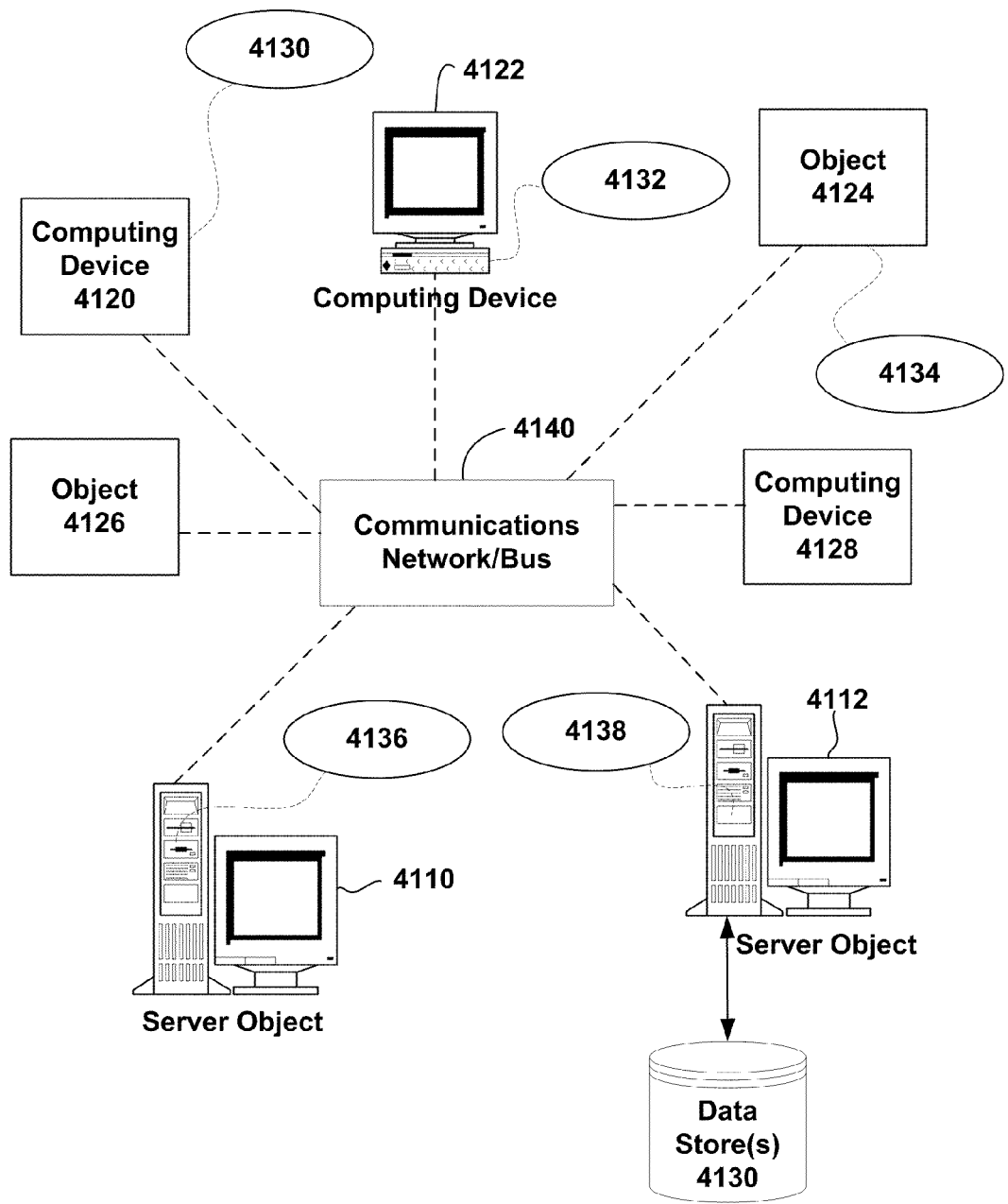
FIG. 41 is a block diagram representing an exemplary non-limiting networked environment in which embodiment(s) may be implemented.

FIG. 41 provides a non-limiting schematic diagram of an exemplary networked or distributed computing environment. The distributed computing environment comprises computing objects 4110, 4112, etc. and computing objects or devices 4120, 4122, 4124, 4126, 4128, etc., which may include programs, methods, data stores, programmable logic, etc., as represented by applications 4130, 4132, 4134, 4136, 4138. It can be appreciated that objects 4110, 4112, etc. and computing objects or devices 4120, 4122, 4124, 4126, 4128, etc. may comprise different devices, such as PDAs, audio/video devices, mobile phones, MP3 players, laptops, etc.

Each object 4110, 4112, etc. and computing objects or devices 4120, 4122, 4124, 4126, 4128, etc. can communicate with one or more other objects 4110, 4112, etc. and computing objects or devices 4120, 4122, 4124, 4126, 4128, etc. by way of the communications network 4140, either directly or indirectly. Even though illustrated as a single element in FIG. 41, network 4140 may comprise other computing objects and computing devices that provide services to the system of FIG. 41, and/or may represent multiple interconnected networks, which are not shown. Each object 4110, 4112, etc. or 4120, 4122, 4124, 4126, 4128, etc. can also contain an application, such as applications 4130, 4132, 4134, 4136, 4138, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 41, as a non-limiting example, computers 4120, 4122, 4124, 4126, 4128, etc. can be thought of as clients and computers 4110, 4112, etc. can be thought of as servers where servers 4110, 4112, etc. provide data services, such as receiving data from client computers 4120, 4122, 4124, 4126, 4128, etc., storing of data, processing of data, transmitting data to client computers 4120, 4122, 4124, 4126, 4128, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 4140 is the Internet, for example, the servers 4110, 4112, etc. can be Web servers with which the clients 4120, 4122, 4124, 4126, 4128, etc. communicate via any of a number of known protocols, such as the hypertext transfer protocol (HTTP). Servers 4110, 4112, etc. may also serve as clients 4120, 4122, 4124, 4126, 4128, etc., as may be characteristic of a distributed computing environment.

Exemplary Computing Device

As mentioned, various embodiments described herein apply to any device wherein it may be desirable to generate digital graffiti. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 42 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 42:
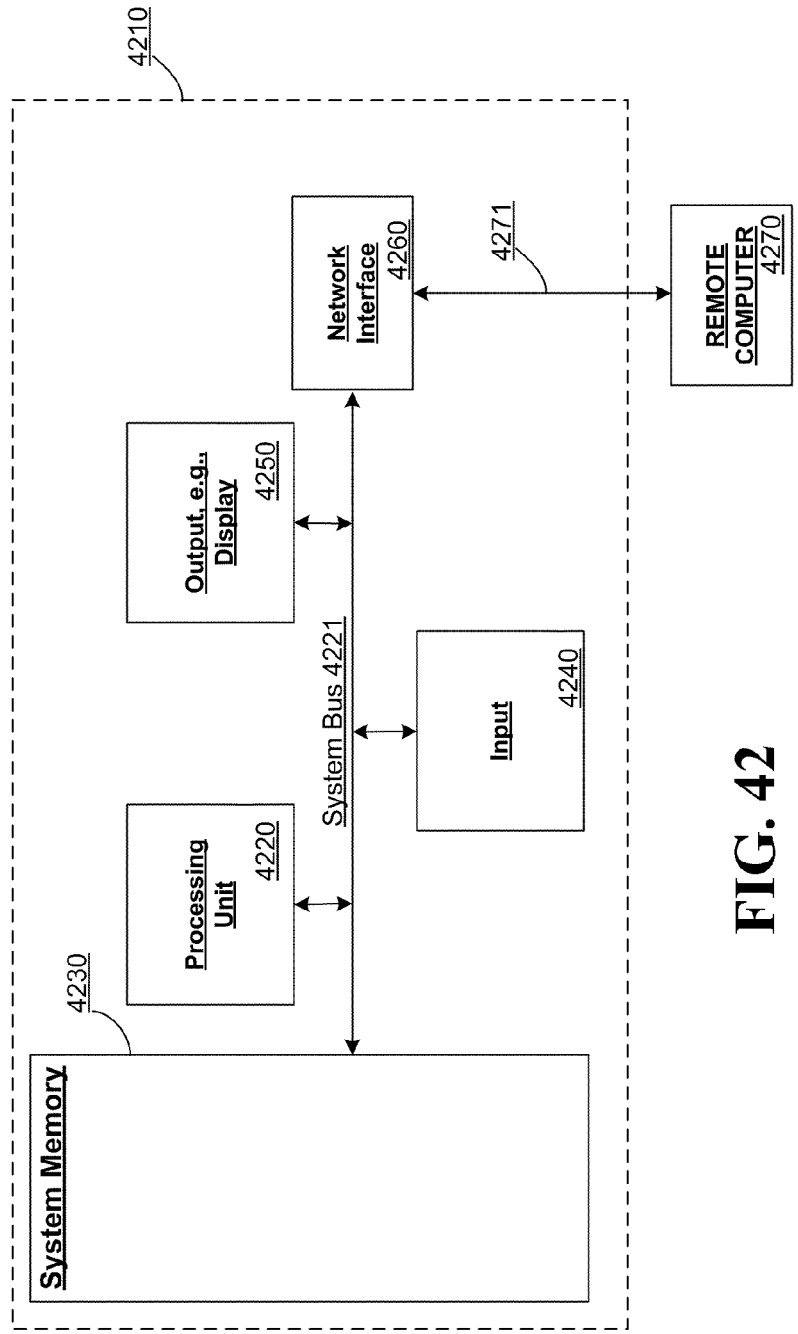
FIG. 42 is a block diagram representing an exemplary non-limiting computing system or operating environment in which aspects of embodiment(s) may be implemented.

FIG. 42 thus illustrates an example of a suitable computing system environment 4200 in which one or more of the embodiments may be implemented, although as made clear above, the computing system environment 4200 is only one example of a suitable computing environment and is not intended to suggest any limitation as to the scope of use or functionality of any of the embodiments. Neither should the computing environment 4200 be interpreted as having any dependency or requirement relating to any one or combination of components illustrated in the exemplary operating environment 4200.

With reference to FIG. 42, an exemplary remote device for implementing one or more embodiments herein can include a general purpose computing device in the form of a handheld computer 4210. Components of handheld computer 4210 may include, but are not limited to, a processing unit 4220, a system memory 4230, and a system bus 4221 that couples various system components including the system memory to the processing unit 4220.

Computer 4210 typically includes a variety of computer readable media and can be any available media that can be accessed by computer 4210. The system memory 4230 may include computer storage media in the form of volatile and/or nonvolatile memory such as read only memory (ROM) and/or random access memory (RAM). By way of example, and not limitation, memory 4230 may also include an operating system, application programs, other program modules, and program data.

A user may enter commands and information into the computer 4210 through input devices 4240 A monitor or other type of display device is also connected to the system bus 4221 via an interface, such as output interface 4250. In addition to a monitor, computers may also include other peripheral output devices such as speakers and a printer, which may be connected through output interface 4250.

The computer 4210 may operate in a networked or distributed environment using logical connections to one or more other remote computers, such as remote computer 4270. The remote computer 4270 may be a personal computer, a server, a router, a network PC, a peer device or other common network node, or any other remote media consumption or transmission device, and may include any or all of the elements described above relative to the computer 4210. The logical connections depicted in FIG. 42 include a network 4271, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A device, comprising:
   a motion component configured to output motion information as a function of at least one movement of the device, the motion information identifying a path traversed by the device;
   a directional component configured to output direction information as a function of an orientation of the device, the direction information identifying a pointing direction of the device; and
   at least one processor configured to simultaneously superimpose digital graffiti created via at least one gesture undergone by the device onto a plurality of digital canvasses, the plurality of digital canvasses selected from a plurality of retrievable digital canvasses respectively corresponding to a plurality of aggregated points of interest within a predetermined radius from a particular point of interest and identified as being substantially within the pointing direction of the device.

2. The device of claim 1, the at least one processor further configured to process at least the orientation of the device to ascertain at least one digital canvas.

3. The device of claim 1 further comprising a position component configured to output a location of the device, the at least one processor further configured to process at least the location to ascertain at least one digital canvas.

4. The device of claim 3, the at least one processor is further configured to process the location to determine at least one point of interest relating to the location, the at least one digital canvas corresponding to the at least one point of interest.

5. The device of claim 1 further comprising a scanning component that outputs sensory information pertaining to a signal received from at least one entity proximate to the device, the at least one processor further configured to process at least the sensory information to ascertain the at least one digital canvas.

6. The device of claim 1 further comprising an ink component that outputs a two-dimensional mapping of the at least one gesture, the at least one processor further configured to process the two-dimensional mapping, the digital graffiti derived from at least a portion of the two-dimensional mapping.

7. The device of claim 6 further comprising a beautification component that outputs a beautification of at least a portion of the two-dimensional mapping, the at least one processor further configured to process the beautification, the digital graffiti including at least a portion of the beautification.

8. The device of claim 1 further comprising an object component that outputs a digital image corresponding to the at least one gesture, the at least one processor further configured to process the digital image, the digital graffiti including at least a portion of the digital image.

9. The device of claim 8 further comprising a library component that stores at least the digital image, the at least one processor further configured to retrieve the digital image from the library component.

10. The device of claim 8 further comprising a network component that facilitates interfacing the device with a network, the at least one processor further configured to retrieve the digital image from the network.

11. The device of claim 1, the motion component further configured to ascertain a velocity of the device during at least a portion of the path traversed by the device, the at least one processor further configured to identify the at least one gesture based on the velocity.

12. A computer readable storage device, comprising:
a memory component configured to store computer-readable instructions, the computer-readable instructions including instructions for performing the following acts:
ascertaining an orientation of a portable device, the orientation ascertained as a function of direction information processed by a processor, the direction information indicating a pointing direction of the portable device;
ascertaining a path traversed by the portable device, the path ascertained as a function of motion information processed by the processor;
identifying a gesture undergone by the portable device;
selecting multiple digital canvasses from a plurality of retrievable digital canvasses, the plurality of retrievable digital canvasses respectively corresponding to a plurality of aggregated points of interest within a predetermined radius from a particular point of interest and included in the pointing direction of the portable device; and
superimposing digital graffiti onto the multiple digital canvasses simultaneously, the digital graffiti generated via the gesture.

13. The computer readable storage medium of claim 12, the computer readable instructions further comprising instructions for processing a photo of an area proximate to the portable device, the at least one digital canvas including at least a portion of the photo.

14. The computer readable storage device of claim 12, the computer readable instructions further comprising instructions for determining a location of the portable device, at least one digital canvas ascertained as a function of the location.

15. The computer readable storage medium of claim 12, the computer readable instructions further comprising instructions for analyzing a signal received from at least one entity proximate to the portable device, the at least one digital canvas ascertained as a function of the signal.

16. The computer readable storage device of claim 12, the computer readable instructions further comprising instructions for attaching metadata to the digital graffiti.

17. The computer readable storage device of claim 12, the computer readable instructions further comprising instructions for processing a two-dimensional trace corresponding to at least a portion of the path, the digital graffiti derived from at least a portion of the two-dimensional trace.

18. The computer readable storage device of claim 12, the computer readable instructions further comprising instructions for ascertaining a digital image corresponding to the gesture, the digital graffiti including at least a portion of the digital image.

19. The computer readable storage device of claim 18, the computer readable instructions further comprising instructions for retrieving the digital image from at least one of an external memory component accessible over a network or a library of images stored locally on the portable device.

20. The computer readable storage device of claim 12, the computer readable instructions further comprising instructions for limiting a scope depth encompassed by a given pointing interaction, the at least one endpoint within the scope depth.

21. A method, comprising:
employing a processor to execute computer executable instructions stored on a computer readable storage medium to implement the following acts:
determining an orientation of a portable device, the orientation ascertained as a function of data output by a compass included in the portable device, the data output by the compass identifying a pointing direction of the portable device;
determining a movement undergone by the portable device, the movement ascertained as a function of data output by an accelerometer unit included in the portable device;
determining a location of the portable device, the location ascertained as a function of data output by a global positioning system (GPS) unit included in the portable device;
ascertaining a gesture corresponding to the movement undergone by the portable device, the gesture ascertained as a function of at least the data output by the compass and the data output by the accelerometer unit;
selecting multiple digital canvasses from a plurality of retrievable digital canvasses, the plurality of retrievable digital canvasses respectively corresponding to a plurality of aggregated points of interest in the pointing direction of the portable device and within a predetermined radius from a particular point of interest; and
superimposing digital graffiti corresponding to the gesture onto the multiple digital canvasses simultaneously.

22. The method of claim 21, the determining a movement further comprising identifying an acceleration of the portable device during at least a portion of a path traversed by the portable device, the gesture ascertained as a function of the acceleration.

* * * * *